(12) United States Patent
Shinkawa

(10) Patent No.: US 6,421,263 B1
(45) Date of Patent: Jul. 16, 2002

(54) AC VOLTAGE DETECTION CIRCUIT AND METHOD, CHARGING CIRCUIT AND METHOD, CHOPPER CIRCUIT AND CHOPPING METHOD, CHOPPER CHARGING CIRCUIT AND METHOD, ELECTRONIC APPARATUS, AND TIMEPIECE

(75) Inventor: Osamu Shinkawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/697,334

(22) Filed: Oct. 25, 2000

(51) Int. Cl.[7] .......................................... H02M 7/5387
(52) U.S. Cl. ........................ 363/132; 363/17; 368/204
(58) Field of Search ........................... 363/17, 98, 131, 363/132, 124, 125; 368/66, 64, 203, 204, 219

(56) References Cited

U.S. PATENT DOCUMENTS 4,912,689 A * 3/1990 Miyazawa ................... 368/80
6,320,822 B1 * 11/2001 Okeya et al. ................. 368/66

FOREIGN PATENT DOCUMENTS

| EP | 0 862 262 | 9/1998 |
| JP | 9-131064 | 5/1997 |
| JP | 10-282264 | 10/1998 |
| JP | 11-98709 | 4/1999 |

* cited by examiner

Primary Examiner—Peter S. Wong
Assistant Examiner—Gary L. Laxton
(74) Attorney, Agent, or Firm—Mark P. Watson

(57) ABSTRACT

In an AC voltage detection circuit, a chopper charging circuit converts an induced voltage of an AC generator to a chopper voltage and charges a main capacitor. When the chopper voltage becomes a predetermined voltage or less, the chopper charging circuit charges an auxiliary capacitor and detects a power generation state of the AC generator at an early stage based on a potential obtained by adding the potential between output terminals of the AC generator and the auxiliary capacitor and starts the charging.

40 Claims, 50 Drawing Sheets

AC VOLTAGE DETECTION CIRCUIT AND METHOD, CHARGING CIRCUIT AND METHOD, CHOPPER CIRCUIT AND CHOPPING METHOD, CHOPPER CHARGING CIRCUIT AND METHOD, ELECTRONIC APPARATUS, AND TIMEPIECE

BACKGROUND OF THE INVENTION

1. Field of the Invention

The present invention relates to an AC voltage detection circuit and method suitable for raising a charging efficiency, a charging circuit and method having a high charging efficiency, a chopper charging circuit and method, an electronic apparatus, and a timepiece.

2. Description of the Related Art

As a charging circuit for charging a capacitor or a battery with the AC voltage generated by a generator, a bridge type charging circuit has been known. FIG. 51 is a circuit diagram of a conventional charging circuit (Japanese Unexamined Patent Publication (Kokai) No. 9-131064). In this charging circuit, provision is made of comparators COM 1 and COM2 for comparing voltages of output terminals AG1 and AG2 of a generator AG with a power supply voltage Vdd, comparators COM3 and COM4 for comparing the voltages of the output terminals AG1 and AG2 of the generator AG with the voltage of a ground GND, and a capacitor C having a large capacity for storing a charging current. P- and N-channel FETs P1, P2, N1, and N2 are controlled ON and OFF by output of the comparators COM1 to COM4.

Here, when the voltage of the output terminal AG1 becomes the voltage of the ground GND or less, the N-channel FET N1 is brought to the ON state by the comparator COM3, so the output terminal AG1 is grounded. Further, when the voltage of the output terminal AG2 exceeds the power supply voltage Vdd, the P-channel FET P2 is turned ON by the comparator COM2, so a charge is stored in the capacitor C through a route indicated by the arrow. In this case, so far as the voltage of the output terminal AG2 does not exceed the power supply voltage Vdd, the P-channel FET P2 does not turn ON, so a current flows through a route reverse to that indicated by the arrow, to thereby prevent an inconvenience such as a reduction of the charging efficiency.

In this way, in the charging circuit of the related art for charging AC voltage, field effect transistors and comparators are combined to construct a one-directional unit for sending current in one direction under certain conditions and thereby raise the charging efficiency.

In this charging circuit, even in the period when the generator AG does not generate electricity, electrical energy stored in the capacitor C is consumed by the comparators, so there is the problem of a reduction of the charging efficiency.

Further, as a charging circuit charging even when the induced voltage generated in the generator is small, there is a chopper charging circuit. FIG. 52 is a circuit diagram of a chopper charging circuit of the related art (Japanese Unexamined Patent Publication (Kokai) No. 10-282264).

This chopper charging circuit A is provided with comparators COM1 and COM2 for comparing the voltages of the output terminals AG1 and AG2 of the generator AG with the power supply voltage Vdd, P-channel FETs P1, P2 controlled ON and OFF by output signals SP1 and SP2 of the comparators COM1 and COM2, an oscillator circuit B for outputting a clock signal CL, an AND circuit AND for calculating an AND logic of the output signals SP1 and SP2 of the comparators COM1 and COM2 and the clock signal CL, N-channel FETs N1, N2 controlled by an output signal SN of the AND circuit AND, and a capacitor C having a large capacity for storing the charging current. Here, diodes d1, d2, d3, and d4 are parasitic diodes of the P- and N-channel FETs P1, P2, N1, and N2 respectively.

Next, an explanation will be made of an operation of this chopper charging circuit A by using a timing chart shown in FIG. 53. In this example, it is assumed that, up to a time ta, the voltages of the output terminals AG1 and AG2 are the power supply voltage vdd or less, the output signals SP1 and SP2 of the comparators COM1 and COM2 are maintained at the high level, and the P-channel FETs P1 and P2 are in the OFF state.

First, in this chopper charging circuit A, when the clock signal CL becomes the high level at the time ta, the output signal SN of the AND circuit AND becomes the high level, so the N-channel FETs N1 and N2 become the ON state, and a short-circuit route of the AC generator AG and N-channel FETs N1 and N2 is formed. In this case, when induced voltage is generated on for example the output terminal AG1 side in accordance with the induced voltage of the AC generator AG, as indicated by a symbol a in FIG. 52, a current i1 flows through the route from the AC generator AG via N-channel FET N1 to N-channel FET N2.

Then, when the clock signal CL becomes the low level at a time tb, the output signal SN of the AND circuit AND becomes the low level, so the N-channel FETs N1 and N2 become the OFF state, and the short-circuit route is cut. In this case, while the clock signal CL is at the high level (hereinafter, referred to as a "short-circuit period"), energy is stored in an inductance of an output coil of the AC generator AG by the current flowing through the short-circuit route, and the voltage of the output terminal AG1 is boosted by this energy. Then, when the voltage of the output terminal AG1 is boosted to the power supply voltage Vdd or more at a time tc, the output signal SP1 of the comparator COM1 turns to the low level, and the P-channel FET P1 turns to the ON state. Consequently, as indicated by a symbol β in FIG. 52, a charging current i2 flows through a charging route from the diode d4 via AC generator AG and P-channel FET P1 to capacitor C, so that the capacitor C is charged.

In this case, along with progress in the charging, the energy stored in the inductance of the output coil is gradually discharged, and the charging current i2 is gradually reduced. Then, when the voltage of the output terminal AG1 becomes the power supply voltage Vdd or less, the output signal SP1 of the comparator COM1 becomes the high level, the P-channel FET P1 switches to the OFF state, and the charging route mentioned above is cut. Namely, until the voltage of the output terminal AG1 becomes the power supply voltage Vdd or less, the N-channel FETs N1 and N2 are maintained in the OFF state by the AND circuit AND, and the charging is continued.

Accordingly, when the amount of the generated power of the AC generator AG is large and the energy stored in the inductance of the output coil is large, the charging is continued even if shifting to the short-circuit period. Note that when induced voltage is generated on the output terminal AG2 side of the AC generator AG, the direction of the current i1 flowing through the above short-circuit route becomes reverse, and the voltage of the output terminal AG2 is boosted. Consequently, the charging current i2 flows through the charging route from the diode d3 via AC generator AG and P-channel FET P2 to capacitor C, so that the capacitor C is charged.

In this way, the chopper charging circuit of the related art boosts the voltage by converting the induced voltage of the AC generator to the chopper voltage and thereby can charge even when the induced voltage generated in the AC generator is small.

Incidentally, in a comparator configured by a field effect transistors, the lower in transition frequency, the smaller the current consumption. Further, the operating speed of the comparator is determined by the transition frequency of the field effect transistor configuring the comparator, so the smaller the current consumption, the slower the operation of the comparator. For this reason, as mentioned above, when a low current consumption type power generation detection comparator is provided in the charging circuit, the comparator cannot detect the induced voltage even if an induced voltage exceeding a threshold voltage is generated, so detection of power generation is not done quickly.

Here, it may be considered to detect power generation early by lowering the threshold voltage of the power generation detection comparator. However, by lowering the threshold voltage, a malfunction can occur when noise is induced in the output coil of the AC generator AG, so there is a limit to the reduction of the threshold voltage.

A concrete explanation will be made of this point. FIG. 54 shows the relationship between an induced voltage VG generated between the output terminals AG1 and AG2 and the threshold voltage VD. In this example, the threshold voltage VG is set so that no malfunctions occur due to noise N. For this reason, there is the problem such that the state of generation cannot be detected irrespective of the induced voltage being generated during a period from a time t0 to a time t1.

Further, in the chopper charging circuit, when the induced voltage generated between the output terminals AG1 and AG2 is extremely small, the energy stored in the inductance of the output coil is small, so the voltage cannot be boosted to the power supply voltage Vdd or more even if the induced voltage is inverted to the chopper voltage. For this reason, the capacitor C cannot be charged, and the chopper voltage is consumed by an internal resistance or the like of the output coil.

Further, even if the induced voltage generated between the output terminals AG1 and AG2 is large, when the charging is started and the chopper voltage becomes the power supply voltage Vdd or less, the capacitor C cannot be charged.

It may be considered that the charging efficiency of the chopper charging circuit could be further raised if the energy stored in the inductance consumed by the internal resistance etc. of the output coil could be charged in the capacitor C.

SUMMARY OF THE INVENTION

An object of the present invention is to provide an AC voltage detection circuit and method capable of raising the charging efficiency and a charging circuit and method, a chopper circuit and chopping method, a chopper charging circuit and method, an electronic apparatus, and a timepiece applying them.

According to an aspect of the present invention, there is provided an AC voltage detection circuit for detecting whether or not an AC voltage having an amplitude not less than a predetermined amplitude was induced in an inductance element connected between a first input terminal and a second input terminal, provided with a first capacity element connected to the first input terminal, a second capacity element connected to the second input terminal, a charging unit for forming a charging route including a capacity element connected to one input terminal between the first and second input terminals and cutting off a charging route including a capacity element connected to the other input terminal when induction of the AC voltage is started at the inductance element, and a detection unit for comparing the voltages of the first input terminal and the second input terminal with a reference voltage and detecting that the AC voltage was induced in the inductance element in accordance with the result of the comparison.

According to another aspect of the present invention, there is provided an AC voltage detection circuit for detecting whether or not an AC voltage having an amplitude not less than a predetermined amplitude was induced in an inductance element connected between a first input terminal and a second input terminal, provided with a first diode connected between the first input terminal and a line, a first capacity element and a first switching element connected between the first input terminal and the line, a second diode connected between the second input terminal and the line, a second capacity element and a second switching element connected between the second input terminal and the line, a control unit for controlling to turn ON one of the first and second switching elements and turn OFF the other in a period when a continuous AC voltage is induced at the inductance element and, at the same time, controlling to turn ON the switching element connected between the input terminal having a lower terminal voltage immediately before the end of the related period between the first and second input terminals and the line after the end of the related period, and a detection unit for comparing the voltages of the first input terminal and the second input terminal with the reference voltage, and detecting that the AC voltage of the amplitude not less than the predetermined amplitude was induced at the inductance element in accordance with the result of the comparison.

Preferably, the AC voltage detection circuit further includes a discharging unit for discharging a charged element between the first or second capacity elements at a point of time when the induction of the AC voltage is detected by the detection unit.

Advantageously, the discharging unit is provided with a third switching element connected between the first input terminal and the line and a fourth switching element connected between the second input terminal and the line and turns ON the third or fourth switching element corresponding to the element which has been turned ON between the first and second switching elements at the point of time when induction of an AC voltage not less than the predetermined amplitude is detected by the detection unit.

According to another aspect of the present invention, there is provided a charging circuit for rectifying an AC voltage induced at an inductance element connected between a first input terminal and a second input terminal and charging a capacity element connected between a first line and a second line, provided with a first switching element connected between the first line and the first input terminal, a second switching element connected between the first line and the second input terminal, a third switching element and a first diode connected in parallel between the second line and the first input terminal, a fourth switching element and a second diode connected in parallel between the second line and the second input terminal, a fifth switching element and a first auxiliary capacity element connected in series between the second line and the first input terminal, a sixth switching element and a second auxiliary capacity element connected in series between the second line and the second input terminal, a first control unit for controlling the ON or OFF state of the first through fourth switching elements based on potentials of the first and second lines and the potentials of the first and second input terminals, a power supply unit for comparing the voltages between the first and second input terminals and the second line with the reference voltage and supplying power to the first control unit when detecting that an AC voltage not less than a predetermined amplitude was induced at the inductance element in accordance with the result of the comparison, and a second control unit for turning ON the fifth or sixth switching element corresponding to the input terminal having the lower terminal voltage immediately before the end of the period where the continuous AC voltage is induced at the inductance element after the end of the related period.

According to still another aspect of the present invention, there is provided a chopper charging circuit for chopper boosting AC voltage induced at an inductance element connected between a first input terminal and a second input terminal synchronous to a clock signal and charging a capacity element connected between a first line and a second line, provided with a first switching element connected between the first line and the first input terminal, a first control unit for comparing the potential of the first line and the potential of the first input terminal and controlling the ON or OFF state of the first switching element based on the result of the comparison, a second switching element connected between the first line and the second input terminal, a second control unit for comparing the potential of the first line and the potential of the second input terminal and controlling the ON or OFF state of the second switching element based on the result of the comparison, a third switching element and a first diode connected in parallel between the second line and the first input terminal, a third control unit for comparing the potential of the second line and the potential of the first input terminal and turning ON or OFF the third switching element synchronous to the clock signal based on the result of the comparison, a fourth switching circuit and a second diode connected in parallel between the second line and the second input terminal, a fourth control unit for comparing the potential of the second line and the potential of the second input terminal and turning ON or OFF the fourth switching element synchronous to the clock signal based on the result of the comparison, a fifth switching circuit and a first auxiliary capacity element connected in series between the second line and the first input terminal, a sixth switching circuit and a second auxiliary capacity element connected in series between the second line and the second input terminal, a detection unit for comparing the voltages between the first and second input terminals and the second line with the reference voltage and detecting that an AC voltage not less than the predetermined amplitude was induced at the inductance element in accordance with the result of the comparison, a power supply unit for supplying power to the first through fourth control units after it is detected by the detection unit that an AC voltage not less than the predetermined amplitude was induced, and an auxiliary capacity element selection unit for turning ON the fifth or sixth switching element corresponding to an input terminal having a lower terminal voltage immediately before the end of the period where the continuous AC voltage is induced at the inductance element after the end of the related period.

Preferably, the discharging unit turns ON or OFF the element which has become ON between the fifth and sixth switching element synchronous to the ON or OFF state of the third or fourth switching element corresponding to the related element at the point of time when it is detected by the detection unit that an AC voltage not less than the predetermined amplitude is induced.

According to yet another aspect of the present invention, an electronic apparatus includes a built-in chopper charging circuit of the above-mentioned type, and operates by power supplied from the chopper charging circuit.

According to another aspect of the present invention, a timepiece is provided with a chopper charging circuit of the above-mentioned type, and a clock circuit for counting and displaying time by power supplied from the chopper charging circuit.

According to another aspect of the present invention, there is provided an AC voltage detection method for detecting whether or not an AC voltage not less than a predetermined amplitude was induced at an inductance element inserted between a first input terminal with a first capacity element connected thereto and a second input terminal with a second capacity element connected thereto, comprising forming a charging route including a capacity element connected to one input terminal between the first and second input terminals, cutting a charging route including the capacity element connected to the other input terminal, comparing the voltages of the first input terminal and the second input terminal with the reference voltage, and detecting that the AC voltage was induced at the inductance element in accordance with the result of the comparison when induction of AC voltage is commenced at the inductance element.

According to another aspect of the present invention, there is provided an AC voltage detection method using a detection circuit provided with a first diode connected between a first input terminal and a line, a first capacity element and a first switching element connected between the first input terminal and the line, a second diode connected between a second input terminal and the line, and a second capacity element and a second switching element connected between the second input terminal and the line so as to detect whether or not an AC voltage not less than a predetermined amplitude was induced at an inductance element connected between the first input terminal and the second input terminal, comprising turning ON one of the first and second switching elements and turning OFF the other in a period where a continuous AC voltage is induced at the inductance element, turning ON the switching element connected between the input terminal having a lower terminal voltage immediately before the end of the related period between the first and second input terminals and the line after the end of the related period, comparing the voltages of the first input terminal and the second input terminal with the reference voltage, and detecting that an AC voltage not less than the predetermined amplitude was induced at the inductance element in accordance with the result of the comparison.

According to another aspect of the present invention, there is provided a charging method using a charging circuit provided with a first switching element connected between a first line and a first input terminal, a second switching element connected between the first line and a second input terminal, a third switching element and a first diode connected in parallel between the second line and the first input terminal, a fourth switching element and a second diode connected in parallel between the second line and the second input terminal, a fifth switching element and a first auxiliary capacity element connected in series between the second line and the first input terminal, and a sixth switching element and a second auxiliary capacity element connected in series between the second line and the second input terminal so as to rectify the AC voltage induced at the inductance element connected between the first input terminal and the second input terminal and charge a capacity element connected between the first line and the second line, comprising the steps of comparing the voltages between the first and second input terminals and the second line with a reference voltage, detecting that an AC voltage not less than a predetermined amplitude was induced at the inductance element in accordance with the result of the comparison, controlling the ON or OFF states of the first through fourth switching elements based on the potentials of the first and second lines and the potentials of the first and second input terminals, and turning ON the fifth or sixth switching element corresponding to the input terminal having the lower terminal voltage immediately before the end of the period when a continuous AC voltage is induced at the inductance element after the end of the related period.

According to another aspect of the present invention, there is provided a chopper charging method using a chopper charging circuit provided with a first switching element connected between a first line and a first input terminal, a first control unit for comparing the potential of the first line and the potential of the first input terminal and controlling the ON or OFF state of the first switching element based on the result of the comparison, a second switching element connected between the first line and the second input terminal, a second control unit for comparing the potential of the first line and the potential of the second input terminal and controlling the ON or OFF state of the second switching element based on the result of the comparison, a third switching element and a first diode connected in parallel between the second line and the first input terminal, a third control unit for comparing the potential of the second line and the potential of the first input terminal and turning ON or OFF the third switching element synchronous to the clock signal based on the result of the comparison, a fourth switching circuit and a second diode connected in parallel between the second line and the second input terminal, a fourth control unit for comparing the potential of the second line and the potential of the second input terminal and turning ON or OFF the fourth switching element synchronous to the clock signal based on the result of the comparison, a fifth switching circuit and a first auxiliary capacity element connected in series between the second line and the first input terminal, and a sixth switching circuit and a second auxiliary capacity element connected in series between the second line and the second input terminal, comprising the steps of comparing the voltages between the first and second input terminals and the second line with the reference voltage, detecting that an AC voltage not less than a predetermined amplitude was induced at the inductance element in accordance with the result of the comparison, supplying power to the first through fourth control units after it is detected by the detection unit that an AC voltage not less than the predetermined amplitude was induced, and turning ON the fifth or sixth switching element corresponding to the input terminal having the lower terminal voltage immediately before the end of the period where the continuous AC voltage is induced at the inductance element after the end of the related period.

According to another aspect of the present invention, there is provided a chopper circuit for converting energy supplied from a power supply to a chopper voltage to generate a chopper voltage between a first line and a second line, provided with an inductance element, a storage unit for storing the power, a first chopper unit for forming a first closed loop including the inductance element and the power supply to supply the power of the power supply to the inductance element and converting the energy of the inductance element to the chopper voltage by opening the first closed loop after an elapse of a predetermined period, a charging unit for charging the storage unit by forming a second closed loop including the inductance element and the storage unit where the chopper voltage converted by the first chopper unit becomes a chopper reference voltage determined in advance or less, and a second chopper unit for forming a third closed loop including the inductance element and the storage unit and converting the energy of the inductance element to the chopper voltage by opening the third closed loop after the elapse of the predetermined period.

According to a still another aspect of the present invention, there is provided a chopper circuit for converting a energy supplied from an AC power supply to a chopper voltage to generate a chopper voltage between the first line and the second line, provided with an inductance element, first and second storage units for storing the power, a first chopper unit for forming a first closed loop including the inductance element and the AC power supply to supply power of the AC power supply to the inductance element and opening the first closed loop after the elapse of a predetermined period to thereby to convert the energy of the inductance element to the chopper voltage, a first charging unit for forming a second closed loop including the inductance element and the first storage unit to charge the first storage unit by the chopper voltage when the chopper voltage converted by the first chopper unit and generated on one terminal side of the inductance element becomes a chopper reference voltage determined in advance or less, a second charging unit for forming a third closed loop including the inductance element and the second storage unit to charge the second storage unit by the chopper voltage when the chopper voltage converted by the first chopper unit and generated on the other terminal side of the inductance element becomes the chopper reference voltage or less, a second chopper unit for forming a fourth closed loop including the inductance element and the first storage unit and opening the fourth closed loop after the elapse of the predetermined period to thereby convert the energy of the inductance element to the chopper voltage, and a third chopper unit for forming a fifth closed loop including the inductance element and the second storage unit and opening the fifth closed loop after the elapse of the predetermined period to thereby convert the energy of the inductance element to the chopper voltage.

According to another aspect of the present invention, there is provided a chopper method providing an inductance element and a storage unit for storing power and converting voltage supplied from a power supply to a chopper voltage to generate a chopper voltage between a first line and a second line, comprising a first chopper step of forming a first closed loop including the inductance element and the power supply to supply power of the power supply to the inductance element and opening the first closed loop after the elapse of a predetermined period to thereby convert the energy of the inductance element to the chopper voltage, a charging step of forming a second closed loop including the inductance element and the storage unit to charge the storage unit by the chopper voltage when the chopper voltage converted by the first chopper step becomes a predetermined chopper reference voltage or less, and a second chopper step of forming a third closed loop including the inductance element and the storage unit and opening the third closed loop after the elapse of a predetermined period to thereby convert the energy of the inductance element to the chopper voltage.

According to another aspect of the present invention, there is provided a chopper method providing an inductance element and first and second storage units for storing power and converting a voltage supplied from an AC power supply to a chopper voltage to generate a chopper voltage between a first line and a second line, comprising a first chopper step of forming a first closed loop including the inductance element and the AC power supply to supply power of the AC power supply to the inductance element and opening the first closed loop after the elapse of the predetermined period to thereby convert the energy of the inductance element to the chopper voltage, a first charging step of forming a second closed loop including the inductance element and the first storage unit to charge the first storage unit by the chopper voltage when the chopper voltage converted by the first chopper step and generated on one terminal side of the inductance element becomes a predetermined chopper reference voltage or less, a second charging step of forming a third closed loop including the inductance element and the second storage unit to charge the second storage unit by the chopper voltage when the chopper voltage converted by the first chopper step and generated on the other terminal side of the inductance element becomes the chopper reference voltage or less, a second chopper step of forming a fourth closed loop including the inductance element and the first storage unit and opening the fourth closed loop after the elapse of the predetermined period to thereby convert the energy of the inductance element to the chopper voltage, and a third chopper step of forming a fifth closed loop including the inductance element and the second storage unit and opening the fifth closed loop after the elapse of the predetermined period to thereby convert the energy of the inductance element to the chopper voltage.

According to yet another aspect of the present invention, there is provided a chopper charging circuit provided with a chopper circuit for converting voltage supplied from a power supply to a chopper voltage to generate a chopper voltage between a first line and a second line and a third storage unit for storing the chopper voltage of the chopper circuit, wherein the chopper circuit is provided with an inductance element, a storage unit for storing power, a first chopper unit for forming a first closed loop including the inductance element and the power supply to supply power of the power supply to the inductance element and opening the first closed loop after the elapse of a predetermined period to thereby convert the energy of the inductance element to the chopper voltage, a charging unit for charging the storage unit by forming a second closed loop including the inductance element and the storage unit when the chopper voltage converted by the first chopper unit becomes a predetermined chopper reference voltage or less, and a second chopper unit for forming a third closed loop including the inductance element and the storage unit and opening the third closed loop after the elapse of the predetermined period to thereby convert the energy of the inductance element to the chopper voltage.

BRIEF DESCRIPTION OF THE DRAWINGS

The above object and features of the present invention will be more apparent from the following description of the preferred embodiments given with reference to the accompanying drawings, wherein.

DESCRIPTION OF THE PREFERRED EMBODIMENTS

Below, a wristwatch using a chopper charging circuit will be explained as an embodiment of the present invention.

First Embodiment

Figure 1:
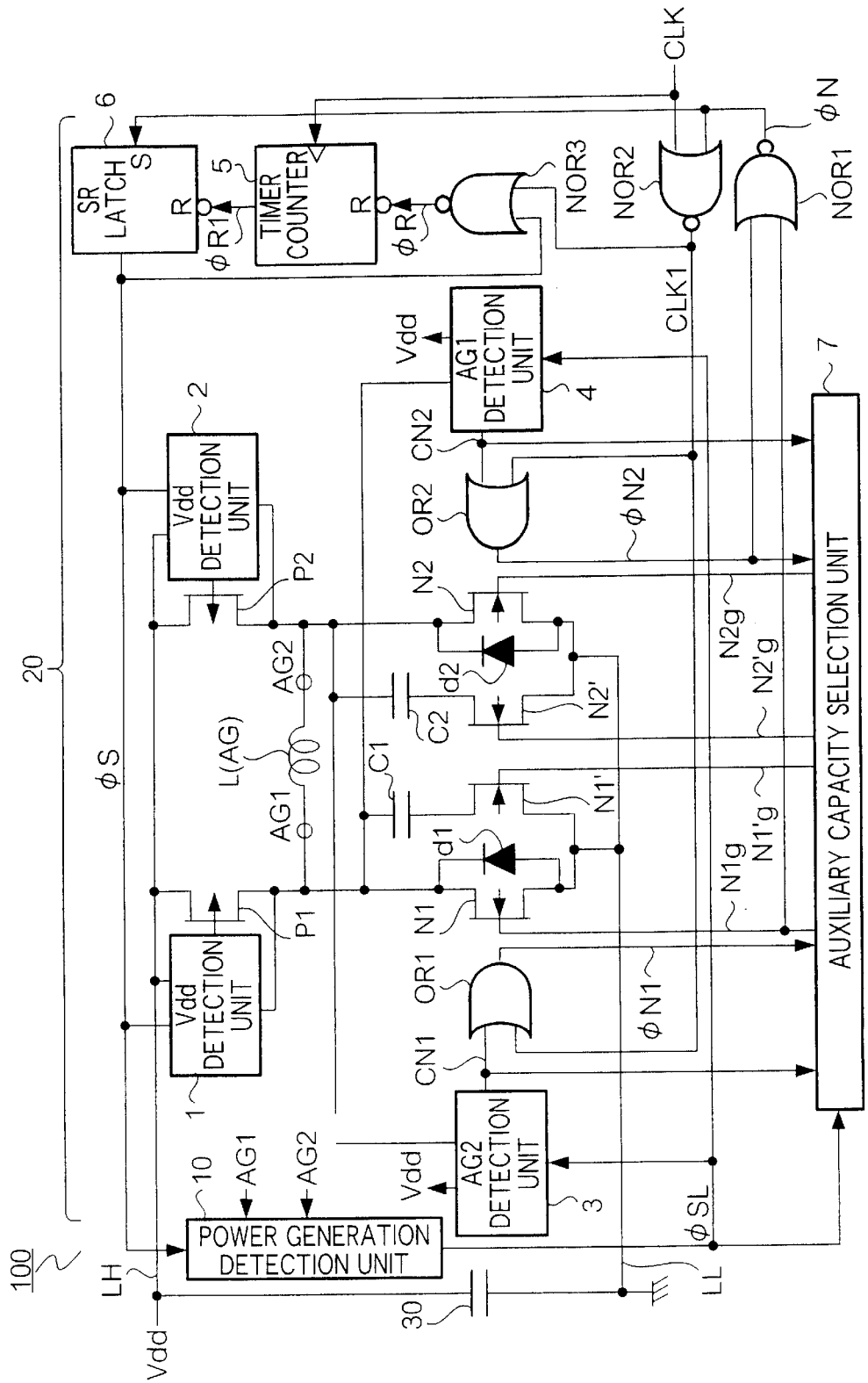
FIG. 1 is a circuit diagram of a chopper charging circuit used in a wristwatch according to a first embodiment.

FIG. 1 is a circuit diagram of a chopper charging circuit used in the wristwatch according to the present embodiment.

A chopper charging circuit 100 is roughly configured by a power generation detection unit 10 for detecting an existence of the power generation state of an AC generator AG, a chopper circuit 20 for converting the induced voltage of the AC generator AG to a pulse-like chopper voltage, and a main capacitor 30 charged with the chopper voltage obtained by the chopper circuit 20. The main capacitor 30 is connected between a high potential side line LH and a low potential side line LL. In the following explanation, the voltage of the high potential side line LH (power supply voltage) based on the low potential side line LL will be referred to as Vdd. Further, in FIG. 1, the symbol L is the output coil of the AC generator AG, and output terminals AG1 and AG2 thereof are connected to input terminals of the chopper charging circuit 100.

First, an explanation will be made of the power generation detection unit 10. The power generation detection unit 10 compares the voltages of the output terminals AG1 and AG2 of the AC generator AG with a predetermined threshold value and determines that the AC generator AG is in the power generation state when they exceed the threshold value and is configured by for example a circuit shown in FIG. 2.

Figure 2:
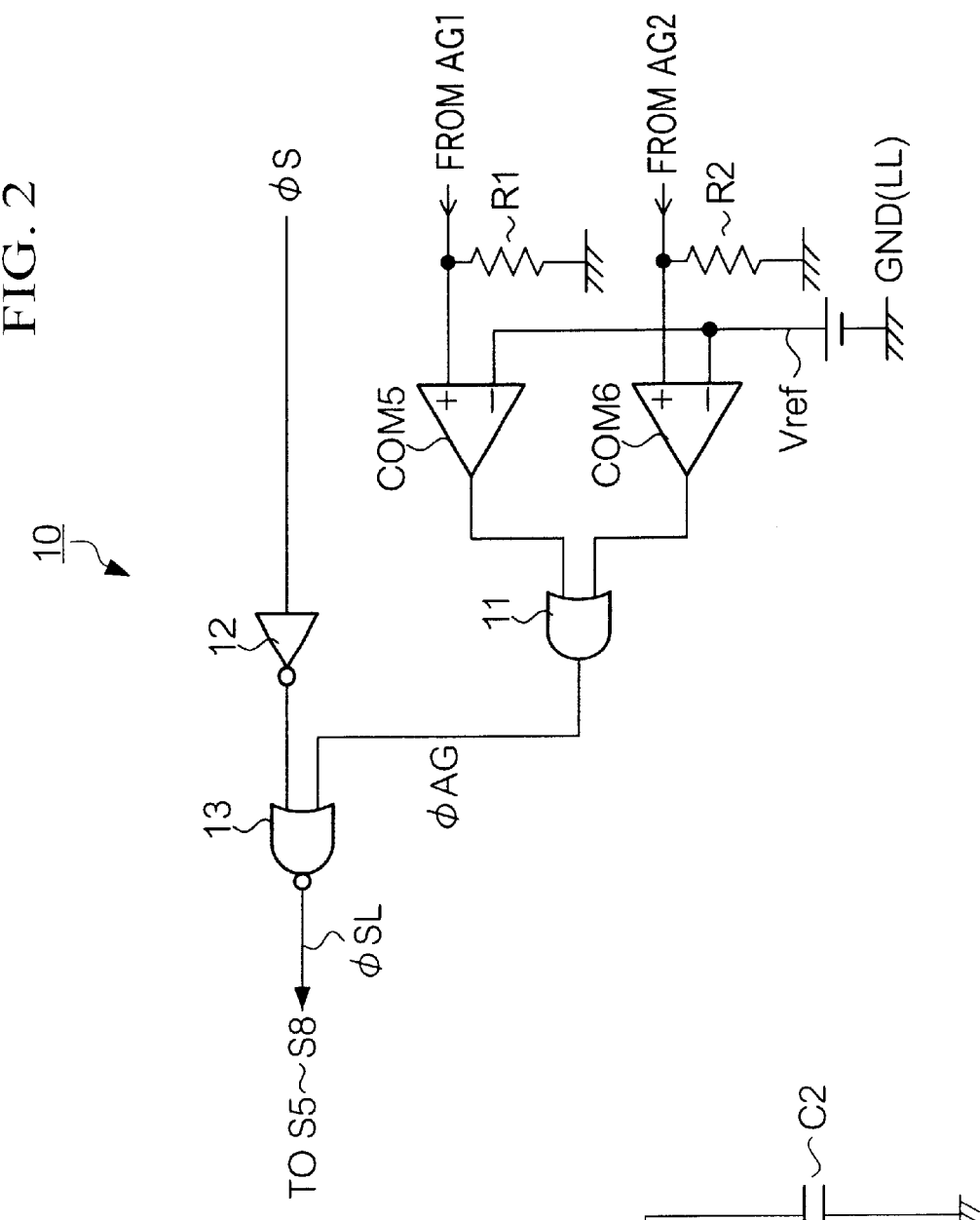
FIG. 2 is a circuit diagram of a power generation detection unit of the chopper charging circuit.

In FIG. 2, a positive input terminal of the comparator COM5 grounded via a resistor R1 is connected to the output terminal AG1, and a reference voltage Vref is supplied to a negative input terminal thereof. On the other hand, the positive input terminal of the comparator COM6 grounded via a resistor R2 is connected to the output terminal AG2, and the reference voltage Vref is supplied to the negative input terminal thereof. Further, the reference voltage Vref is set so as to be over the voltage of the ground GND so that whether or not the AC generator AG is in the power generation state can be detected.

Accordingly, it can be detected that the AC generator AG is in the power generation state when either output signal of the comparator COM5 and COM6 becomes the high level. For this purpose, an OR circuit 11 calculates an OR logic of the two signals and output the calculation result as a signal ΦAG indicating whether or not the AC generator AG is in the power generation state. Further, a signal ΦS generated at an SR latch circuit 6 (refer to FIG. 1) mentioned later is supplied via an inversion circuit 12 to one input terminal of a NOR circuit 13, while the output signal ΦAG of the OR circuit 11 is supplied to the other input terminal. The NOR circuit 13 generates a signal ΦSL based on these signals.

This signal ΦSL is used as the control signal for supplying power to an AG2 detection unit 3 and an AG1 detection unit 4 mentioned later. The AG2 detection unit 3 and the AG1 detection unit 4 operate when the signal ΦSL indicates the power generation state (low level) and detect whether or not the voltages of the output terminals AG1 and AG2 of the output coil L exceed the predetermined level. Then, a portion comprising a NOR circuit NOR3, a timer counter 5, and an SR latch circuit 6 of the chopper circuit 20 makes the signal ΦS active until a predetermined time elapses after the time of the detection when it is detected that an induced voltage exceeding the predetermined level is generated.

Accordingly, Vdd detection units 1 and 2 operate, and the charging of the main capacitor 30 becomes possible. Namely, taking the opportunity of the detection of the power generation state in the power generation detection unit 10, the supply of power to the portions of the chopper charging circuit 100 will be sequentially carried out. Accordingly the shorter the time from the generation of the induced voltage between the output terminals AG1 and AG2 of the AC generator AG to when the signal ΦSL is made active, the more effective the utilization of the generated induced voltage.

Next, a principal part of the chopper circuit 20 is, as shown in FIG. 1, a bridge type configuration comprised of the P-channel FETs P1 and P2 connected between the output terminals AG1 and AG2 and the high potential side line LH and of the N-channel FETs N1 and N2 connected between the output terminals AG1 and AG2 and the low potential side line LL. In this chopper circuit 20, the N-channel FETs N1 and N2 are chopper operated. The induced voltage of the AC generator AG induced at the output coil L is chopper boosted to charge the main capacitor 30.

Further, the diode d1 is inserted between the output terminal AG1 and the low potential side line LL. At the same time, an auxiliary capacitor C1 and an N-channel FET N1' are connected in series. On the other hand, a diode d2 is connected in parallel between the output terminal AG2 and the low potential side line LL. At the same time, an auxiliary capacitor C2 and an N-channel FET N2' are connected in series. Note that, in this example, the diodes d1 and d2 were provided, but when the chopper circuit 20 is configured as an integrated circuit, it is also possible to utilize the parasitic diodes provided along with the N-channel FETs N1 and N2 as the diodes d1 and d2.

Figure 3:
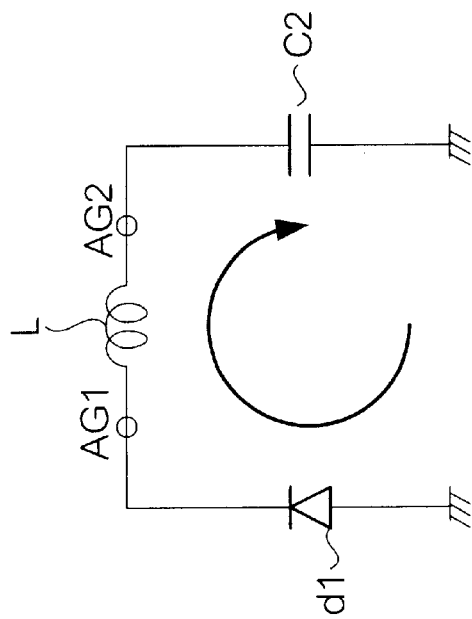
FIG. 3 is a circuit diagram of an equivalent circuit of the chopper charging circuit.

Here, an explanation will be made of functions of the auxiliary capacitors C1 and C2 by referring to FIG. 3 and FIG. 4. FIG. 3 is a circuit diagram of the equivalent circuit of the auxiliary capacitor C2 in a case where the N-channel FET N2' is turned ON and the N-channel FET N1' is turned OFF and the peripheral configuration thereof, while FIG. 4 is a timing chart of the voltages of the output terminal AG1 and the output terminal AG2 in this state.

Figure 4:
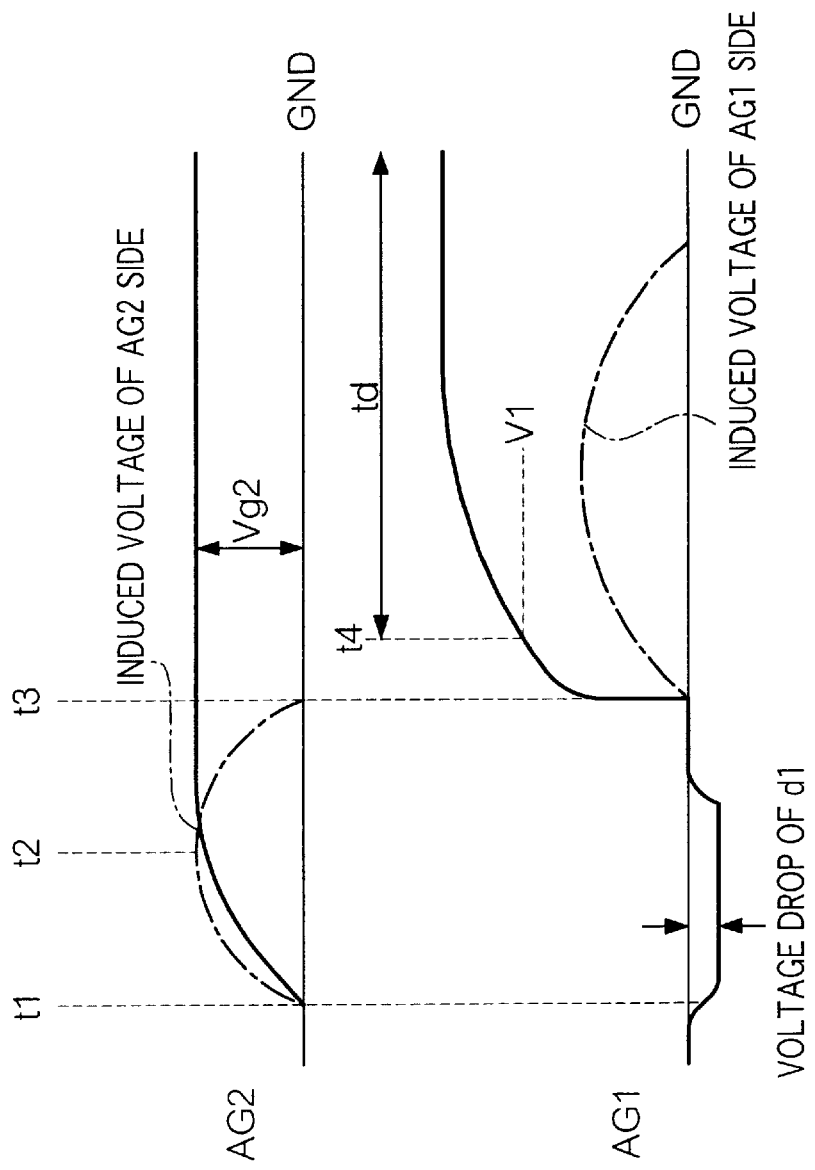
FIG. 4 is a timing chart of voltages of an output terminal AG1 and an output terminal AG2 in the equivalent circuit of FIG. 3.

Assuming that the induced voltage is induced at the output coil L and the AG2 side has a positive polarity from the time t1 as shown in FIG. 4, the auxiliary capacitor C2 is charged by this induced voltage. At this time, the diode d1 becomes the ON state, a closed loop is formed by a route comprised by AG2, C2, d1, and AG1, so that a charging current flows into the auxiliary capacitor C2. For this reason, even if the positive polarity induced voltage on the AG2 side gradually becomes smaller after being the maximum at a time t2, the charge stored in the auxiliary capacitor C2 is not discharged. Accordingly, the voltage of the output terminal AG2 is not reduced even after the time t2.

On the other hand, when the output terminal AG1 side has the positive polarity induced voltage after a time t3, the diode d1 becomes the OFF state. The voltage of the output terminal AG1 becomes a value obtained by adding the induced voltages induced at the both ends of the output coil L and the voltage of the auxiliary capacitor C2. For this reason, after the time t3, the voltage of the output terminal AG1 becomes a value obtained by adding a voltage Vg2 of the output terminal AG1 at the time t3 and the induced voltage and is boosted as shown in FIG. 4. In other words, the induced voltage can be boosted two fold by the diode d1 and the auxiliary capacitor C2.

Accordingly, the power generation detection unit 10 can detect the power generation based on the induced voltage boosted two fold. For this reason, for example, assuming that the reference voltage Vref of the power generation detection unit 10 is set to V1 shown in FIG. 4, the signal ΦSL can be made active after the elapse of a response time td of the power generation detection unit 10 from a time t4. On the other hand, if auxiliary capacitors C1 and C2 are not provided, the power generation detection unit 10 will not detect the power generation state until the time further elapses and the induced voltage exceeds V1. In other words, by boosting the induced voltage two fold, the power generation state can be detected earlier. Consequently, the chopper circuit 20 is operated even in a period when charging is hitherto not possible irrespective of the fact that the effective induced voltage is generated, and thus it becomes possible to raise the charging efficiency.

Figure 5:
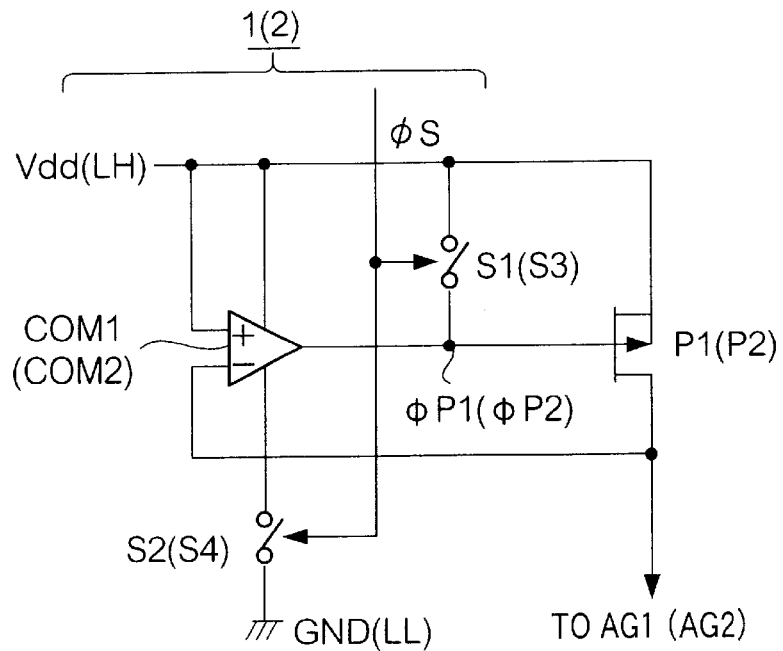
FIG. 5 is a circuit diagram of a configuration of a Vdd detection unit of the chopper charging circuit.

Here, circuit diagrams of the Vdd detection units 1 and 2 are shown in FIG. 5. Note that the parenthesized marks in FIG. 5 indicate parts of the Vdd detection unit 2, while the non parenthesized marks indicate parts of the Vdd detection unit 1. As shown in FIG. 5, the Vdd detection unit 1 (2) is configured by the comparator COM1 (COM2) and switches S1 (S3) and S2 (S4). The positive input terminal of the comparator COM1 (COM2) is connected to the high potential side line LH, while the negative input terminal thereof is connected to the output terminal AG1 (AG2) of the AC generator AG. For this reason, in the state where the switch S1 (S3) is OFF and the switch S2 (S4) is ON, when the power supply voltage Vdd exceeds the voltage of the output terminal AG1 (AG2), a signal ΦP1 (ΦP2) becomes the low level, and the P-channel FET P1 (P2) becomes ON. On the other hand, when the power supply voltage Vdd becomes lower than the voltage of the output terminal AG1, the signal ΦP1 (ΦP2) becomes the high level, and the P35 channel FET P1 (P2) becomes OFF. Accordingly the P-channel FET P1 (P2) supplies the current from the output terminal AG1 (AG2) to the high potential side line LH only in the case where the voltage of the output terminal AG1 (AG2) is over the power supply voltage Vdd.

Considering the charging efficiency, if the voltages of the output terminals AG1 and AG2 of the AC generator AG exceed the power supply voltage Vdd, desirably the P-channel FETs P1 and P2 are immediately turned ON. For this reason, the current consumption of the comparators COM1 and COM2 are relatively large and high speed operation can be possible. However, in the period when the AC generator AG does not generate power or in the period when even if it generates power, the induced voltage is small, charging is not possible, so it is not necessary to have the comparators COM1 and COM2 operate. Therefore, in the present embodiment, by providing the switches S1 and S2 inside the Vdd detection unit 1 and the switches S3 and S4 in the Vdd detection unit 2 and controlling them by the signal ΦS, the current consumption of the comparators COM1 and COM2 are reduced.

Here, the switch S1 (S3) is provided between the gate of the P-channel FET P1 (P2) and the power supply voltage Vdd, while the switch S2 (S4) is provided between the negative power supply terminal of the comparator COM1 (COM2) and the low potential side line LL. The switches S1 (S3) and S2 (S4) are configured so that when the signal ΦS becomes the high level, the switch S1 (S3) becomes ON and the switch S2 (S4) becomes OFF, while when the signal ΦS becomes the low level, the switch S1 (S3) becomes OFF and the switch S2 (S4) becomes ON. Accordingly, when setting the signal ΦS at the low level, the power is supplied to the comparator COM1 (COM2). The ON or OFF state of the P-channel FET P1 (P2) is controlled in accordance with the result of the comparison. On the other hand, when setting the signal ΦS at the high level, the supply of the power to the comparator COM1 (COM2) is cut, and the P-channel FET P1 (P2) becomes OFF. Namely, using the signal ΦS, it is possible to control whether or not to operate the Vdd detection units 1 and 2. When not operating them, the current consumption of the comparators COM1 and COM2 can be reduced.

Figure 6:
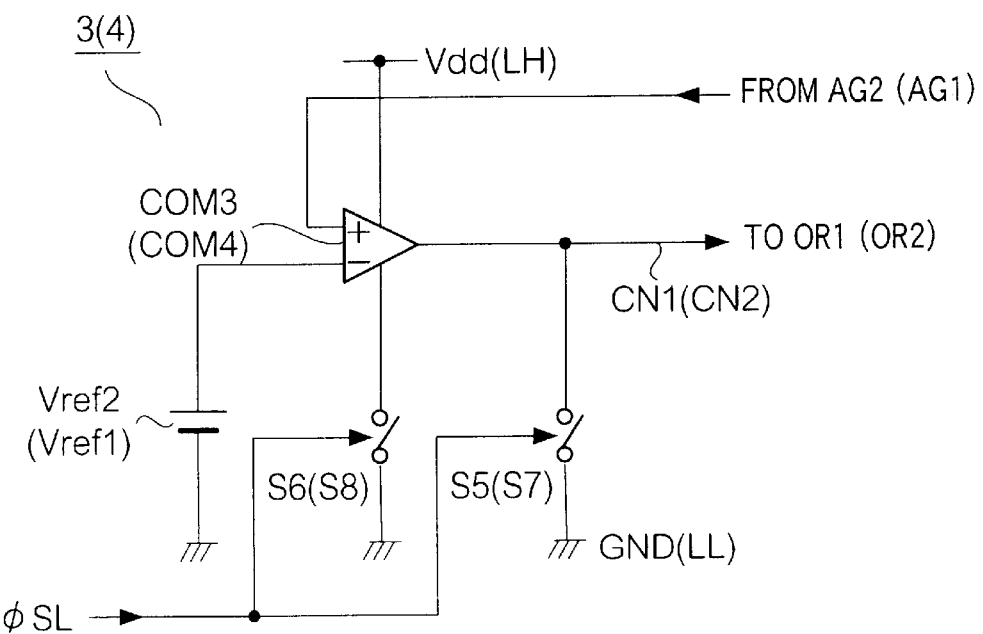
FIG. 6 is a circuit diagram of the configuration of an AG2 detection circuit of the chopper charging circuit.

Next, the AG2 detection unit 3 and the AG1 detection unit 4 are used for comparing the voltages of the output terminal AG2 and the output terminal AG1 with reference voltages Vref1 and Vref2. FIG. 6 is a circuit diagram of the AG2 detection unit 3 and the AG1 detection unit 4. Note that, the parenthesized mark in FIG. 6 indicate parts of the AG1 detection unit 4, and the non parenthesized mark indicate parts of the AG2 detection unit 3.

As shown in FIG. 6, the AG2 detection unit 3 (AG1 detection unit 4) is provided with the comparator COM3 (COM4) and switches S5 (S7) and S6 (S8). The positive input terminal of the comparator COM3 (COM4) is connected to the output terminal AG2 (AG1) of the AC generator AG, and the reference voltage Vref2 (Vref1) is supplied to its negative input terminal. The reference voltage Vref2 (Vref1) is set to a voltage that is slightly over the voltage of the ground GND.

When the voltage of the output terminal AG2 (AG1) exceeds the reference voltage Vref2 (Vref1), a signal CN1 (CN2) becomes the high level, while when the voltage of the output terminal AG2 (AG1) becomes lower than the reference voltage Vref2 (Vref1), the signal CN1 (CN2) becomes the low level.

In the AG2 detection unit 3 (AG1 detection unit 4), a switch S5 (S7) is provided between the output terminal of the comparator COM3 (COM4) and the low potential side line LL, and a switch S6 (S8) is provided between the negative power supply terminal of the comparator COM3 (COM4) and the low potential side line LL. The switches S5 (S7) and S6 (S8) are configured so that the switch S5 (S7) becomes ON and the switch S6 (S8) becomes OFF when the signal ΦSL becomes the high level, while the switch S5 (S7) becomes OFF and the switch S6 (S8) becomes ON when the signal ΦSL becomes the low level. Accordingly when the signal ΦSL is turned to the low level, power is supplied to the comparator COM3 (COM4), where a comparison operation is carried out. On the other hand, when the signal ΦSL is turned to the high level, the supply of power to the comparator COM3 (COM4) is cut. Accordingly, by using the signal ΦSL, it is possible to control whether or not to operate the AG2 detection unit 3 (AG1 detection unit 4), while when not operating them, the current consumption of the comparator COM3 (COM4) can be reduced.

Figure 7:
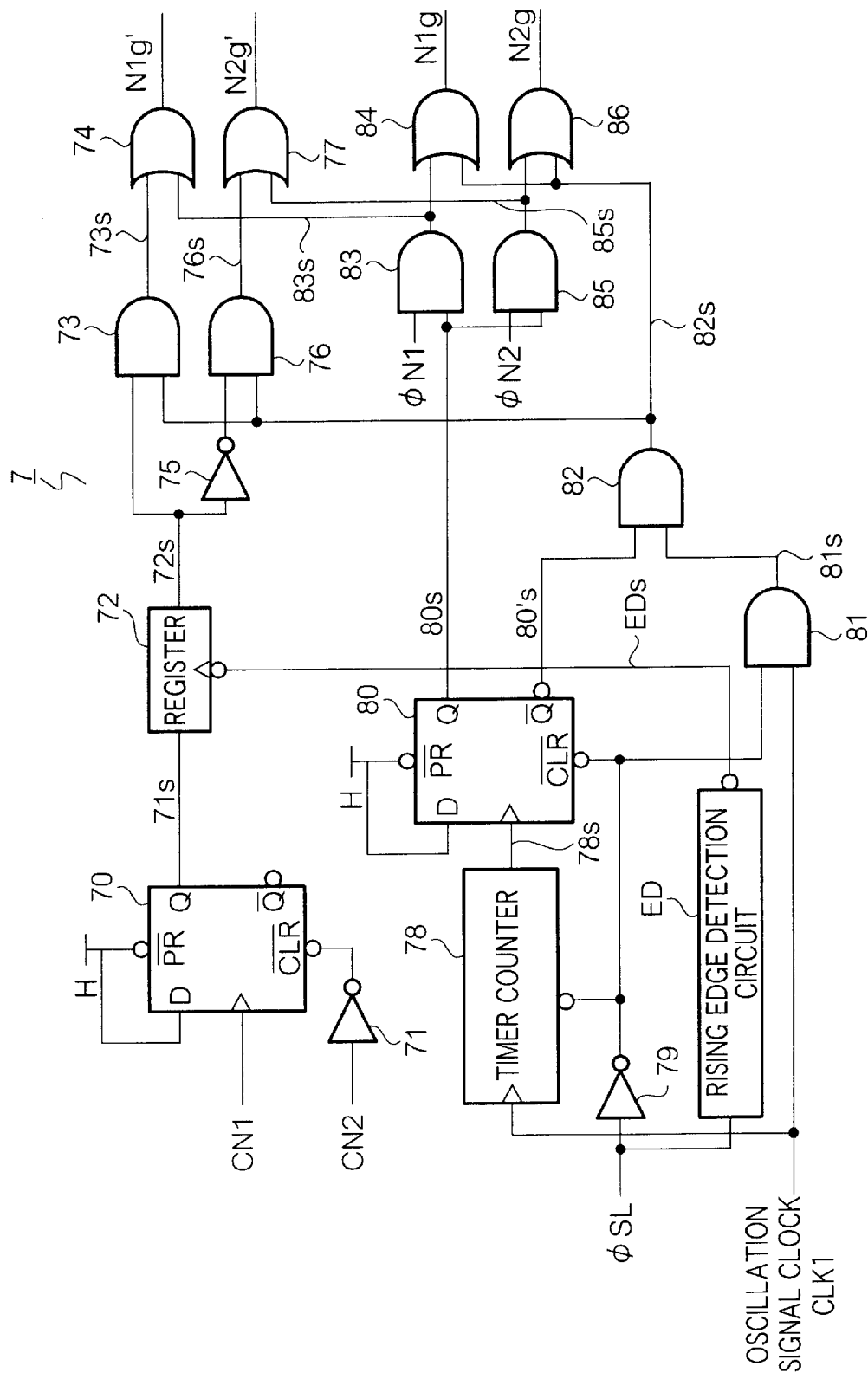
FIG. 7 is a circuit diagram of an auxiliary capacitor selection unit of the chopper charging circuit.

Next, the circuit diagram of an auxiliary capacitor selection unit 7 is shown in FIG. 7. The auxiliary capacitor selection unit 7 mainly has first through third functions. The first function is a function for specifying one output terminal between the output terminals AG1 and AG2 with the induced voltage of a positive polarity generated thereat immediately before the end of the power generation and selecting the auxiliary capacitor connected to the other output terminal for preparing for the next power generation. The second function is a function for controlling the N-channel FETs N1, N1', N2, and N2' so as to discharge the charge stored in the auxiliary capacitor C1 or C2. A third function is a function for controlling the N-channel FETs N1 and N2 so as to chopper boost the induced voltage.

First, an explanation will be made of the configuration according to the first function. As mentioned above, the output signal CN1 of the AG2 detection unit 3 becomes the high level when the voltage of the output terminal AG2 is over the reference voltage Vref1, while the output signal CN2 of the AG1 detection unit 4 becomes the high level when the voltage of the output terminal AG1 is over the reference voltage Vref2. The signal CN1 is supplied to the clock terminal of the second latch circuit 70, while the signal CN2 is supplied via an inverter 71 to a clear terminal thereof. For this reason, an output signal 71s of a second latch circuit 70 becomes the high level when at the output terminal AG2 side appears a positive polarity induced voltage, while becomes the low level when at the output terminal AG1 side appears a positive polarity induced voltage. Namely, by the logic level of the signal 71s, it can be specified on which terminal side between the output terminals AG1 and AG2 a positive polarity induced voltage is generated. In the following explanation, the signal 71s will be referred to as an induced voltage terminal specification signal 71s.

Next, a register 72 is configured by for example a D flip-flop. It fetches the logic level of the data input terminal and outputs the same when the voltage of the clock terminal changes from the high level to low level. This data input terminal is supplied with the induced voltage terminal specification signal 71s.

Next, the output signal ΦSL of the power generation detection unit 10 becomes the low level in the power generation period as mentioned above, while becomes the high level in the power non-generation period. Here, a rising edge detection circuit ED generates a power generation end signal EDs which becomes the low level for only a short time synchronous to the rising edge of the signal ΦSL. The clock terminal of the register 72 is supplied with the power generation end signal EDs, so the register 72 stores the logic level of the induced voltage terminal specification signal 71s at the end of the power generation. Then, the register 72 outputs this storage state as a power generation terminal selection signal 72s.

This power generation terminal selection signal 72s is output as a signal N1g' to the N-channel FET N1' for selecting the auxiliary capacitor C1 via an AND circuit 73 and an OR circuit 74, while is output to the N-channel FET N2' for selecting the auxiliary capacitor C2 via an inverter 75, an AND circuit 76, and an OR circuit 77. Details will be mentioned later, but at least in the period where the signal ΦSL is at the high level, that is, in the state where the next power generation is awaited in the power non-generation state, the signals supplied to the AND circuits 73 and 76 have been the high level, and the signals supplied to the OR circuits 74 and 77 have been the low level. Accordingly, in the state of waiting for the next power generation, the logic level of the signal N1g' coincides with the logic level of the power generation terminal selection signal 72s, and the logic level of a signal N2g' becomes the level inverted from the logic level of the power generation terminal selection signal 72s.

For example, assuming that the output terminal AG2 side has a positive polarity induced voltage immediately before the end of the power generation, the induced voltage terminal specification signal 71s becomes the high level indicating the output terminal AG2. This is stored by the register 72, therefore, in the state of waiting for the next power generation, the power generation terminal selection signal 72s becomes the high level. For this reason, in the standby state, the signal N1g' becomes the high level, the N-channel FET N1' becomes the ON state, and the auxiliary capacitor C1 is selected. On the other hand, the signal N2g' becomes the low level and the N-channel FET N2' becomes the OFF state, so the auxiliary capacitor C2 becomes unselected. Accordingly, the auxiliary capacitor C1 connected to the output terminal AG1 where the induced voltage is generated at the next power generation is selected in the standby state. Namely, the auxiliary capacitor selection unit 7 is configured so as to specify the output terminal where the positive polarity induced voltage is generated immediately before the end of the power generation based on the signals CN1 and CN2 for specifying the output terminal where the positive polarity induced voltage is generated and select the auxiliary capacitor connected to the output terminal of the low voltage side (other output terminal).

By the first function explained above, after the power generation is terminated, the auxiliary capacitor connected to the output terminal on the side where the positive polarity induced voltage is generated next can be selected in advance. Therefore, when the induced voltage is generated next, the auxiliary capacitor is immediately charged. Consequently, the induced voltage generated immediately after the start of the power generation of the AC generator AG can be used to start the boosting operation using the auxiliary capacitor and to make the detection of the power generation at the power generation detection unit 10 faster.

Next, an explanation will be made of the configuration according to the second function. A signal ΦN1 is the output signal of the OR circuit OR1 shown in FIG. 1. The logic level thereof coincides with the clock signal CLK1 when the signal CN1 is at the low level (when the output terminal AG2 side does not generate the positive polarity induced voltage), while becomes the high level when the signal CN1 is at the high level (when the output terminal AG2 side generates the positive polarity induced voltage). Further, a signal ΦN2 is the output signal of the OR circuit OR2 shown in FIG. 1. The logic level thereof coincides with the clock signal CLK1 when the signal CN2 is at the low level (when the output terminal AG1 side does not generate the positive polarity induced voltage), while becomes the high level when the signal CN2 is at the high level (when the output terminal AG1 side generates the positive polarity induced voltage). If the usual chopper boosting operation is carried out, the N-channel FET between the N-channel FETs N1 and N2 connected to the output terminal on the side where the positive polarity induced voltage is generated may be turned ON or OFF and, at the same time, the N-channel FET connected to the other output terminal may be brought to the ON state. Accordingly, the N-channel FET N1 may be controlled by using the signal ΦN1 and, at the same time, the N-channel FET N2 may be controlled by using the signal ΦN2.

In this example, the induced voltage is boosted by using the auxiliary capacitors C1 and C2, so a charge is stored in the selected auxiliary capacitor at the point of time when the signal ΦSL shifts from the high level to low level. For this reason, in the period where the signal ΦSL becomes the low level and the power is supplied to the AG2 detection unit 3 and the AG1 detection unit 4, when the auxiliary capacitors C1 and C2 are separated from the low potential side line LL and the N-channel FETs N1 and N2 are chopper operated, the charge remains at the selected auxiliary capacitor at the point of time when the power generation is terminated. Then, the charge remains even at the point of time when the related auxiliary capacitor is selected next, so the voltage of the output terminal connected to the related auxiliary capacitor becomes the high level irrespective of the fact that no induced voltage is generated between output terminals of the AC generator AG. For this reason, the power generation detection unit 10 erroneously detects the power generation state by a very small induced voltage.

Therefore, in this example, two reset steps are provided so as to discharge the charge stored in the auxiliary capacitor so as not to cause a malfunction. The first reset step is provided immediately after the commencement of the chopper boosting operation. In the first reset step, in the discharge period for discharging the charges charged in the auxiliary capacitors C1 and C2, the N-channel FET connected to the selected auxiliary capacitor is turned ON or OFF and the N-channel FET for the chopper drive connected in parallel to this N-channel FET is synchronously operated. Note that, in the first reset step, the chopper boosting operation is not carried out.

Further, a second reset step is provided during the period where the chopper boosting operation is carried out. In the second reset step, the N-channel FET for the chopper drive connected to the output terminal where the induced voltage is generated is turned ON or OFF and, at the same time, the N-channel FET for selecting the auxiliary capacitor connected to this the N-channel FET in parallel is synchronously operated. By these reset steps, the charge in the auxiliary capacitor will be surely released.

A timer counter 78 shown in FIG. 7 is used for counting the discharge period for discharging the auxiliary capacitors C1 and C2. The timer counter 78 is configured so as to reset the count when the voltage of the reset terminal becomes the low level and, at the same time, generates a ripple carry signal 78s which becomes the high level when the count becomes the predetermined value. Further, as shown in the FIG. 7, the clock signal CLK1 is supplied to the clock terminal of the timer counter 78, and the signal $\Phi$SL is supplied via an inverter 79 to the reset terminal thereof. Accordingly, the timer counter 78 starts the count of the clock signal CLK1 when the signal $\Phi$SL shifts from the high level to low level (when the detection of the power generation state in the power generation detection unit 10 is reached). Then, when the count reaches the predetermined value, the logic level of the ripple carry signal 78s is changed to the high level.

Next, a first latch circuit 80 becomes the high level synchronous to the rising of the ripple carry signal 78s and outputs a signal 80s which becomes the low level synchronous to the rising of the signal $\Phi$SL and a signal 80s' inverted from this signal 80s. The signal 80s' becomes the high level in the discharge period, while the signal 80s is the signal which becomes the low level in the discharge period.

Next, the AND circuit 81 outputs the AND logic between the signal inverted from the signal $\Phi$SL by the inverter 79 and the clock signal CLK1 as a signal 81s. Further, an AND circuit 82 outputs the AND logic between the signal 81s and the signal 80s' as a signal 82s. Accordingly, the signal 82s becomes the clock signal CLK1 in the discharge period.

Next, an AND circuit 83 outputs the AND logic between the signal 80s and the signal $\phi$N1 as a signal 83s. Further, an OR circuit 84 outputs the OR logic of the signal 83s and the signal 82s as the signal N1g to the gate terminal of the N-channel FET N1. Accordingly, the signal N1g coincides with the clock signal CLK1 in the discharge period and coincides with the signal $\Phi$N1 in the non-discharge period. Further, an AND circuit 85 outputs the AND logic between the signal 80s and the signal $\Phi$N2 as a signal 85s. Further, an OR circuit 86 outputs the OR logic of the signal 85s and the signal 82s as the signal N29 to the gate terminal of the N-channel FET N2. Accordingly, the signal N2g coincides with the clock signal CLK1 in the discharge period, while coincides with the signal $\Phi$N2 in the non-discharge period.

Next, the AND circuit 73 outputs the AND logic between the signal 82s and the power generation terminal selection signal 72s as the signal 73s. Further, the OR circuit 74 outputs the OR logic of the signal 83s and the signal 73s as the signal N1g' to the gate terminal of the N-channel FET N1'. Accordingly, assuming that the power generation terminal selection signal 72s is at the high level, the signal N1g' coincides with the clock signal CLK1 in the discharge period and coincides with the signal $\Phi$N1 in the non-discharge period. Namely, in the state where the auxiliary capacitor C1 is selected and a charge is stored there, in the discharge period, the N-channel FET N1' will be turned ON or OFF according to the clock signal CLK1. On the other hand, in the discharge period, the N-channel FET N1 turns ON or OFF according to the clock signal CLK1. Accordingly when the clock signal CLK1 becomes the high level, the N-channel FET N1 and the N-channel FET N1' simultaneously become the ON state, and the auxiliary capacitor C1 will be discharged (first reset step).

Further, even in the non-discharge period (chopper operation period), when the clock signal CLK1 becomes the high level, the N-channel FET N1 and the N-channel FET N1' simultaneously become the ON state, so that the auxiliary capacitor C1 will be discharged (second reset step). This is true also for the signal N2g' corresponding to the auxiliary capacitor C2. By controlling the N-channel FETs N2 and N2' by the signals N2g and N2g', the first reset step and the second reset step are executed.

In addition, in the power non-generation period, the signal N1g coincides with the signal $\Phi$N1, and the signal N2g coincides with the signal $\Phi$N2, therefore the N-channel FETs N1 and N2 can be controlled so as to chopper boost the induced voltage. Accordingly, the auxiliary capacitor selection unit 7 can realize the third function mentioned above.

Next, the NOR circuit NOR1 shown in FIG. 1 detects whether or not the voltages of the output terminals AG1 and AG2 have exceeded the reference voltages Vref1 and Vref2 based on the signal $\Phi$N1 and the signal $\Phi$N2. Here, the reference voltages Vref1 and Vref2 of the AG2 detection unit 3 and the AG1 detection unit 4 are set at small values in comparison with for example the reference voltage Vref of the power generation detection unit 10. The reference voltage Vref and the reference voltages Vref1 and Vref2 are set in this way for the following reasons.

First, the reference voltage Vref becomes the reference for judging whether or not it is in the power generation state. When the power generation state is detected by this judgement, power is sequentially supplied to the portions of the chopper circuit 20. On the other hand, pulse-like noise is sometimes induced at the output coil L of the AC generator AG due to an electromagnetic wave or the like. Due to such noise, when detecting the power generation state and supplying power to the AG2 detection unit 3 and the AG1 detection unit 4, the power consumed there becomes useless and the charging efficiency is conversely lowered.

Therefore, in the present embodiment, the reference voltage Vref is set relatively high so as not to be influenced by noise or the like. Further, even if the reference voltage Vref is set in this way, the induced voltage by the AC generator AG is boosted two fold by the auxiliary capacitors C1 and C2 and the diodes d1 and d2 as mentioned above, therefore it is possible to quickly detect the generation of the induced voltage. In addition, even if a pulse-like electromagnetic noise is mixed into the output coil L, it is integrated by the auxiliary capacitors C1 and C2, so there are extremely few erroneous detection of power generation. Contrary to this, the reference voltages Vref1 and Vref2 were set at relatively low voltage values because power is supplied to the AG2 detection unit 3 and the AG1 detection unit 4 after it is detected that they are in the power generation state. Namely, in the present embodiment, the precision of detection of the power generation state is extremely high, so there is no problem even if the reference voltages Vref1 and Vref2 are set at relatively low voltage values.

Next, a NOR circuit NOR2 shown in FIG. 1 obtains the negative OR logic of the signal ΦN and the clock signal CLK and supplies the output signal thereof to the OR circuits OR1 and OR2. For this reason, in the period where the signal ΦN is at the high level, the clock signal is not supplied to the OR circuits OR1 and OR2, and the chopper operation is not carried out. In this sense, the NOR circuit NOR2 acts as a clock inhibit unit.

Next, the SR latch circuit 6 is configured so as to set the output signal at the low level when the set terminal S becomes the low level and set the output signal at the high level when the reset terminal R becomes the low level. For example, the SR latch circuit 6 can be made of an inverted type SR flip-flop. In this example, the signal ΦN is supplied to the set terminal S, therefore when the signal ΦN becomes the low level, that is, when the voltages of the output terminals AG1 and AG2 exceed the reference voltages Vref1 and Vref2, the signal ΦS latched by the SR latch circuit 6 becomes the low level. As mentioned above, the Vdd detection units 1 and 2 are supplied with power and operate when the signal ΦS becomes the low level, therefore when the voltages of the output terminals AG1 and AG2 exceed the reference voltages Vref1 and Vref2, the Vdd detection units 1 and 2 can be operated.

The two steps of threshold values are provided and the supply of the power is controlled for the following reason. As in this example, in the chopper charging circuit 100, the purpose is to boost the small induced voltage. It is necessary to detect the power generation state of the AC generator AG with a voltage which is slightly over the voltage of the ground GND as the reference voltage and control the supply of the power to the AG2 detection unit 3 and the AG1 detection unit 4 and further the Vdd detection units 1 and 2 based on the detection result.

However, if the reference voltage is set at a small value, when an induced voltage is induced between the output terminals AG1 and AG2 due to an external disturbance such as a magnetic field or when a small induced voltage that cannot be charged even if boosted by the user's of the wristwatch slightly moving his or her arm is generated, the voltages of the output terminals AG1 and AG2 do not exceed the power supply voltage Vdd, and the charging current cannot be obtained after all. In such a case, if power is supplied to the comparators COM1 and COM2 which operate at a high speed but consume a large current and the current is consumed, the charging efficiency is lowered. Therefore, in the present embodiment, the reference voltage Vref and the reference voltages Vref1 and Vref2 are used to monitor the induced voltage of the AC generator AG and control the supply of power to the comparators to achieve a reduction of the current consumption.

Further, along with the control of the supply of power, the current consumption of the comparators COM1 to COM6 are determined as follows.

COM1 and COM2>COM3 and COM4>COM5 and COM6

The current consumption of the comparators COM5 and COM6 are set the smallest because they are provided inside the power generation detection unit 10 and it is necessary to constantly monitor the induced voltage of the AC generator AG. Further, the current consumption of the comparators COM1 and COM2 are set the largest because it is detected by them that the voltages of the output terminals AG1 and AG2 exceed the power supply voltage Vdd as the condition of the charging. Further, the current consumption of the comparators COM3 and COM4 are set small in comparison with the comparators COM1 and COM2 because the comparators COM3 and COM4 detect prerequisite conditions of the charging, so may operate slow in comparison with the comparators COM1 and COM2. Note that the comparators COM3 and COM4 must operate the N-channel FETs N1 and N2 up until the voltage between the output terminals AG1 and AG2 exceeds the power supply voltage Vdd, so must be given a response speed to an extent that satisfies this.

By setting the current consumption in this way, the power can be supplied in the order from the one consuming the smallest current to the one consuming the largest current, therefore the charging efficiency can be improved by reducing the current consumption more. Specifically, the total current consumption in the comparators COM1 to COM4 is about 500 nA. In contrast, the current consumption of the comparators COM5 and COM6 is about 10 nA. Accordingly, the current consumption at the time of standby can be made about 1/50 of that at the time of normal operation.

The smaller the current consumption, the slower the operation of the comparator, therefore when the current consumption are set as mentioned above, even if the AC generator AG changes from the power generation state to the power non-generation state, the power non-generation state cannot be detected soon. Then, when the AC generator AG further changes from the power non-generation state to the power generation state, the change in state is detected after the elapse of the delay time of the comparators COM5 and COM6.

Accordingly, when the AC generator AG repeats the power generation state and the power non-generation state in a short cycle, there is an inconvenience that the charging can be carried out in only part of the period irrespective of the fact that there is a period where the induced voltage of the AC generator AG exceeds the power supply voltage Vdd and satisfies the conditions of the charging in the power generation state.

Therefore, in the present embodiment, power is continuously supplied for a constant time after detecting that the voltages of the output terminals AG1 and AG2 become lower than the reference voltages Vref1 and Vref2 in the comparators COM3 and COM4, and the supply of power is suspended after the elapse of the predetermined time.

Specifically, by the change of the output signal ΦN of the NOR circuit NOR1 from the low level to high level, when it is detected that the voltages of the output terminals AG1 and AG2 become lower than the reference voltages Vref1 and Vref2, the signal ΦN is supplied via the NOR circuits NOR2 and NOR3 to the reset terminal R of the timer counter 5 as a signal ΦR. Here, the timer counter 5 is configured so as to count the clock signal CLK and output the ripple carry signal which becomes the level when the count reaches the predetermined value as a signal ΦR1 and reset the count to 0 when the reset terminal R becomes the low level.

Accordingly, when the signal ΦN changes from the low level to the high level, the signal ΦR changes from the low level to the high level along with this, the reset is released, and the count of the time by the timer counter 5 is commenced. Then, when the state where the signal ΦN is at the high level, that is, the power non-generation state continues for a predetermined time and the count reaches the predetermined value, the signal ΦR1 becomes the low level and the latch unit 6 is reset. As mentioned above, the latch unit 6 makes the output signal ΦS the high level when reset, therefore the signal ΦS becomes the high level at first by this, and the supply of the power to the comparators COM1 and COM2 is suspended. Further, when the signal ΦS is supplied to the power generation detection unit 10, the signal ΦS is output as the signal ΦSL via an inversion circuit 12 and a NOR circuit 13, and the supply of the power to the comparators COM3 and COM4 is suspended by this.

On the other hand, when the voltages of the output terminals AG1 and AG2 exceed the reference voltages Vref1 and Vref2 and the signal ΦN becomes the low level during the count by the timer counter 5, the timer counter 5 is reset again, therefore the latch unit 6 is not reset and the signal ΦS is maintained at a low level as it is. Namely, the timer counter 5 keeps time of the power non-generation state. And the supply of power to the comparators COM1 to COM4 is suspended only when the power non-generation state continues for the predetermined time.

Figure 8:
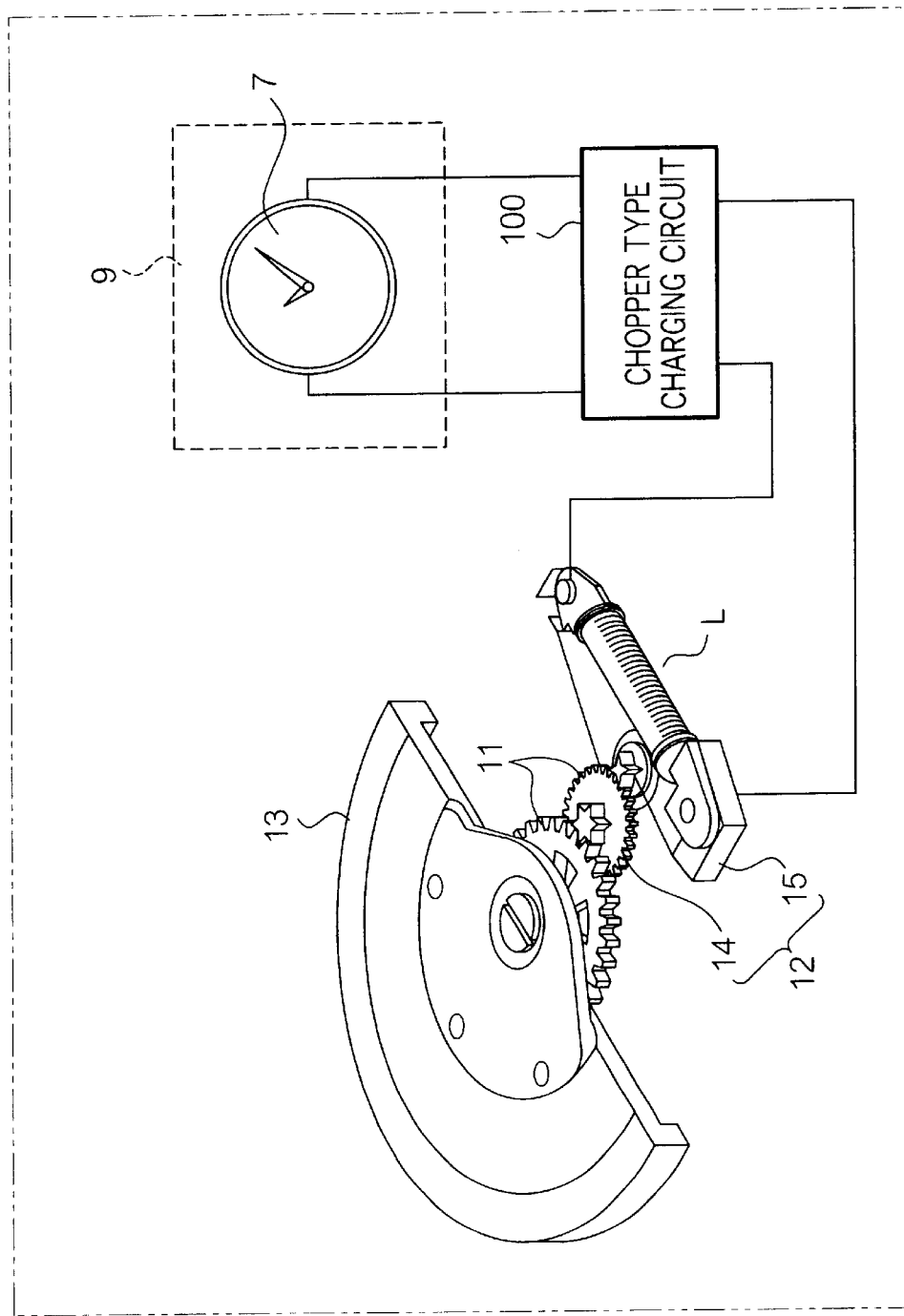
FIG. 8 is a perspective diagram of the configuration of an AC generator AG of the embodiment and its peripheral mechanisms.

Next, an explanation will be made of the configurations of the AC generator AG and the peripheral mechanism thereof. FIG. 8 is a perspective view of the configurations of the AC generator AG and the peripheral mechanism thereof. As illustrated, the AC generator AG is provided with a rotor 14 and a stator 15. When the disk-shaped rotor 14 bipolar magnetized rotates, an induced voltage is generated at the output coil L of the stator 15 and an AC output can be taken out. Further, in the figure, 13 is a oscillating weight engaging in a swiveling motion in a wristwatch body case, while 11 is a wheel train mechanism for transferring the rotating motion of the oscillating weight 13 to the power generator AG. The oscillating weight 13 rotates in accordance with the swing of the arm of the person wearing the wristwatch. The induced voltage can be obtained from the AC generator AG along with this.

The AC voltage output from the AC generator AG is rectified at the chopper charging circuit 100 of the present embodiment and supplied to a processor 9. The processor 9 drives a timepiece 7 by power supplied from the chopper charging circuit 100. This timepiece 7 is configured by a crystal oscillator, a counter circuit, etc., divides the frequency of a master clock signal created at the crystal oscillator at the counter circuit, and counts the time based on the result of division of the frequency. In this example, the master clock signal or the signal obtained by dividing the frequency thereof is supplied as the clock signal CLK to the chopper charging circuit 100. Accordingly, a circuit for creating the clock signal CLK can be formed by the chopper charging circuit 100 and the timepiece 7. Consequently, the circuit configuration is simplified and, at the same time, the current consumption can be reduced in the wristwatch as a whole.

Figure 9:
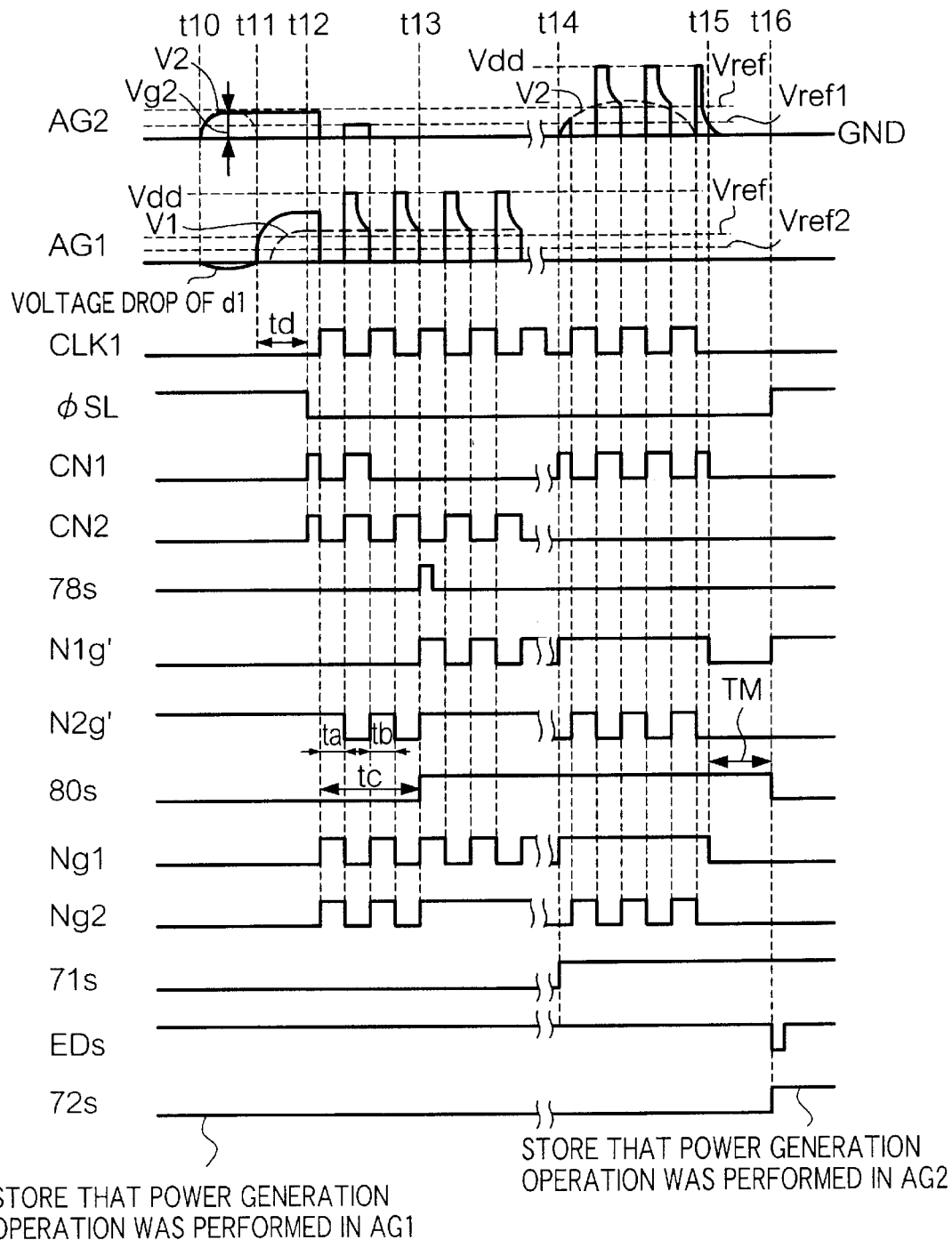
FIG. 9 is a timing chart of an operation of the chopper charging circuit.

Next, an explanation will be made of the operation of the present embodiment by referring to the drawings. FIG. 9 is a timing chart of the chopper charging circuit 100 according to the present embodiment. Note that, in this example, it is assumed that the N-channel FET N2' connected to the auxiliary capacitor C2 has become the ON state and the N-channel FET N1' connected to the auxiliary capacitor C1 has become the OFF state in the power non-generation state. Further, FIGS. 10, 11, 12, and 13 are flowcharts of the chopper charging circuit 100 according to the present embodiment.

First, at a time t10, assuming that the user moves his or her arm wearing the wristwatch, the AC generator AG starts to generate power. At this time, assuming that an induced voltage V2 is generated on the AG2 side as shown in FIG. 9, the auxiliary capacitor C2 is charged by this (SP1A to SP3A). For this reason, the voltage of the output terminal AG2 is not lowered even if the induced voltage V2 is reduced.

Next, at a time t11, when the induced voltage V2 on the AG2 side becomes "0" and conversely the induced voltage V1 is generated on the AG1 side, the voltage of the output terminal AG1 becomes a value obtained by adding the voltage Vg2 charged in the auxiliary capacitor C2 and the induced voltage V1 as shown in FIG. 9 (from SP1 via SP2 and SP30 to SP31). For this reason, immediately after the time t11, the voltage of the output terminal AG1 exceeds the reference voltage Vref. Then, the power generation detection unit 10 detects the power generation state (SP5). Note, comparators consuming a low power are used for the comparators COM5 and COM6 of the power generation detection unit 10, so the time when the signal ΦSL rises from the high level to low level becomes a time t12 after an elapse of the response time td as shown in FIG. 9.

When the time t12 is reached, the signal ΦSL becomes the low level, so power is supplied to the AG2 detection unit 3 and the AG1 detection unit 4, the voltage of the output terminal AG2 is compared with the reference voltage Vref1 and, at the same time, the voltage of the output terminal AG1 is compared with the reference voltage Vref2 (SP6). Here, the reference voltages Vref1 and Vref2 are set lower than the reference voltage Vref, so both of the output signals CN1 and CN2 of the AG2 detection unit 3 and the AG1 detection unit 4 become the high level as shown in FIGS. 9E and 9F.

Further, when the signal ΦSL becomes the low level, the timer counter 78 of the auxiliary capacitor 7 shown in FIG. 7 counts the rising edge of the clock signal CLK1 (refer to FIG. 9) (SP7 to SP11). Assuming that the timer counter 78 makes the ripple carry signal 78s the high level when the count reaches "3", the ripple carry signal 78s becomes the high level when a time t13 is reached as shown in FIG. 9. Then, the output signal 80s of the first latch circuit 80 rises synchronous to the ripple carry signal 78s as shown in FIG. 9 and falls synchronous to the rising of the signal ΦSL. Here, the symbol tc indicated in FIG. 9 is the discharge period. In this period, the auxiliary capacitor selection unit 7 executes the first reset step.

A signal 80s' is the signal inverted from the signal 80s, so the signal 80s' becomes the high level in the discharge period tc (SP12). Accordingly, the output signal 82s of the AND circuit 82 will coincide with the clock signal CLK1 in the related period tc. On the other hand, the AND circuits 73 and 76 operate as the selection circuits for selecting the output signal 82s and outputting in accordance with the logic level of the power generation terminal selection signal 72s. In this example, in the discharge period tc, the power generation terminal selection signal 72s has become the low level. Therefore, in the related discharge period tc, a signal 76s coincides with the clock signal CLK1, while a signal 73s remains the low level. In addition, in the discharge period tc, the signal 80s becomes the low level, so the signals 83s and 85s become the low level. Consequently, in the related period, the signal N2g' coincides with the clock signal CLK1, while the signal N1g becomes the low level (SP13). Further, since the signals 83s and 85s become the low level, both of the signal N1g as the OR logic of the signal 83s and the signal 82s and the signal N2g as the OR logic of the signal 85s and the signal 82s coincide with the clock signal CLK1.

In this way, in the discharge period tc, the logic levels of the signal N2g' and the signal N2g coincide with the clock signal CLK1. Therefore when the clock signal CLK1 is at the high level, the N-channel FETs N2 and N2' become the ON state, and the auxiliary capacitor c2 is discharged. In this example, the discharge is carried out in the periods ta and tb. Accordingly, at the point of time when the period tb is terminated, the potential of the output terminal AG2 becomes substantially equal to the potential of the ground GND.

When the auxiliary capacitor C2 is discharged in this way, the chopper operation period is shifted to. After the time t13, the AG1 side generates the induced voltage of the positive polarity, while conversely the potential of the output terminal AG2 is substantially equal to the potential of the ground GND. For this reason, the output signal CN1 of the AG 2 detection unit 3 becomes the low level, so the output signal ΦN1 of the OR circuit OR1 coincides with the clock signal CLK1. The signal N1g' is created so as to coincide with the signal ΦN1 by the AND circuit 83 and the OR circuit 74 in the period where the signal 80s is at the high level (SP14). On the other hand, after the time t13, the signal 80s has become the high level, so the signal N1g coincides with the clock signal CLK1 after the time t13 as shown in FIG. 9.

In this case, the signal N2g becomes the high level as shown in FIG. 9. Therefore, the N-channel FET N1 repeatedly is turned ON and OFF, while the N-channel FET N2 remains in the ON state. Accordingly, the induced voltage of the AC generator AG is chopper boosted. Then, when the voltage of the output terminal AG1 is over the power supply voltage Vdd, the P-channel FET P1 becomes the ON state. At this time, a closed loop is formed by AG1, P1, main capacitor 30, GND, N2, and AG2, so that the power generation current is stored in the main capacitor 30 (SP15).

Further, after the time t13, the signal N2g and the signal N2g' (refer to FIG. 9) coincide and, at the same time, the signal N1g and the signal N1g' (refer to FIG. 9) coincide. For this reason, in the period where the signals are at the high level, even if charges are stored in the auxiliary capacitors C1 and C2, they are discharged.

Next, at a time t14, when the output terminal AG2 side generates the positive polarity induced voltage V2 again, the output signal CN1 of the AG2 detection unit 3 rises. Then, the second latch circuit 70 latches the high level, so the induced voltage terminal specification signal 71s rises from the low level to high level as shown in FIG. 9 (denoted by SP40, SP40A, and SP41A in FIG. 12). Thereafter, converse to the case mentioned above, the N-channel FET N2 repeatedly turns ON and OFF, while the N-channel FETN1' remains in the ON state. Accordingly, the induced voltage of the AC generator AG is chopper boosted. Then, when the voltage of the output terminal AG2 becomes over the power supply voltage Vdd, the P-channel FET P2 becomes the ON state. At this time, a closed loop is formed by AG2, P2, main capacitor 30, GND, N1, and AG1, so that the power generation current is stored in the main capacitor 30 (SP15).

Then, when the induced voltage V2 is lowered and the voltage of the output terminal AG2 becomes lower than the reference voltage Vref1 at a time t15, the signal CN1 becomes the low level. The timer counter 5 is reset at the time t15, but is not reset after this, therefore when a charging end detection time TM elapses from the time t15 and a time t16 is reached, the signal ΦSL becomes the high level. Then, the rising edge detection circuit ED detects the rising edge of the signal ΦSL and generates a power generation end signal EDs shown in FIG. 9 (SP21, SP22). The register 72 stores the induced voltage terminal specification signal 71s synchronous to the power generation end signal EDs, so the power generation terminal selection signal 72s becomes the high level at the time t16 as shown in FIG. 9 (SP24, SP25). Accordingly, the output terminal AG2 where the power generation occurs immediately before the end of the power generation period is specified and, at the same time, after the time t16, for preparing for the next power generation, the N-channel FET N1' connected to the auxiliary capacitor C1 becomes the ON state (SP26)

As explained above, according to the chopper charging circuit 100 of the first embodiment, the induced voltage of the AC generator AG is boosted two fold by using the auxiliary capacitors C1 and C2, and the power generation detection unit 10 detects the power generation state based on the induced voltage boosted two fold, therefore even if the threshold voltage used for detecting the power generation state is set relatively high, the power generation state can be detected early. Further, even if the noise is induced at the output coil L, this is integrated by the auxiliary capacitors C1 and C2, therefore erroneous operations due to noise can be substantially eliminated.

Further, the chopper charging circuit 100 stores the charge in one auxiliary capacitor when boosting the induced voltage two fold, but discharges the charge immediately after the power generation state is detected. For this reason, a charge remains in the auxiliary capacitor. When power is next generated, the power generation detection unit 10 will not erroneously operate.

Further, in the chopper charging circuit 100, the power generation state of the AC generator AG is detected by using the reference voltage Vref. This is supplied to the comparators COM3 and COM4 even in a case where the power generation state is detected, therefore the currents consumed at the comparators COM3 and COM4 can be reduced. Further, power is supplied to the comparators COM1 and COM2 only when it is detected that the voltages of the output terminals AG1 and AG2 of the AC generator AG exceed the reference voltages Vref1 and Vref2 by the comparators COM3 and COM4, therefore the currents consumed at the comparators COM1 and COM2 can be reduced. In addition, the current consumptions at the comparators are determined in such a manner that COM1 and COM2>COM3 and COM4>COM5 and COM6, therefore power is supplied in the order from the one least consuming current, therefore the current consumption can be further reduced.

In addition, when the current consumption of a comparator is reduced, the response speed becomes slow, therefore a situation may occur where charging is not possible if the power non-generation state occurs once, then the power generation state is immediately shifted to however, in this example, the time during which the voltages of the output terminals AG1 and AG2 are continuously lower than the reference voltages Vref1 and Vref2 is counted by the timer counter 5. When this time reaches the predetermined time, it is deemed that the power non-generation state has occurred and the supply of the power is suspended, therefore the above problem does not occur. Accordingly, even if a comparator consuming a little current is used, the supply of power can be suspended by reliably detecting the power non-generation state. Therefore, the current consumption can be greatly reduced. Further, when the supply of the power to the comparators COM1 and COM2 is once commenced, power is continuously supplied to the comparators COM1 to COM4 until at least the charging end detection time TM set in the timer counter 5 elapses, therefore it becomes possible to charge with a good response even with a small induced voltage. Accordingly, this chopper charging circuit 100 can raise the charging efficiency in comparison with the chopper charging circuit of the related art.

Second Embodiment

Figure 14:
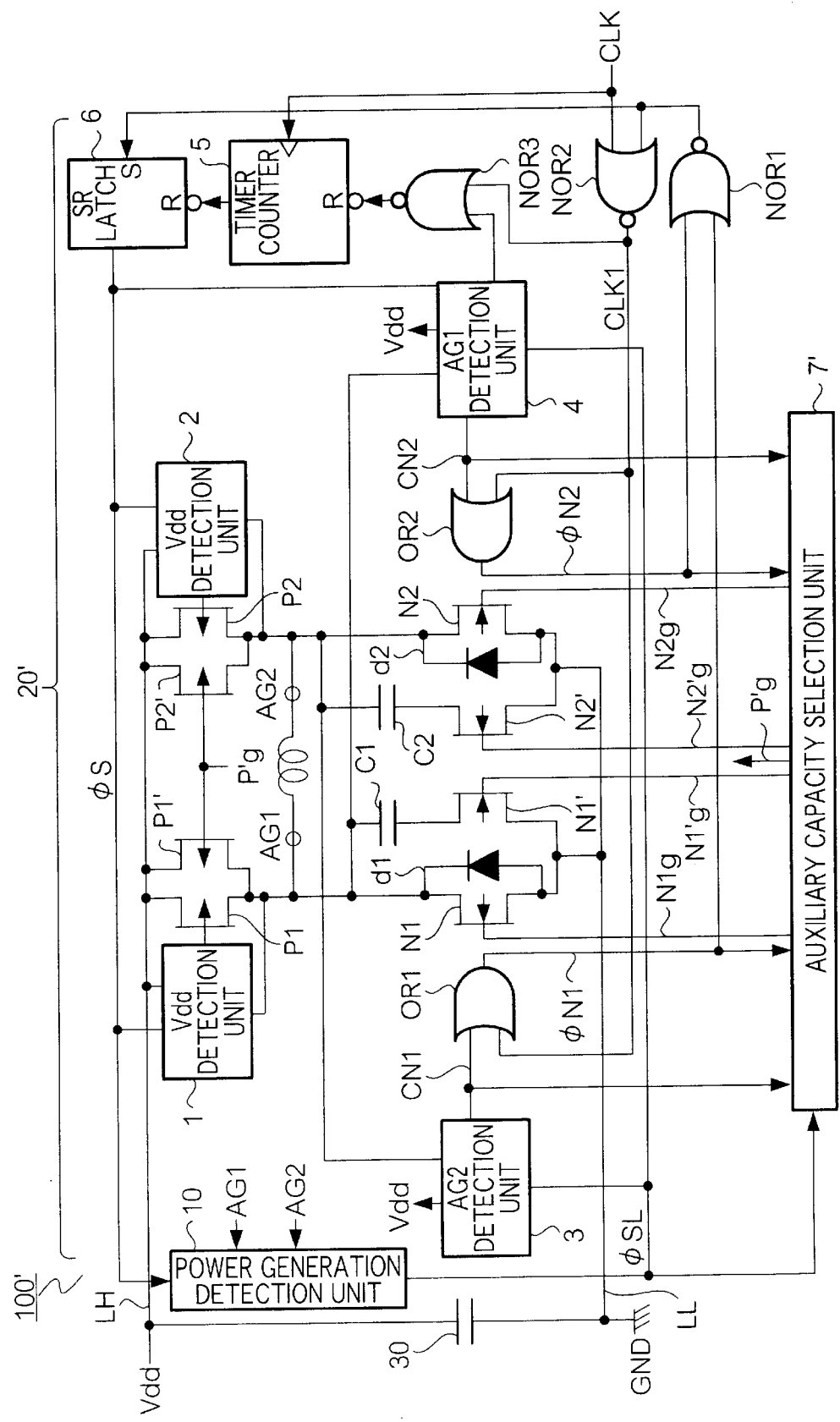
FIG. 14 is a circuit diagram of a chopper charging circuit according to a second embodiment.

FIG. 14 is a circuit diagram of a chopper charging circuit used in a wristwatch according to the present embodiment.

A chopper charging circuit 100' of the second embodiment is similarly configured except a charging circuit 20' is different from the chopper circuit 20 of the first embodiment shown in FIG. 1. In more detail, they are different in the point that P-channel FETs P1' and P2' are provided in parallel to the P-channel FETs P1 and P2 in the chopper circuit 20' and in the point that the signal Pg' for controlling the ON or OFF state of the P-channel FETs P1' and P2' in the auxiliary capacitor selection unit 7' is created.

In the same way as the first embodiment, in this chopper circuit 20' as well, the induced voltage generated between the output terminals AG1 and AG2 is boosted two fold by using the auxiliary capacitors C1 and C2 and the diodes d1 and d2. It should be noted that the chopper circuit 20 of the first embodiment releases the charge stored in the auxiliary capacitors C1 and C2, but in this chopper circuit 20', the charges stored in the auxiliary capacitors C1 and C2 are transferred to the main capacitor 30 to further raise the charging efficiency. While explained in detail later, the chopper circuit 20' simultaneously turns ON or OFF the P-channel FETs P1' and P2', by using the signal Pg' for the transfer of the charges. Then, in parallel to this, by turning OFF one N-channel FET (for example N1') connected to the auxiliary capacitor not storing a charge (for example C1) between the N-channel FETs N1' and N2', while turning ON or OFF the other N-channel FET (for example N2') complementarily with the P-channel FETs P1' and P2', the voltage stored in the auxiliary capacitor (for example C2) is chopper boosted. More concretely, in the period where the P-channel FETs P1' and P2' are simultaneously turned ON or OFF, when the P-channel FETs P1' and P2' are ON, the other N-channel FET is turned OFF, while when the P-channel FETs P1' and P2' are OFF, the other N-channel FET is turned ON.

Figure 15:
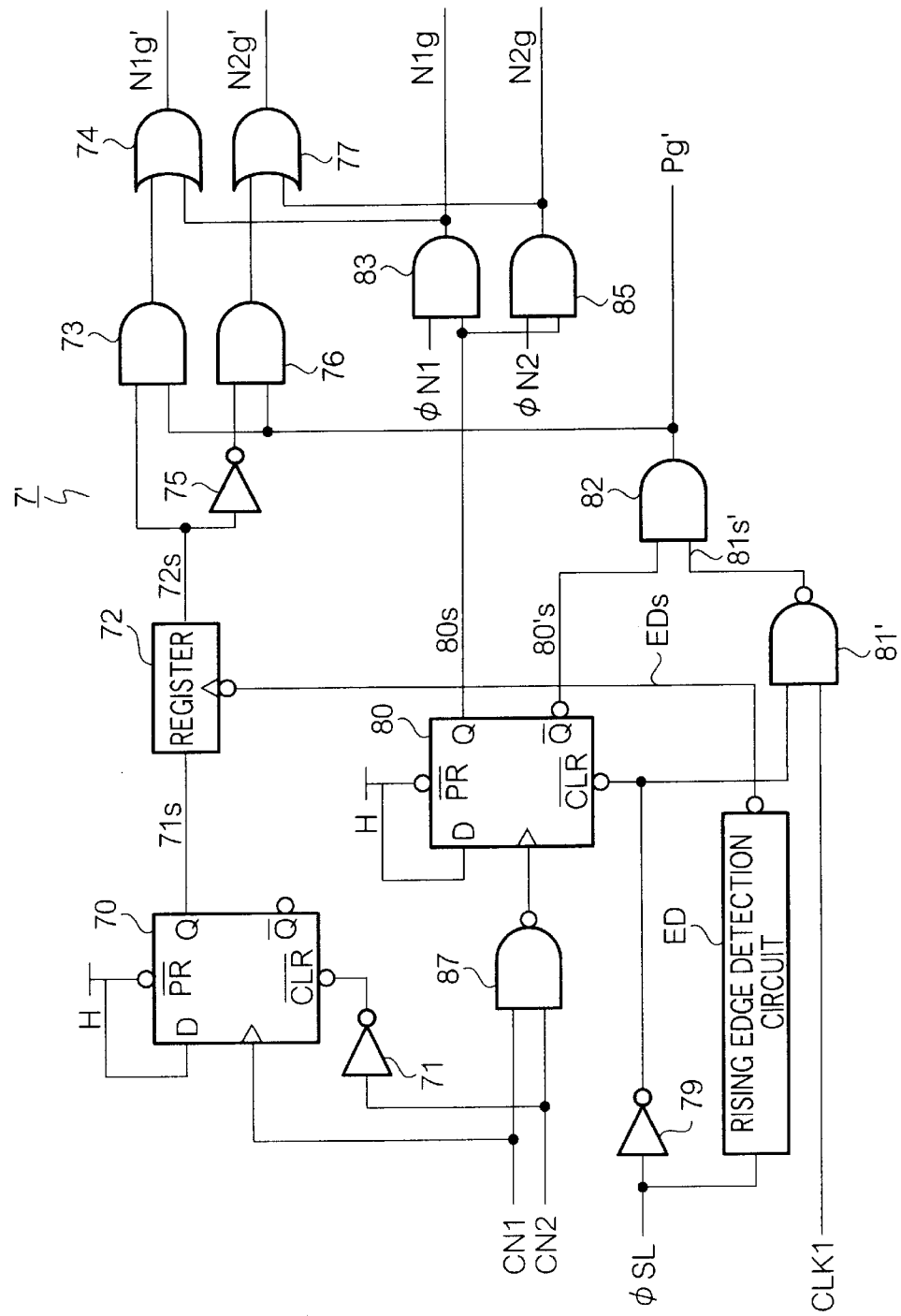
FIG. 15 is a circuit diagram of an auxiliary capacitor selection unit of the chopper charging circuit.

FIG. 15 is a circuit diagram of the auxiliary capacitor selection unit 7' for creating the signal Pg'. This auxiliary capacitor unit 7' is configured similar to the auxiliary capacitor selection unit 7 of the first embodiment shown in FIG. 7 except for the point that a NAND circuit 87 for calculating the AND logic between the signal CN1 and the signal CN2 is used in place of the timer counter 78, the point that the output signal of the AND circuit 82 is output as the signal Pg', the point that the OR circuits 84 and 85 are deleted and the output signals of the AND circuits 83 and 85 are output as the signals N1g and N2g, and the point that a NAND circuit 81' is used in place of the AND circuit 81.

Figure 16:
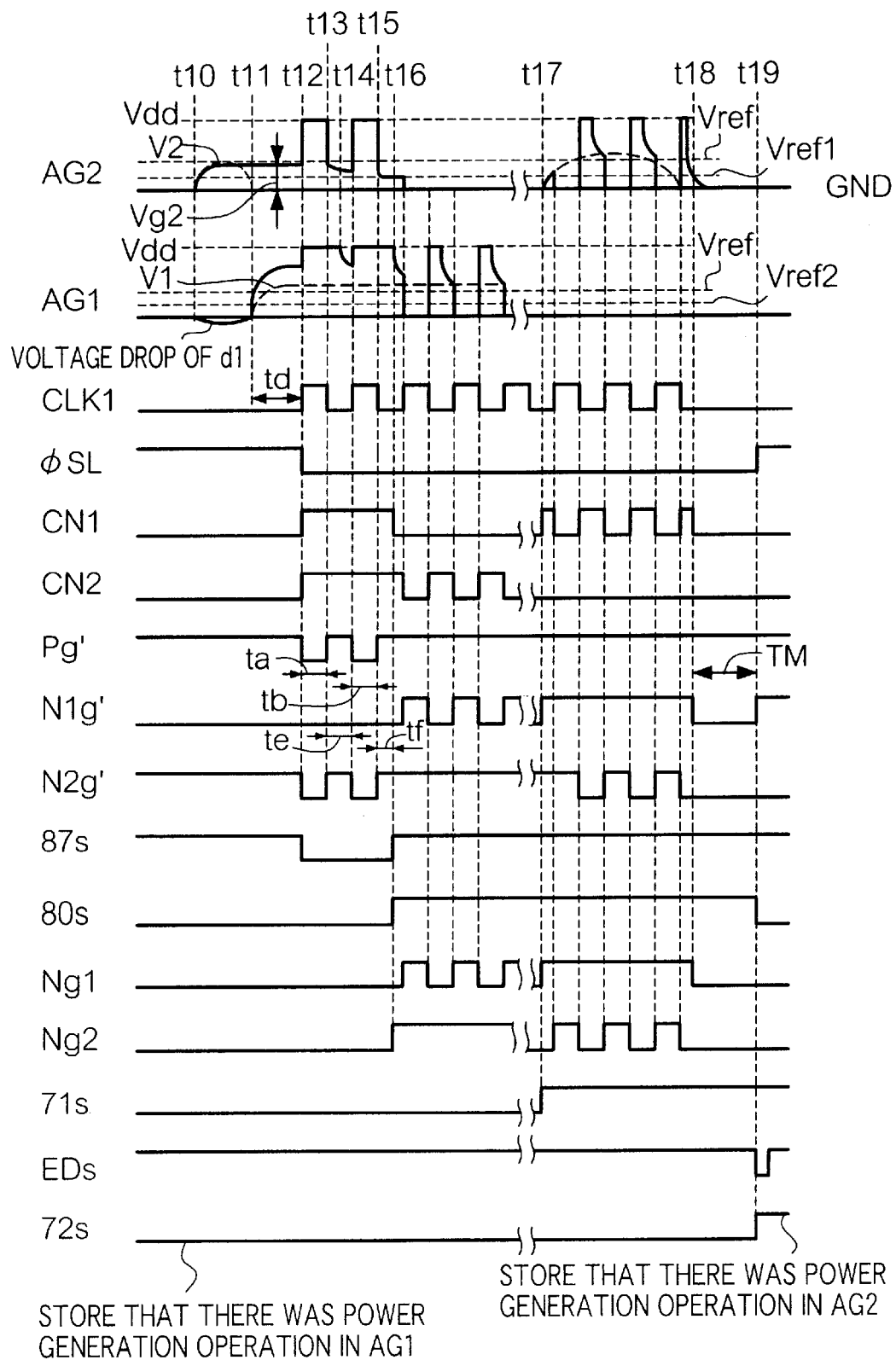
FIG. 16 is a timing chart of the operation of the chopper charging circuit.
Figure 17:
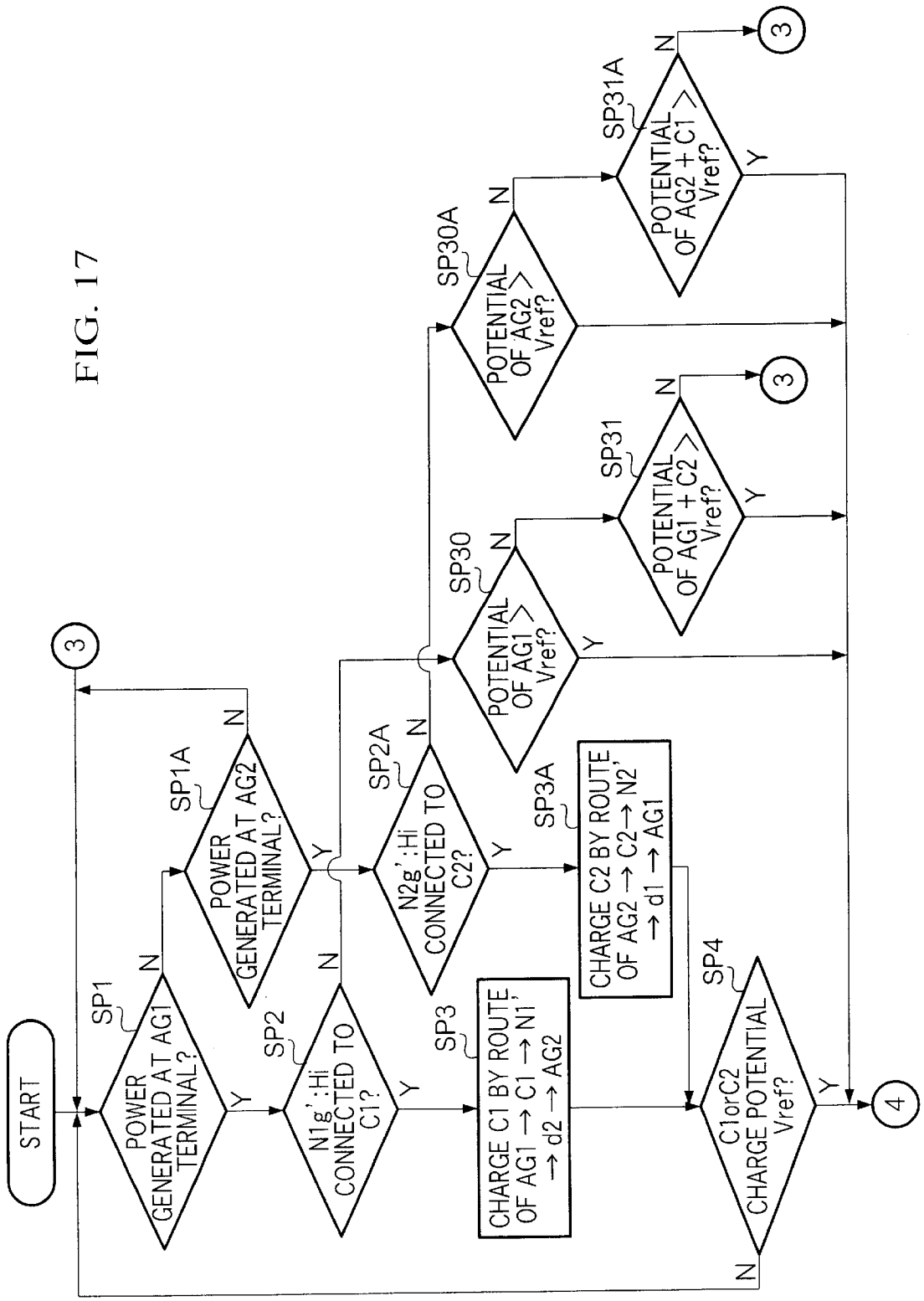
FIGS. 17 and 18 form a flowchart of the operation of the chopper charging circuit.
Figure 18:
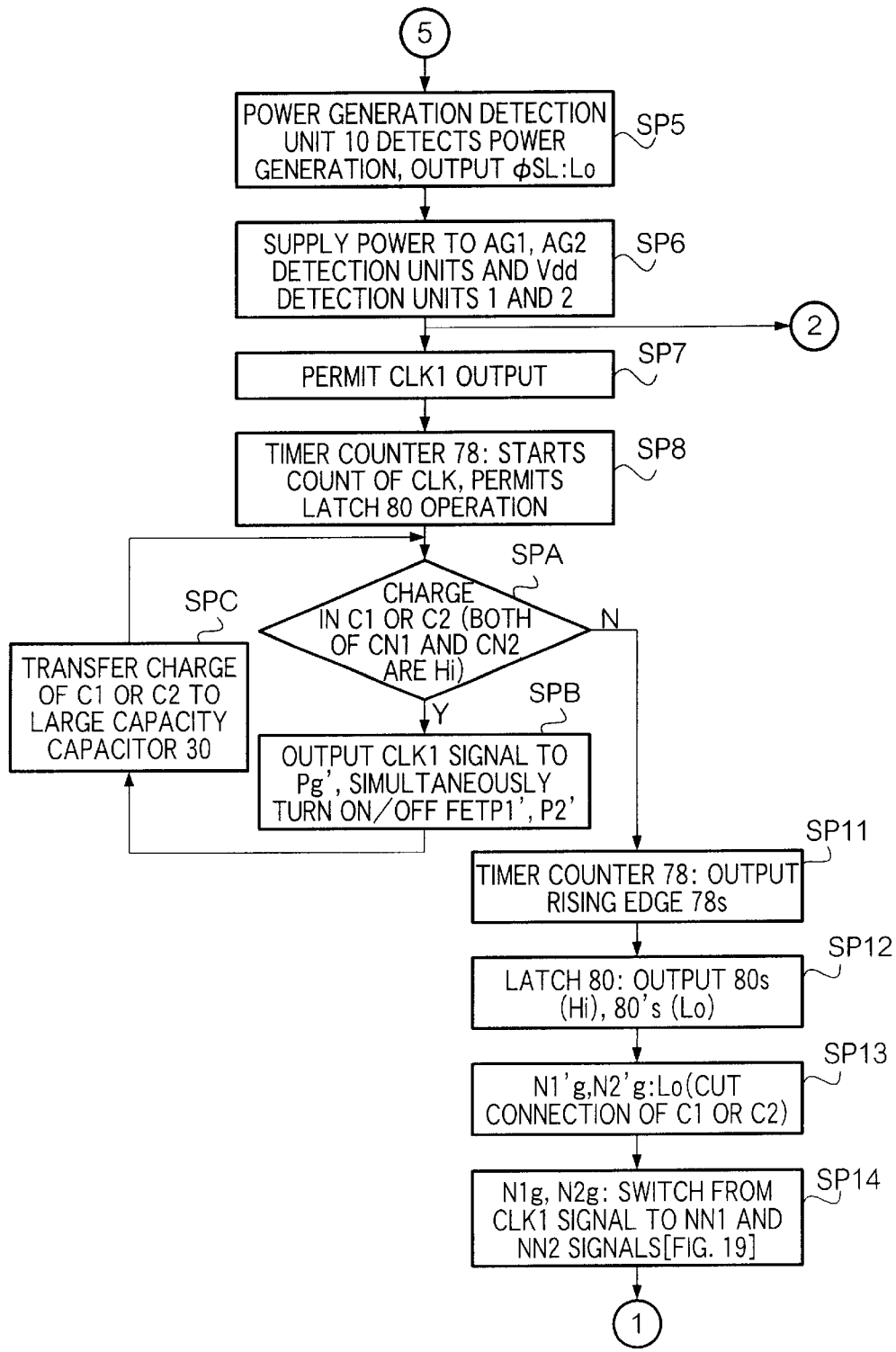

Next, an explanation will be given of the operation of the chopper charging circuit 100' according to the second embodiment. FIG. 16 is a timing chart of the chopper charging circuit 100' according to the present embodiment. Note that, in this example, it is assumed that the N-channel FET N2' connected to the auxiliary capacitor C2 has become the ON state and the N-channel FET N1' connected to the auxiliary capacitor C1 has become the OFF state in the power non-generation state (before the time t10). Here, the flowchart of the chopper charging circuit 100' is similar except for the point that SP9 and SP10 shown in FIG. 11 in the flowcharts shown in FIG. 10 to FIG. 13 mentioned above are replaced by SPA, SPB, and SPC. Therefore, flowcharts including different processings (SPA to SPC) are shown in FIG. 17 and FIG. 18, and FIG. 12 and FIG. 13 will be commonly used for the flowcharts after SP15.

First, at the time t10, if the user moves his or her arm wearing the wristwatch, the AC generator AG starts the power generation. At this time, assuming that the induced voltage V2 is generated on the AG2 side as shown in FIG. 16, a closed loop is formed of AG2, C2, N2', GND, d1, and AG1, so that the auxiliary capacitor C2 is charged by this (SPLA to SP3A). For this reason, the voltage of the output terminal AG2 is not lowered even if the induced voltage V2 is reduced due to the charging voltage of the auxiliary capacitor C2.

Figure 10:
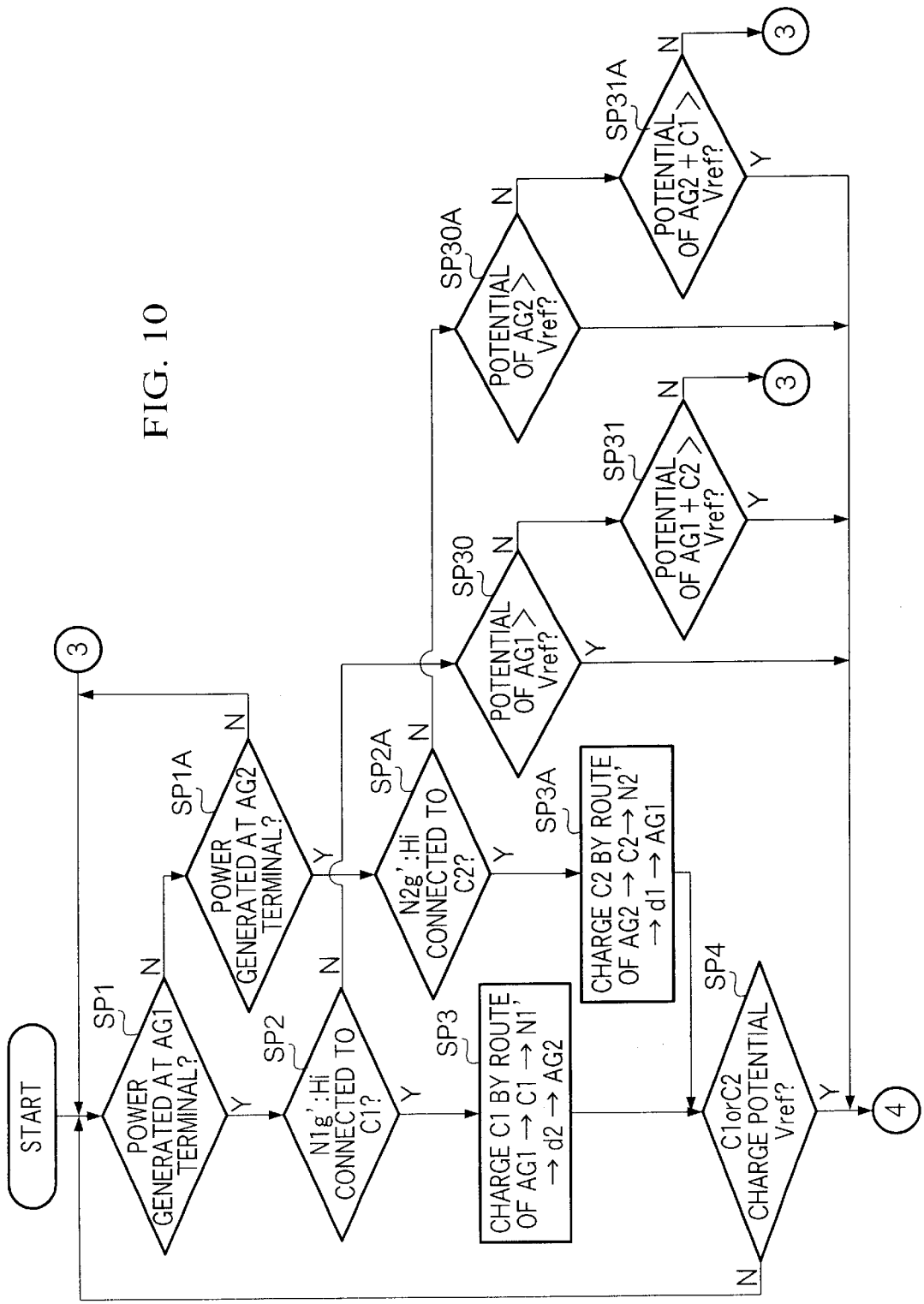
FIGS. 10 through 13 form a flowchart of the operation of the chopper charging circuit.
Figure 11:
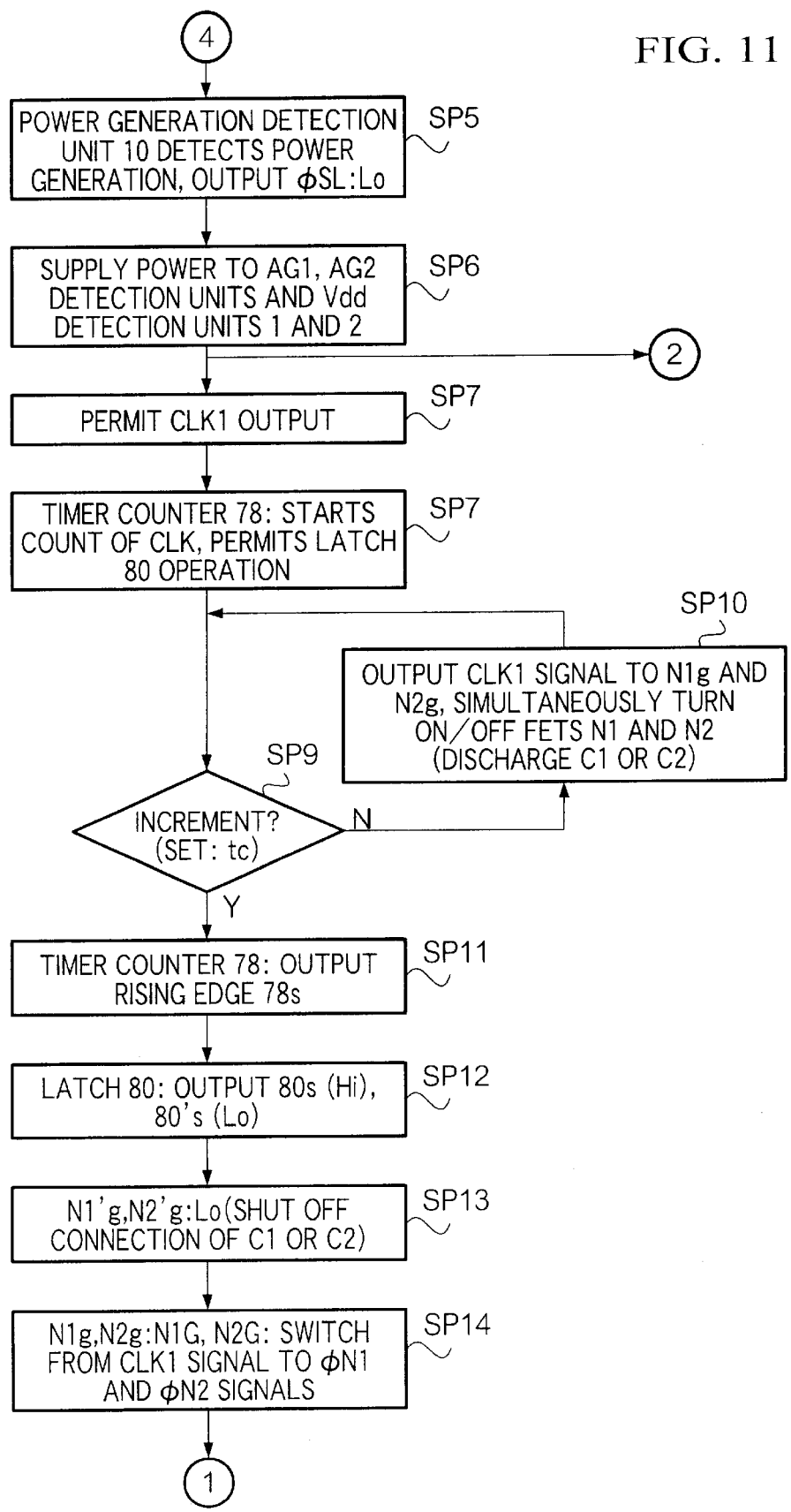
Figure 12:
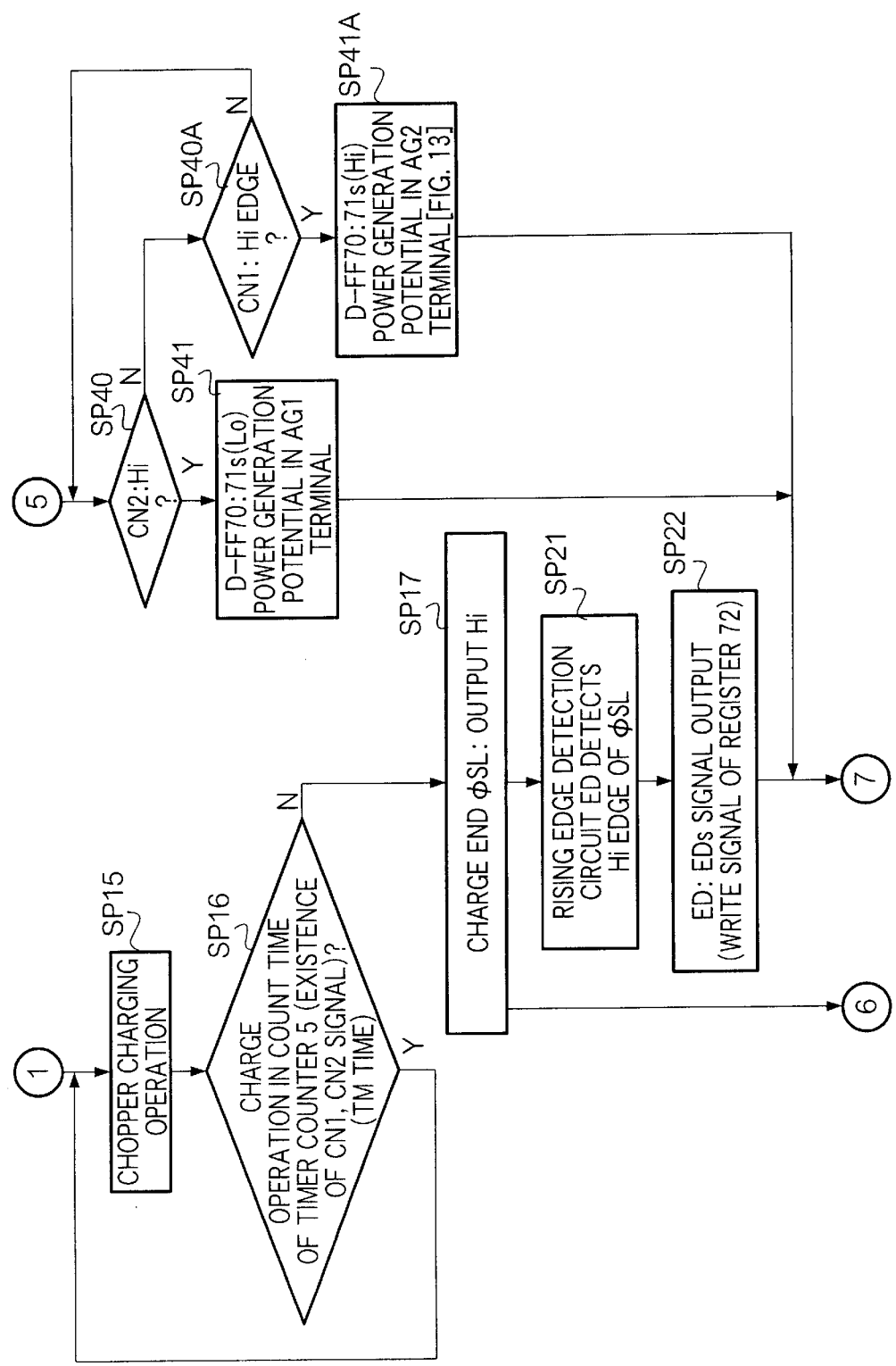
Figure 13:
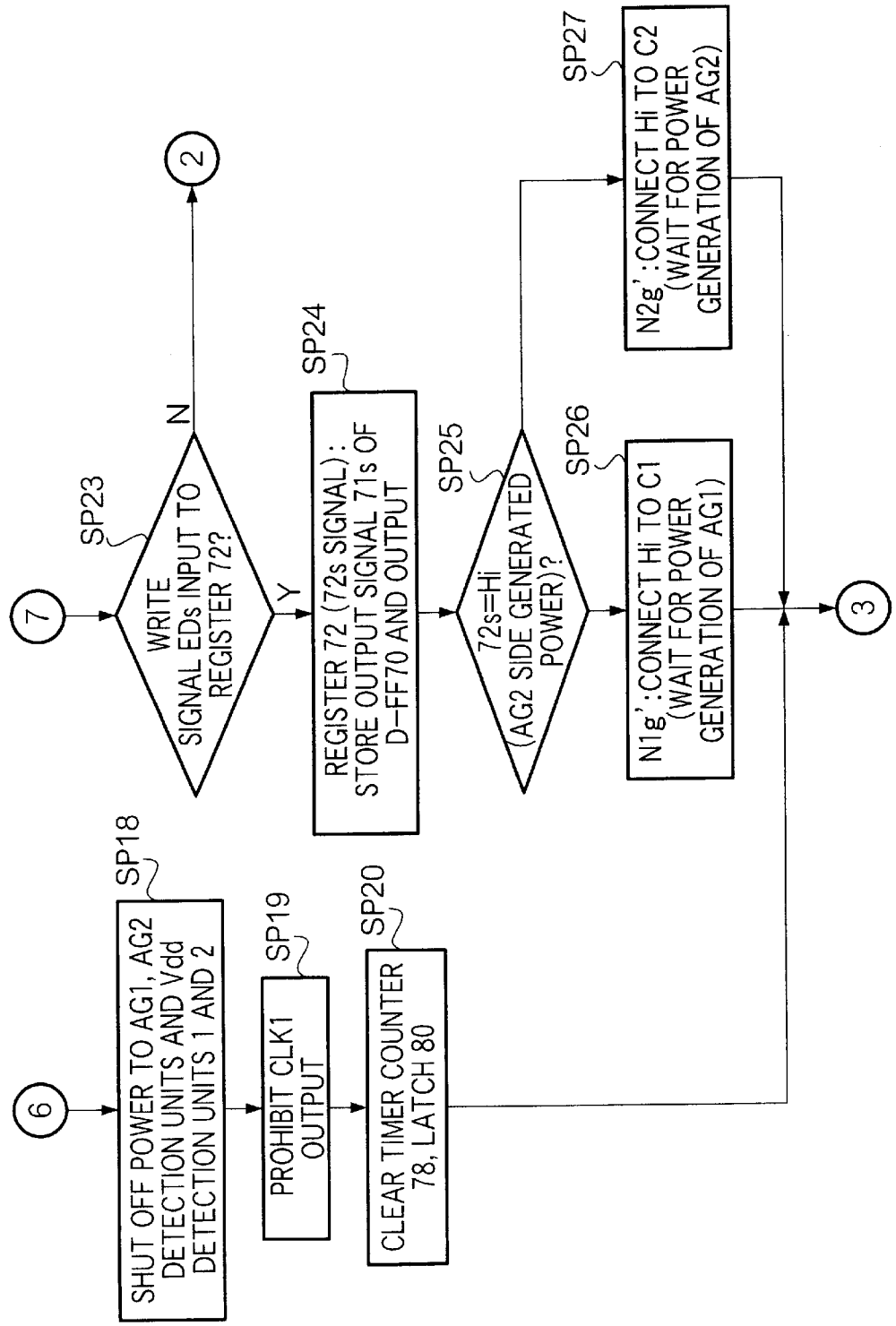

Next, at the time t11, when the induced voltage V2 on the AG2 side becomes "0" and conversely the induced voltage V1 is generated on the AG1 side, the voltage of the output terminal AG1 becomes a voltage obtained by adding the voltage Vg2 charged in the auxiliary capacitor C2 and the induced voltage V2 as shown in FIG. 16 (as denoted by SP1, SP2, SP30, and SP31 in FIG. 10). For this reason, the voltage of the output terminal AG1 exceeds the reference voltage Vref immediately after the time t11. Then, the power generation detection unit 10 detects the power generation state (SP5). Note, the comparators consuming low power are used as the comparators COM5 and COM6 of the power generation detection unit 10, therefore the time when the signal ΦSL falls from the high level to low level as shown in FIG. 16 becomes the time t12 after the elapse of the response time td of the power generation detection unit 10.

When the time t12 is reached, the signal ΦSL becomes the low level, therefore power is supplied to the AG2 detection unit 3 and the AG1 detection unit 4, the voltage of the output terminal AG2 and the reference voltage Vref2 are compared and, at the same time, the voltage of the output terminal AG1 and the reference voltage Vref1 are compared (SPG). Here, the reference voltages Vref1 and Vref2 are set lower than the reference voltage Vref, therefore both of the output signals CN1 and CN2 of the AG2 detection unit 3 and the AG1 detection unit 4 become the high level as shown in FIGS. 16F and 16F.

The NAND circuit 87 of the auxiliary capacitor selection unit 7' shown in FIG. 15 inverts the AND logic between the signal CN1 and the signal CN2 and creates an output signal 87s (refer to FIG. 16). Accordingly, the signal 87s becomes the low level when the voltage of the output terminal AG1 exceeds the reference voltage Vref1 and the voltage of the output terminal AG2 exceeds the reference voltage Vref2. The AC voltage is induced at the output coil L, therefore if the boosting operation by the auxiliary capacitors C1 and C2 is not carried out, the voltages of the output terminals AG1 and AG2 do not simultaneously become higher than the reference voltages Vref1 and Vref2. In other words, one of the auxiliary capacitors C1 and C2 is charged, therefore the output signal 87s becomes the low level.

Here, the signal Pg' is created by a NAND circuit 81' and the AND circuit 82 and becomes the signal inverted from the clock signal CLK1 in the period where the signal 87s is at the low level as shown in FIG. 16. Accordingly, in the period ta and the period tb, the P-channel FETs P1' and P2' turn ON, therefore the voltages of the output terminals AG1 and AG2 coincide with the power supply voltage vdd in the related periods ta and tb. In these periods, a closed loop is formed of AG1, P1', Vdd, P2', and AG2, so that the energy will be stored in the output coil L.

Further, the signals N1g and N2g are obtained by gating the signals ΦN1 and ΦN2 by the signal 80s. The signal 80s becomes the low level before the time t16 as shown in FIG. 16, therefore the signals N1g and N2g become the low level before the time t16 as shown in FIGS. 16L and 16M. Accordingly in the period where the signal 87s is at the low level, the N-channel FETs N1 and N2 turn OFF. In addition, the signal N1g' becomes the low level during a period from the time t12 to the time t16 as shown in FIG. 16, while the signal N2g' becomes the low level in the period ta and the period tb, while becomes the high level in a period te and a period tf as shown in FIG. 16.

Accordingly, in the period te and the period tf, the P-channel FETs P1' and P2' become the OFF state and the N-channel FET N2' becomes the ON state, therefore the energy stored in the output coil L in the period ta and the period tb is released, and the chopper boosting operation is carried out (SPA, SPB). At this time, when a closed loop is formed of AG1, P1, main capacitor 30, GND, N2', C2, and AG2, the charge stored in the auxiliary capacitor C2 is transferred to the main capacitor 30 (SPC). In this example, the charge is transferred in a period from the time t13 to the time t14 and a period from the time t15 to the time t16. Along with the transfer of the charge, the voltages on the two ends of the auxiliary capacitor C2 are lowered.

When the voltage of the output terminal AG2 becomes lower than the reference voltage Vref1 (in this example, at the time t16), the signal CN1 falls. The signal 80s becomes the high level synchronous to this. As mentioned above, the signals N1g and N2g are gated from the signals ΦN1 and ΦN2 by the signal 80s respectively, therefore, after the time t16, the signals N1g and N2g coincide with the signals ΦN1 and ΦN2. Accordingly, in the period from the time t16 to a time t17, the N-channel FET N1 repeatedly turns ON or OFF by the signal N1g, while the N-channel FET N2 remains in the ON state by the signal N2g. Contrary to this, the signal N2g' remains at the high level, therefore the N-channel FET N2' becomes the ON state, while the signal N1g' coincides with the signal N1g, therefore the N-channel FET N1' repeatedly turns ON or OFF synchronous to the N-channel FET N1 (SPB). In other words, in the period from the time t16 to t17, the signal Ng1' and the signal Ng1 will be synchronized and, at the same time, the signal Ng2' and the signal Ng2 will be synchronized.

First, the N-channel FET N1 repeatedly turns ON or OFF, while the N-channel FET N2 remains in the ON state. For this reason, in the period where the N-channel FETs N1 and N2 simultaneously become the ON state, the energy is stored in the output coil L, and the chopper boosting operation is carried out in the period where the N-channel FET N1 turns OFF.

At the time t16, when the voltage of the output terminal AG2 coincides with the reference voltage Vref2, a charge corresponding to the reference voltage Vref2 is stored in the auxiliary capacitor C2, but the N-channel FET N2' repeatedly turns ON or OFF synchronous to the N-channel FET N2, therefore, in the period where they simultaneously become the ON state, a closed loop is formed with C2, N2, GND, N2', and C2, so that the auxiliary capacitor C2 will be discharged. Namely, when chopper boosting the induced voltage of the AC generator AG, by forming the closed loop including the auxiliary capacitor with the charge stored therein synchronous to the chopper cycle, the auxiliary capacitor is discharged. Accordingly, after the continuous induced voltage from the time t10 to a time t19 is terminated, when the AC voltage is generated at the output coil L next, the charge in the auxiliary capacitor has become the state of "0" therefore the boosting operation by the auxiliary capacitor can be commenced every time from the same state.

Next, in a period from the time t17 to a time t18, the induced voltage is generated again on the output terminal AG2 side. At the time t17, the voltage of the output terminal AG2 is higher than the reference voltage Vref1, therefore the signal CN1 rises from the low level to high level. The induced voltage terminal specification signal 71s is created by the second latch circuit 70 latching at the rising edge of the signal CN1, therefore the induced voltage terminal specification signal 71s becomes the high level at the time t17 as shown in FIG. 16.

Further, in this period, the signal N1g becomes the high level and the N-channel FET N1 becomes the ON state, therefore the output terminal AG1 is connected to the low potential side line LL via the N-channel FET N1. Further, in this period, the signal N2g coincides with the clock signal CLK1, therefore the N-channel FET N2 will repeatedly turn ON or OFF (SPB). When the N-channel FETs N2 and N1 simultaneously become the ON state, the closed loop is formed with AG2, N2, GND, N1, and AG1, so that the energy is stored in the output coil L. On the other hand, when the N-channel FET N1 is in the ON state and the N-channel FET N2 becomes the OFF state, the energy stored in the output coil L is released, so the chopper boosting operation is carried out. Accordingly, when the voltage of the output terminal AG2 becomes higher than the power supply voltage Vdd, the closed loop is formed with AG2, main capacitor 30, GND, N1, and AG1, so that the charging current flows into the main capacitor 30 (SPC).

Next, at the time t18, when the voltage of the output terminal AG2 becomes lower than the reference voltage Vref1, the signal CN1 becomes the low level. At this time, the voltage of the output terminal AG1 is lower than the reference voltage Vref2, therefore the signal CN2 also has become the low level. When these conditions are satisfied, the timer counter 5 starts the count of the clock signal CLK. Then, when the charge end detection time TM elapses from the time t18 to the time t19, the SR latch 6 is reset, and the signal ΦS becomes the high level. The signal ΦSL is obtained via the inverter 12 and the NOR circuit 13 of the power generation detection unit 10, therefore the signal ΦSL rises from the low level to high level at the time t19. Then, the rising edge detection circuit ED detects the rising edge of the signal ΦSL and changes the logic level of the power generation end signal EDs to the low level as shown in FIG. 16 (SP21, SP22). Then, the register 72 updates the storage state synchronous to the power generation end signal EDs (SP23 to SP27). In this example, the induced voltage terminal specification signal 71s has been the high level after the time t17, therefore the storage state (signal 72s) of the register 72 is updated to "H" at the time t19 as shown in FIG. 16.

Namely, at which output terminal between the output terminals AG1 and AG2 the induced voltage of the positive polarity was generated immediately before the end of the period where the continuous AC voltage was generated is stored. Then, based on this storage state, the auxiliary capacitor is selected. In this example, the output terminal AG2 side generated the positive polarity induced voltage immediately before the end, therefore the auxiliary capacitor C1 connected to the output terminal AGI on the low voltage side is selected (SP26). Concretely, the signal N1g' becomes the high level at the time t19, and the N-channel FET N1 becomes the ON state. Accordingly, the auxiliary capacitor will be selected for preparing for the next power generation.

As explained above, according to the chopper charging circuit 100' of the second embodiment, similar to the first embodiment, the induced voltage of the AC generator AG is boosted two fold by using the auxiliary capacitors C1 and C2, and the power generation detection unit 10 detects the power generation state based on the induced voltage boosted two fold. Therefore, even if the threshold voltage used for detecting the power generation state is set relatively high, the power generation state can be detected at an early stage. In addition, when the induced voltage is boosted two fold, a charge is stored in one auxiliary capacitor, but immediately after detecting the power generation state, the chopper boosting operation is carried out, and the charge stored in one auxiliary capacitor is transferred to the main capacitor 30. Therefore, the charging efficiency can be further raised.

In this way, in the present embodiment, the timing of the start of charging can be made earlier while greatly reducing the current consumption of the control system, therefore a chopper charging circuit 100' having a high charging efficiency can be provided. Further, in a wristwatch which is required to be light, thin, and small sized, it is necessary to make the AC generator AG provided inside it small in size. For this reason, the induced voltage generated at the AC generator AG is small, and the rectification efficiency is poor. Accordingly, it is extremely useful to use a circuit having a good charging efficiency like the chopper charging circuit 100' to a wristwatch. Particularly, in the chopper charging circuit 100, in the period where the user is not wearing the wristwatch, the state of the power generation is monitored by supplying power to only the comparators COM5 and COM6 least consuming the current, therefore the current consumed during that time is very small. For this reason, even when the user does not use the wristwatch for a long period of time, a situation where the watch stops and the user cannot see the time when he wants to can be greatly reduced.

Third Embodiment

Figure 19:
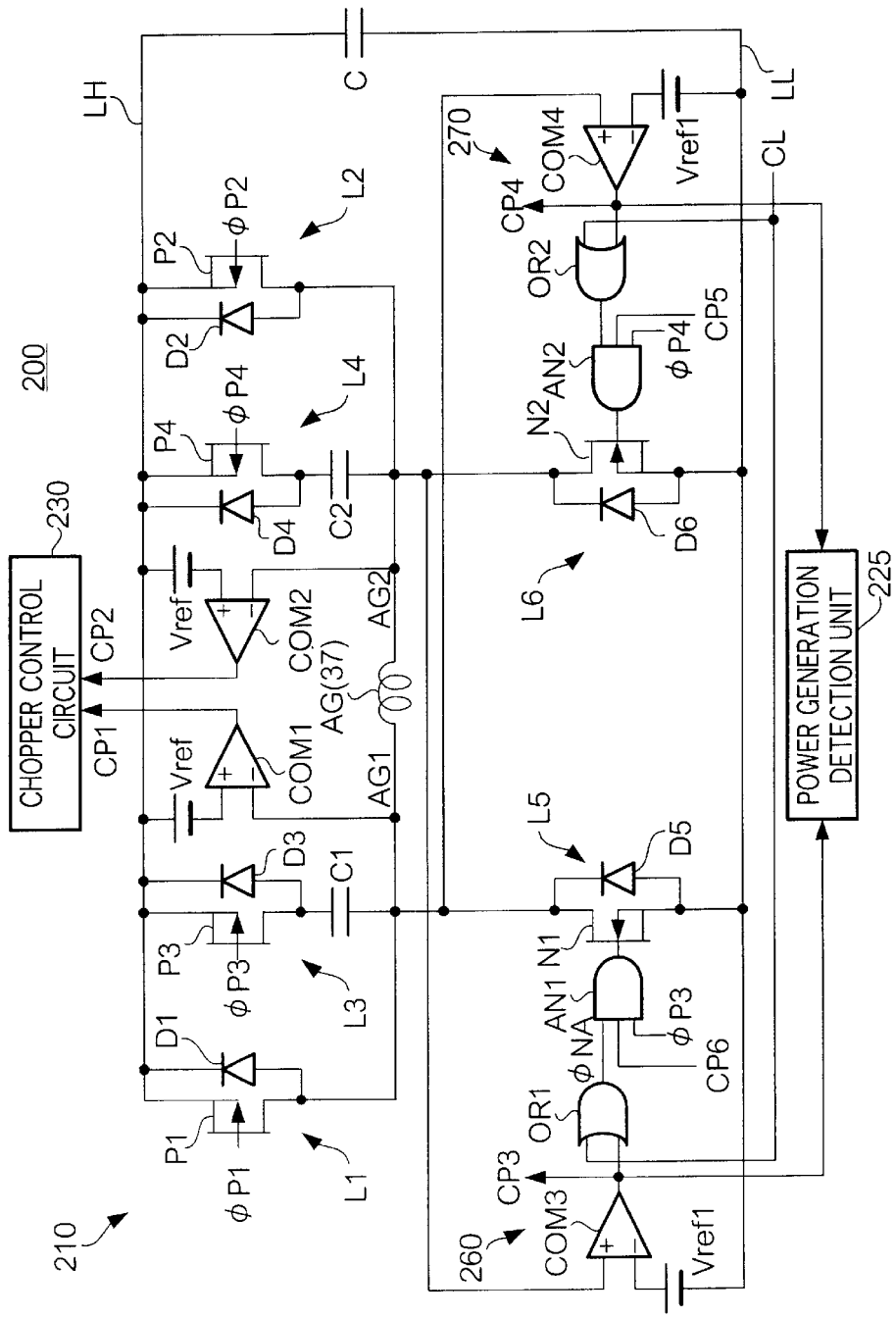
FIG. 19 is a circuit diagram of a chopper charging circuit according to a third embodiment.

FIG. 19 is a circuit diagram of a chopper charging circuit 200 used in a wristwatch according to the third embodiment of the present invention. Here, the chopper charging circuit 100 of the first embodiment was designed to raise the charging efficiency by detecting the power generation state at an early stage, but this chopper charging circuit 200 raises the charging efficiency by charging the energy stored in the inductance of the output coil with a high efficiency.

This chopper charging circuit 200 is roughly configured by a chopper circuit 201 for converting the induced voltage of the AC generator AG to a pulse-like chopper voltage to generate it between the high potential side line LH (first line) and the low potential side line LL (second line) and a main capacitor C (third storage unit) for storing the power provided between the high potential side line LH and the low potential side line LL.

The chopper circuit 201 will be explained next. The chopper circuit 201 is roughly configured by first and second lines L1 and L2 for connecting the output terminals AG1 and AG2 of the AC generator AG and the high potential side line LH, third and fourth lines L3 and L4 for connecting the output terminals AG1 and AG2 of the AC generator AG and the high potential side line LH and, at the same time, having the auxiliary capacitors C1 and C2 for storing the currents flowing through the lines, fifth and sixth lines L5 and L6 for connecting the output terminals AG1 and AG2 of the AC generator AG and the low potential side line LL, a power generation detection unit 225 (power detection unit) for detecting the power generation state of the AC generator AG, and a chopper control circuit 230 (second chopper unit).

The first and second lines L1 and L2 are configured by providing the P-channel FET P1 and FETP2. Further, the diodes D1 and D2 are parasitic diodes of the P-channel FETs P1 and P2. Here, the first and second lines L1 and L2 have the same configuration except for the point that they are arranged on the output terminal AG1 side and the output terminal AG2 side of the AC generator AG, therefore only the first line L1 will be explained. The first line L1 carries the current via the diode D1 only in the case where the voltage of the output terminal AG1 exceeds the voltage Vd+Vdd (power supply voltage of the high potential side line) where a forward voltage drop of the diode D1 is Vd. Contrary to this, the first line L1 carries the current in two directions between the high potential side line and the output terminal AG1 where the P-channel FET P1 is ON.

Accordingly, the currents flowing through the first and second lines L1 and L2 become one direction when the P-channel FETs P1 and P2 are in the OFF state.

The third and fourth lines L3 and L4 are configured by connecting the P-channel FETs P3 and P4 and the auxiliary capacitors C1 (first storage unit) and C2 (second storage unit) in series. Further, the comparators COM1 and COM2 (storage voltage detection units) for comparing the voltages on the output terminals AG1 and AG2 side of the third and fourth lines L3 and L4 and the voltage |Vref| (storage reference voltage) are connected in parallel to the third and fourth lines L3 and L4. Further, the diodes D3 and D4 are parasitic diodes of the P-channel FETs P1 and P2. Here, the third and fourth lines L3 and L4 have identical configurations except that they are arranged on the output terminal AG1 side and the output terminal AG2 side of the AC generator AG, so only the third line L3 will be explained.

In the third line L3, similar to the first line L1, when the P-channel FET P3 is in the OFF state, the direction of the current flowing through this becomes one direction. Further, the third line L3 is connected with the auxiliary capacitor C1 in series, therefore when current flows through the third line L3, the charge is stored in the auxiliary capacitor C1 in accordance with the amount of current carried.

The comparator COM1 (first storage voltage detection unit) compares the voltage of the third line L3 with the voltage |Vref| (absolute value). When the voltage of the third line L3 is small relative to the voltage |vref|, the output signal CP1 thereof becomes the high level, while when the voltage of the third line L3 is larger, the output signal CP1 thereof becomes the low level. For this reason, when a charge is stored in the auxiliary capacitor C1 and the voltage of the auxiliary capacitor C1 becomes large, the output signal CP1 becomes the low level. Similarly, the comparator COM2 (second storage voltage detection unit) compares the voltage of the fourth line L4 with the voltage |Vref| (absolute value). When the voltage of the fourth line L4 is large relative to the voltage |Vref| (a charge is stored in the auxiliary capacitor C2 and the voltage of the auxiliary capacitor C2 has become high), an output signal CP2 thereof becomes the low level. These output signals CP1 and CP2 are supplied to the power generation detection unit 225 and the chopper control circuit 230. Further, an auxiliary charging control circuit 250 (charging unit) for controlling the P-channel FETs P3 and P4 will be explained later.

The fifth and sixth lines L5 and L6 are configured by the N-channel FETs N1 and N2 and NFET control circuits 260 and 270 (first chopper unit) for controlling these N-channel FETs N1 and N2. Further, the diodes D5 and D6 are parasitic diodes of the N-channel FETs N1 and N2. The NFET control circuits 260 and 270 are configured by the comparators COM3 and COM4, OR circuits OR1 and OR2, and AND circuits AN1 and AN2. Here, the fifth and sixth lines L5 and L6 have the same configurations except they are arranged on the output terminal AG1 side and the output terminal AG2 side of the AC generator AG, so only the fifth line L5 will be explained.

In the NFET control circuit 260, the comparator COM3 compares the voltage of the output terminal AG2 of the AC generator AG with a reference voltage |Vref1| (absolute value) and supplies an output signal CP3 thereof to one input terminal of the OR circuit OR1. The reference voltage |Vref1| is the voltage for detecting whether or not the AC generator AG generated power and is set at a voltage that is slightly higher than the voltage of the ground. The OR circuit OR1 calculates the OR logic of the signal CP3 and the clock signal CL and supplies an output signal ΦNA thereof to one input terminal of the AND circuit AN1. The AND circuit AN1 calculates the AND logic of the signal ΦNA, the signal ΦP3, and the signal CP6 and supplies the output signal ΦN1 thereof to the gate of the N-channel FET N1. Here, a signal ΦP3 is the signal for controlling the P-channel FET P3. A signal CP6 is the output signal of the comparator COM6 in an auxiliary charging control circuit 50 mentioned later and is the signal which becomes the low level when the diode D1 is in the ON state.

For this reason, when the signal ΦP3 is at the low level (when the P-channel FET P3 is in the ON state) or when the signal CP6 is at the low level (where the diode D1 is in the ON state), the signal ΦN1 becomes the low level, so the NFET control circuit 26 makes the N-channel FET N1 the OFF state. Further, when the signal ΦP3 is at the high level (when the P-channel FET P3 is in the OFF state) or when the signal CP6 is at the high level (when the diode D1 is in the OFF state), the NFET control circuit 260 outputs the signal ΦNA as the signal ΦN1. At this time, when the signal ΦNA is at the high level (when the voltage of the output terminal AG2 is large with respect to the reference voltage |Vref1|) or when the clock signal CL is at the high level, the N-channel FET N1 is brought to the ON state.

Accordingly, the NFET control circuits 260 and 270 control the N-channel FET N1 and FETN2 in accordance with the clock signal CL and, when the voltage of the output terminal AG2 or AG1 is large with respect to the reference voltage |Vref1|, control the N-channel FETs N1 or N2 to the ON state. Further, the NFET control circuits 260 and 270 compulsorily control the N-channel FETs N1 and N2 to the OFF state by signals ΦP3, ΦP4, CP5, and CP6 when the P-channel FETs P3 and P4 are in the ON state or when the diodes D1 and D2 are in the ON state. In this sense, the signals ΦP3, ΦP4, CP5, and CP6 act as signals for compulsorily turning OFF the N-channel FETs N1 and N2.

Figure 20:
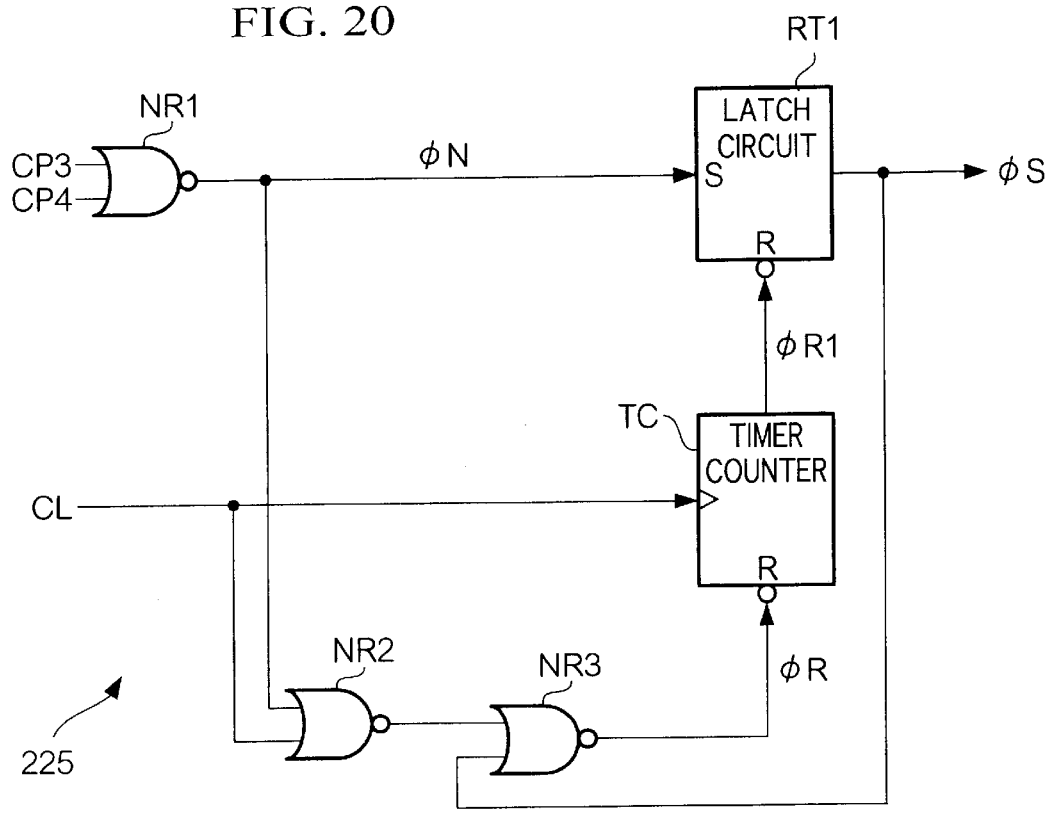
FIG. 20 is a circuit diagram of a power generation detection unit of the chopper charging circuit.

Next, an explanation will be given of the power generation detection unit 225. FIG. 20 is a circuit diagram of the power generation detection unit 225. The power generation detection unit 225 is configured by three NOR circuits NR1, NR2, and NR3, a timer counter TC, and a latch circuit RT1. The NOR circuit NR1 calculates the negation of the OR logic of the output signal CP3 of the comparator COM3 and the output signal CP4 of the comparator COM4 and supplies the output signal ΦN thereof to the set terminal S of the latch circuit RT1 and one input terminal of the NOR circuit NR2. For this reason, the NOR circuit NR1 detects whether or not the voltage of the output terminal AG1 or AG2 is large with respect to the reference voltage |Vref1| and when large makes the signal ΦN the low level.

The latch circuit RT1 uses for example an inversion type SR flip-flop and, when the signal ΦN supplied to the set terminal S becomes the low level, sets the output signal ΦS thereof to the low level. Further, when the signal ΦR1 supplied to the reset terminal R becomes the low level, the latch circuit RT1 sets the output signal ΦS at the high level. Accordingly, when the voltage of the output terminal AG1 or AG2 is large with respect to the reference voltage |Vref1|, it is judged that the AC generator AG is in the power generation state, and the signal ΦS becomes the low level.

The NOR circuit NR2 calculates the negation of the OR logic of the signal ΦN and the clock signal CL and supplies the output signal thereof to one input terminal of the NOR circuit NR3. The NOR circuit NR3 calculates the negation of the OR logic of the output signal of the NOR circuit NR2 and the signal ΦS and supplies the output signal ΦR thereof to the reset terminal R of the timer counter TC.

The timer counter TC counts the clock signal CL and makes the carry signal the low level when the count reaches the set value determined in advance. Further, the timer counter TC resets the count when the signal ΦR supplied to the reset terminal R becomes the low level. The carry signal is supplied as the signal ΦR1 to the reset terminal R of the latch circuit RT1. For this reason, when the voltage of the output terminal AG1 or AG2 becomes large with respect to the reference voltage |vref1|, the signal ΦS and signal ΦN become the low level, and the inverted signal of the clock signal CL is supplied as the signal ΦR to the reset terminal R of the timer counter TC. Accordingly, when the AC generator AG becomes the power generation state, the timer counter TC is reset with a short cycle and the signal ΦR1 is maintained at the high level, therefore the latch circuit RT1 is not reset, and the signal ΦS is maintained at the low level.

On the other hand, when the voltages of the output terminals AG1 and AG2 become small with respect to the reference voltage |Vref1|, the signal ΦN becomes the high level from the low level and the signal ΦR becomes the high level, therefore the count of the timer counter TC is incremented. Accordingly, when the AC generator AG becomes the power non-generation state, the latch circuit RT1 is reset after an elapse of a predetermined time and the signal ΦS becomes the high level. Accordingly, the power generation detection unit 225 makes the signal ΦS the low level when the AC generator AG is in the power generation state, while makes the signal ΦS the high level when the AC generator AG is in the power non-generation state.

Figure 21:
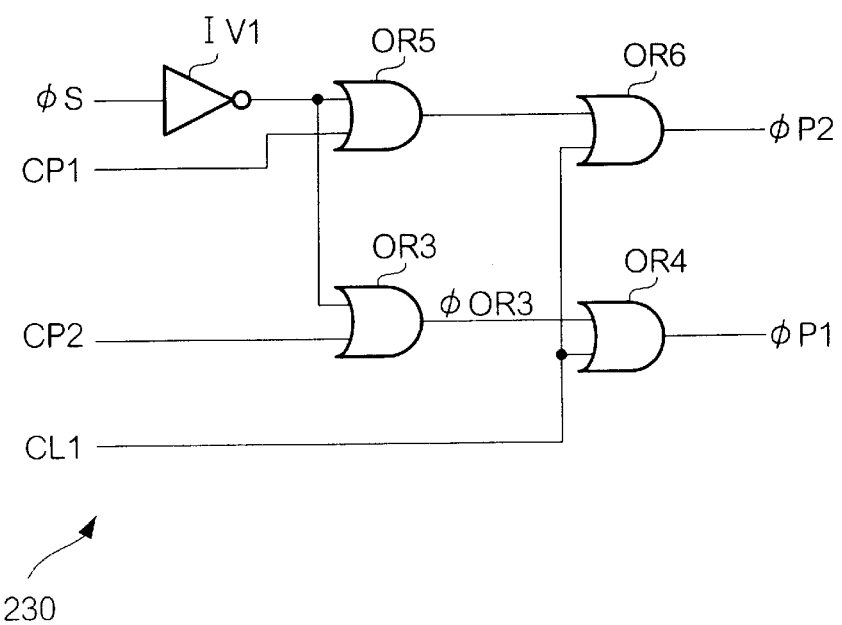
FIG. 21 is a circuit diagram of a chopper control circuit of the chopper charging circuit.

Next, an explanation will be made of the chopper control circuit 230 for controlling the P-channel FETs P1 and P2. FIG. 21 is a circuit diagram of the chopper control circuit 230. The chopper control circuit 230 is configured by an inverter IV1, OR circuits OR3 and OR4 generating the signal ΦP1, and OR circuits OR5 and OR6 generating the signal ΦP2. The OR circuit OR3 is supplied with the output signal ΦS of the power generation detection unit 225 via the inverter IV1 at one input terminal, while is supplied with the output signal CP2 of the comparator COM2 at its other input terminal, and calculates the OR logic of the two signals. The OR circuit OR4 calculates the OR logic of an output signal ΦOR3 of the OR circuit OR3 and a boosting use clock signal CL1 and supplies the output signal thereof to the gate of the P-channel FET P1 as the signal ΦP1.

For this reason, when the signal ΦS is at the low level or when the signal CP2 is at the high level (where the AC generator AG is in the power generation state) or when the voltage of the auxiliary capacitor C2 is small with respect to the voltage |Vref|, the signal ΦP1 becomes the high level, and the P-channel FET P1 becomes the OFF state. Contrary to this, when the signal ΦS is at the high level or when the signal CP2 is at the low level (when the AC generator AG is in the power non-generation state) or when the voltage of the auxiliary capacitor C2 is large with respect to the voltage |vref|, the boosting use clock signal CL1 is supplied as the signal ΦP1 to the gate of the P-channel FET P1. Here, the OR circuits OR5 and OR6 for generating the signal ΦP2 are identical to the OR circuits OR3 and OR4 except the output signal CP1 of the comparator COM1 is supplied to the OR circuit OR5 in place of the output signal CP2 of the comparator COM2, and the signal ΦP2 is supplied to the gate of the P-channel FET P2, so the explanation will be omitted.

Accordingly, the chopper control circuit 230 controls the P-channel FET P1 based on the boosting use clock signal CL1 when the storage amount of the auxiliary capacitor C2 has become a predetermined value or more at the point of time when the AC generator AG becomes the power non-generation state, while controls the P-channel FET P2 based on the boosting use clock signal CL1 when the storage amount of the auxiliary capacitor C1 has become the predetermined value or more. Further, the chopper control circuit 230 controls the P-channel FETs P1 and P2 to the OFF state when the AC generator AG is in the power generation state. Note that use can be also made of the clock signal CL as the boosting use clock signal CL1.

Figure 22:
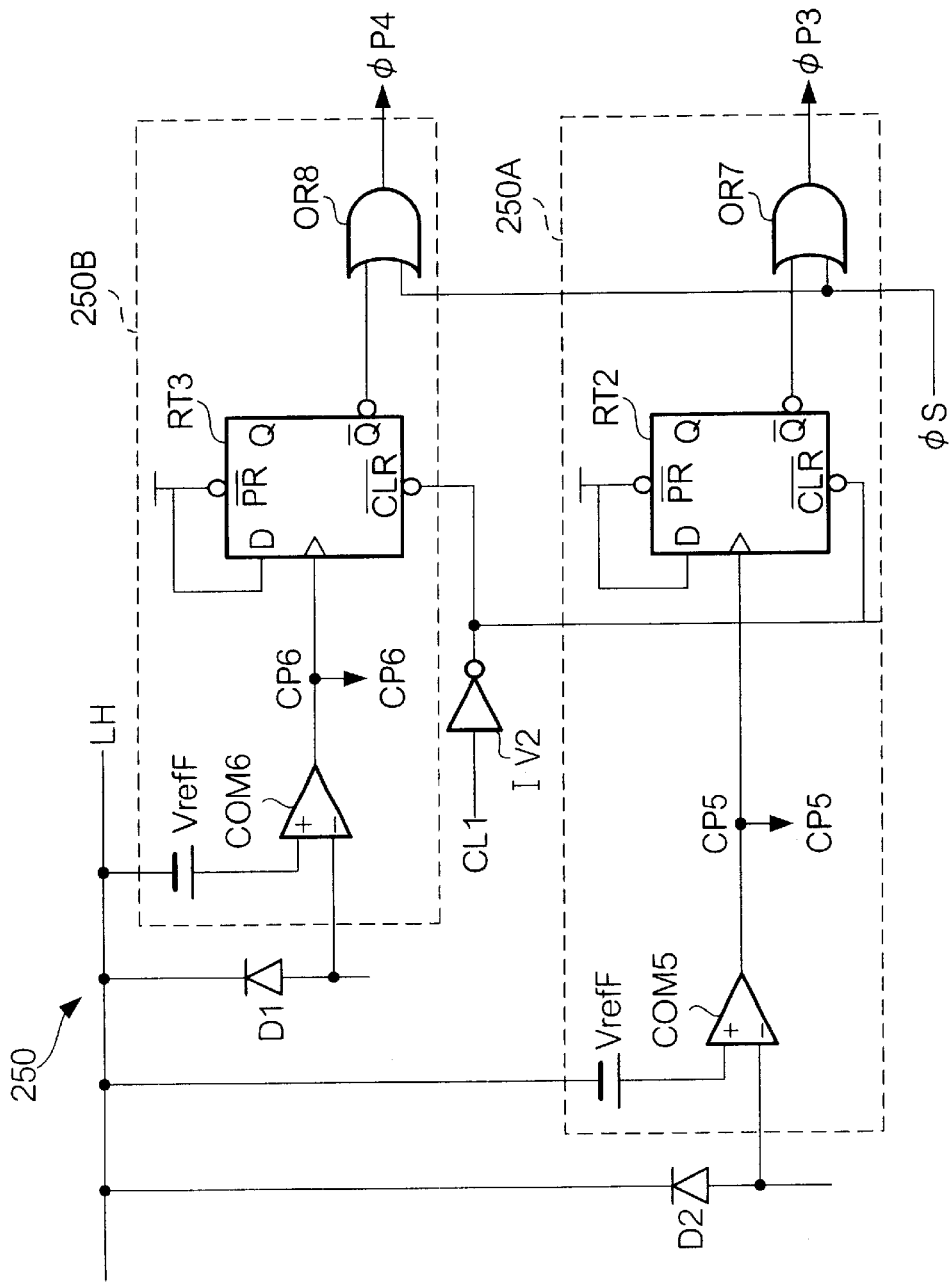
FIG. 22 is a circuit diagram of an auxiliary charging control circuit of the chopper charging circuit.

Next, an explanation will be given of the auxiliary charging control circuit 250 for controlling the P-channel FETs P3 and P4. FIG. 22 is a circuit diagram of the auxiliary charging control circuit 250 (charging unit). The auxiliary charging control circuit 250 is configured by an inverter IV2, a signal generation unit 250A for generating the signal ΦP3, and a signal generation unit 250B for generating the signal ΦP4. The signal generation unit 250A (first charging unit) is configured by the comparator COMS, a D-FF circuit RT2, and an OR circuit OR7 and supplies the output signal ΦP3 thereof to the gate of the P-channel FET P3.

The signal generation unit 250B (second charging unit) is configured by the comparator COM6, a D-FF circuit RT3, and an OR circuit OR8 and supplies the output signal ΦP4 thereof to the gate of the P-channel FET P4. Here, the signal generation unit 250B is the same as the signal generation unit 250A except that the output signal is supplied to the P-channel FET P4, so only the signal generation unit 250A will be explained.

The comparator COM5 compares a forward voltage VF of the diode D2 with a reference voltage VrefF (chopper reference voltage). When the forward voltage VF of the diode D2 is lower than the voltage VrefF, the output signal CP5 thereof becomes the high level, while when the forward voltage VF of the diode D2 is higher than the voltage VrefF, the output signal CP5 thereof becomes the low level. The D-FF circuit RT2 fetches the signal of the high level supplied to a D-input terminal and makes an inverted Q-output terminal the low level when the signal CP5 supplied to the clock input terminal rises. Further, the D-FF circuit RT2 is supplied with the clock signal CL via the inverter IV2 to its clear terminal CLR and is cleared when the clock signal CL becomes the high level. The OR circuit OR7 calculates the OR logic of the signal of the inverted Q-output terminal of the D-FF circuit RT2 and the output signal ΦS of the power generation detection unit 225 and supplies the output signal thereof as the signal ΦP3 to the gate of the P-channel FET P3. For this reason, when the signal ΦS is at the high level, that is, when the AC generator AG is in the power non-generation state, ΦP3 becomes the high level, and the P-channel FET P3 is maintained in the OFF state. Further, when the signal ΦS is at the low level, that is, when the AC generator AG is in the power generation state, the signal of the inverted Q-output terminal of the D-FF circuit RT2 is supplied as the signal ΦP3 to the gate of the P-channel FET P3.

Figure 23:
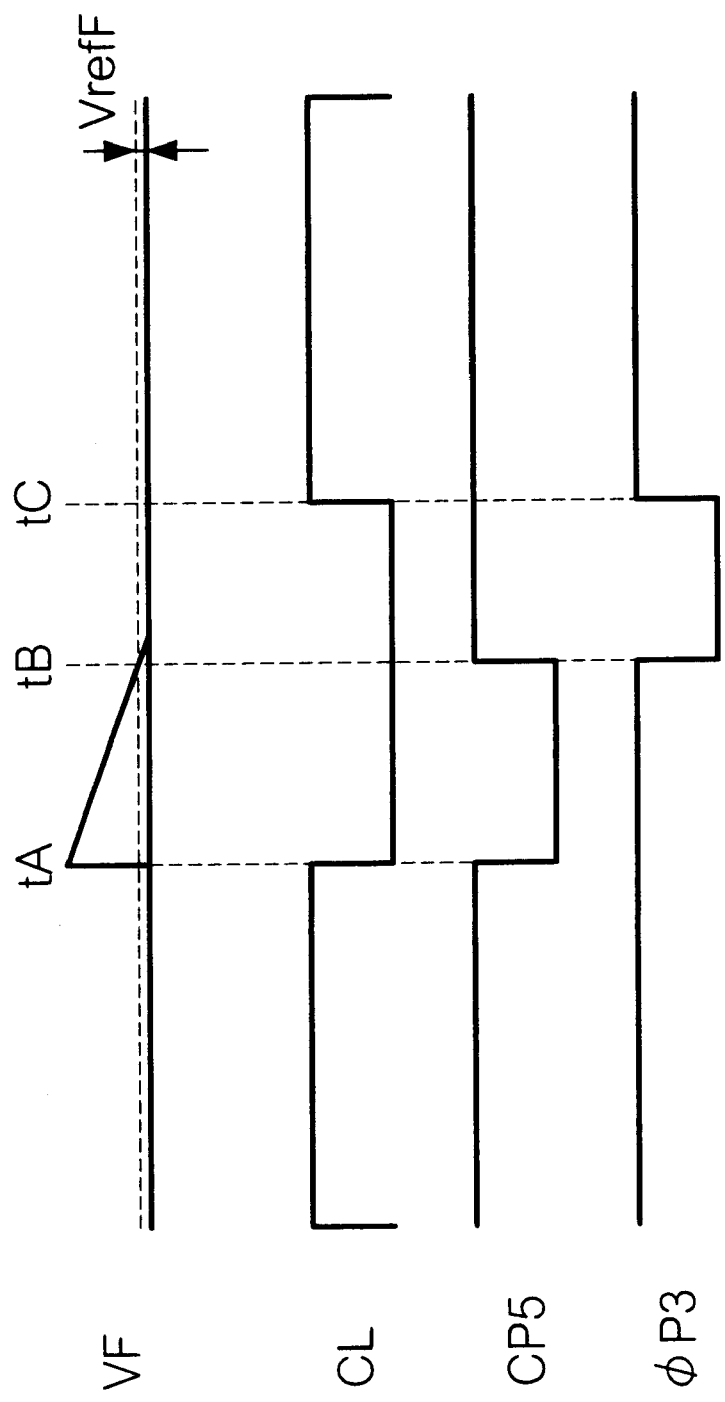
FIG. 23 is a timing chart of the operation of the auxiliary charging control circuit.

Here, an explanation will be given of the operation of the auxiliary charging control circuit 250 in the case where the AC generator AG is in the power generation state by using the timing chart shown in FIG. 23. Note that a case where a current flows through the diode D2 and the forward voltage VF of the diode D2 changes as shown in FIG. 23 in the period where the clock signal CL is at low level is assumed. As shown in FIG. 23, when the forward voltage VF of the diode D2 exceeds the voltage VrefF at a time tA, as shown in FIG. 23, the output signal CP5 of the comparator COM5 becomes then low level. Then, when the forward voltage VF of the diode D2 is gradually lowered and becomes the voltage VrefF or less, as shown in FIG. 23, the signal of the inverted Q-output terminal (signal ΦP3) of the D-FF circuit RT2 becomes the low level, while when the clock signal CL becomes the high level again, the signal (ΦP3) of the inverted Q-output terminal of the D-FF circuit RT2 becomes the high level. Namely, the auxiliary charging control circuit 250 controls the P-channel FET P3 in the ON state until the clock signal CL becomes the high level when the forward voltage VF of the diode D2 becomes the voltage VrefF or less.

Accordingly, in a case when the AC generator is in the power generation state, when the current flows through the diode D2, the auxiliary charging control circuit 250 controls the P-channel FET P3 in the ON state from the point of time when the forward voltage VF of the diode D2 becomes the voltage VrefF or less to the point of time when the clock signal CL becomes the high level. Then, when the current flows through the diode D1, the auxiliary charging control circuit 250 controls the P-channel FET P4 in the ON state from the point of time when the forward voltage VF of the diode D1 becomes the voltage VrefF or less to the point of time when the clock signal CL becomes the high level. Further, the auxiliary charging control circuit 250 controls the P-channel FETs P3 or P4 in the OFF state when the AC generator AG is in the power non-generation state.

Figure 24:
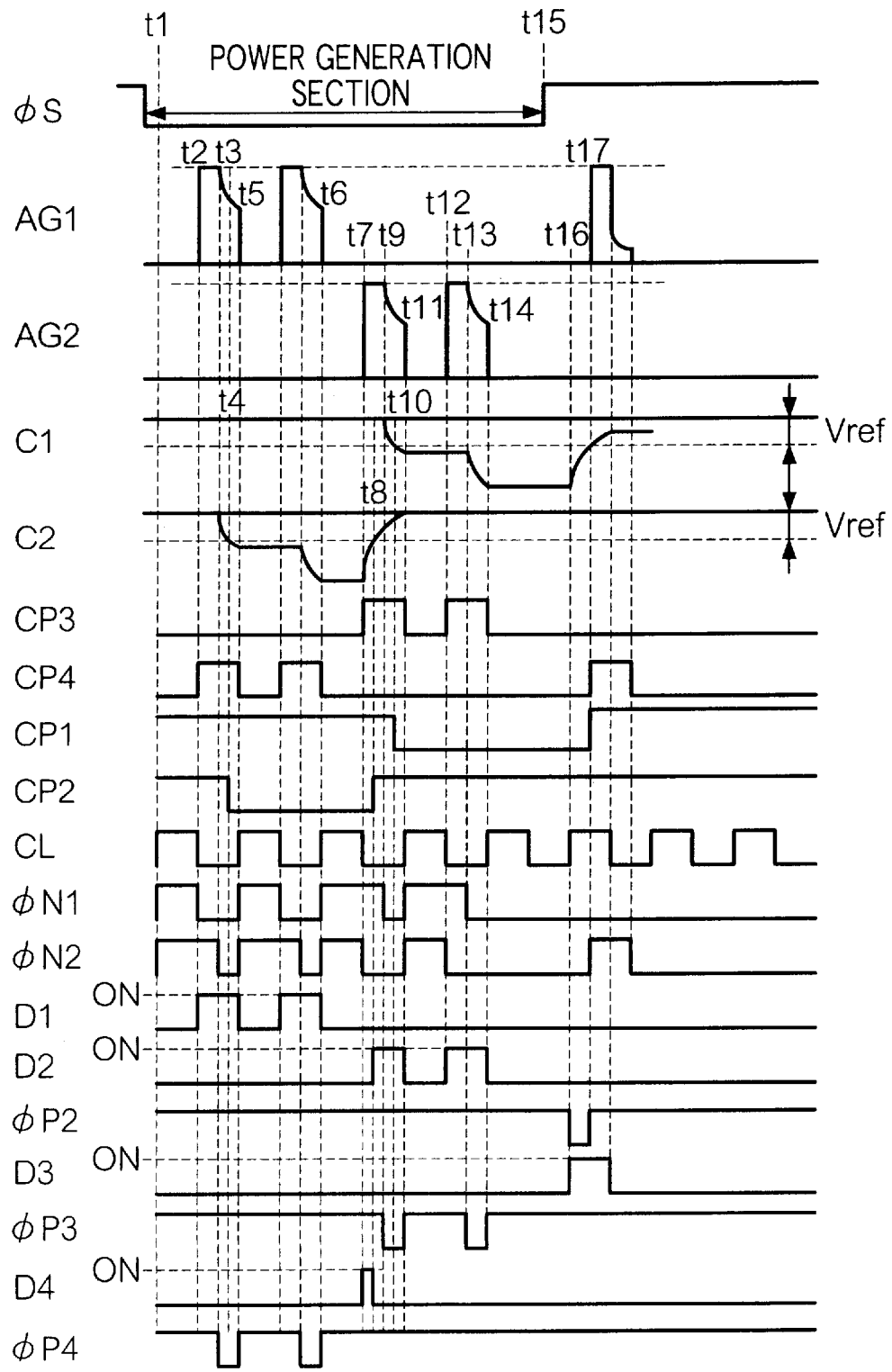
FIG. 24 is a timing chart of the operation of the chopper charging circuit.
Figure 25:
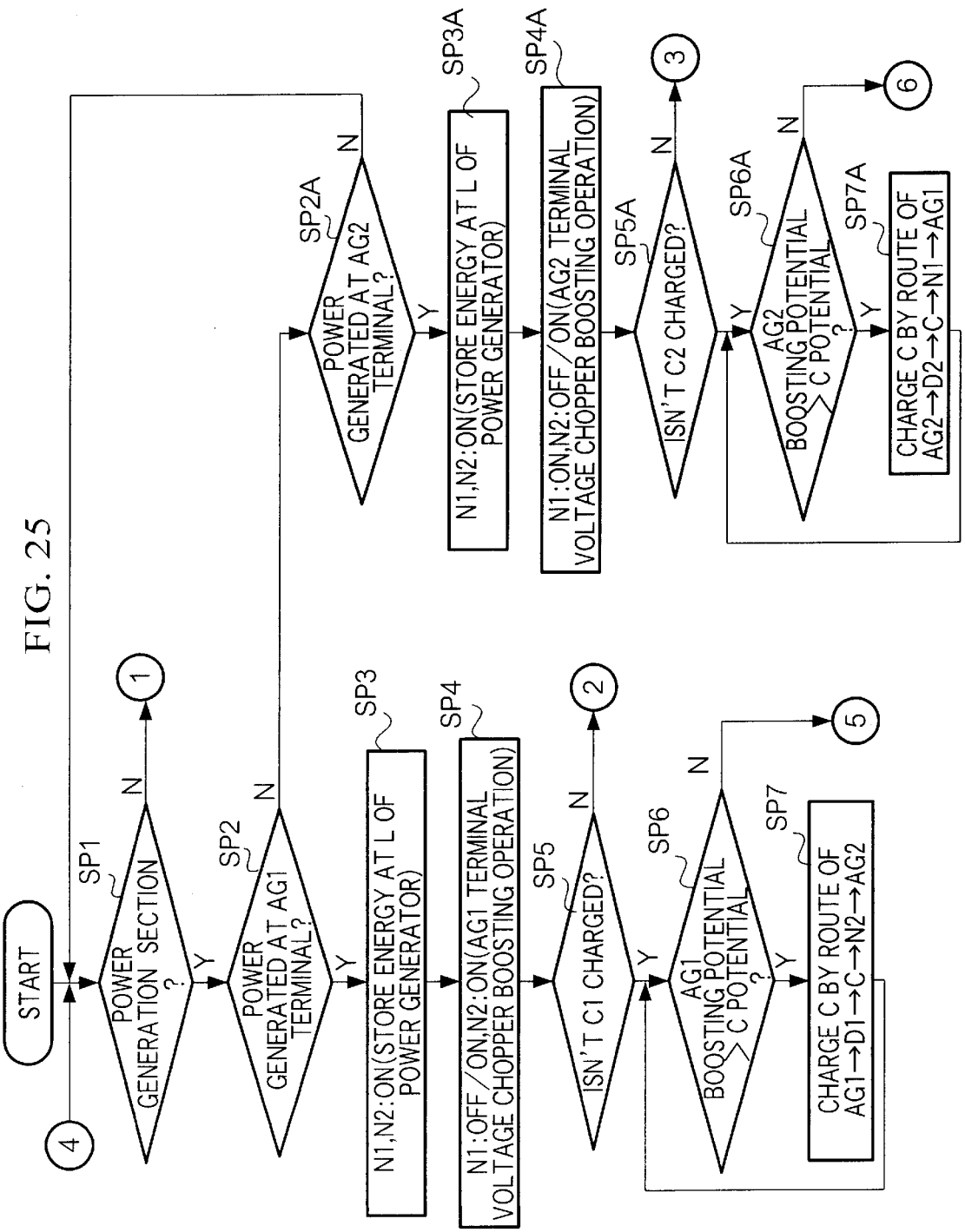
FIGS. 25 through 29 constitute a flowchart of the operation of the chopper charging circuit.
Figure 26:
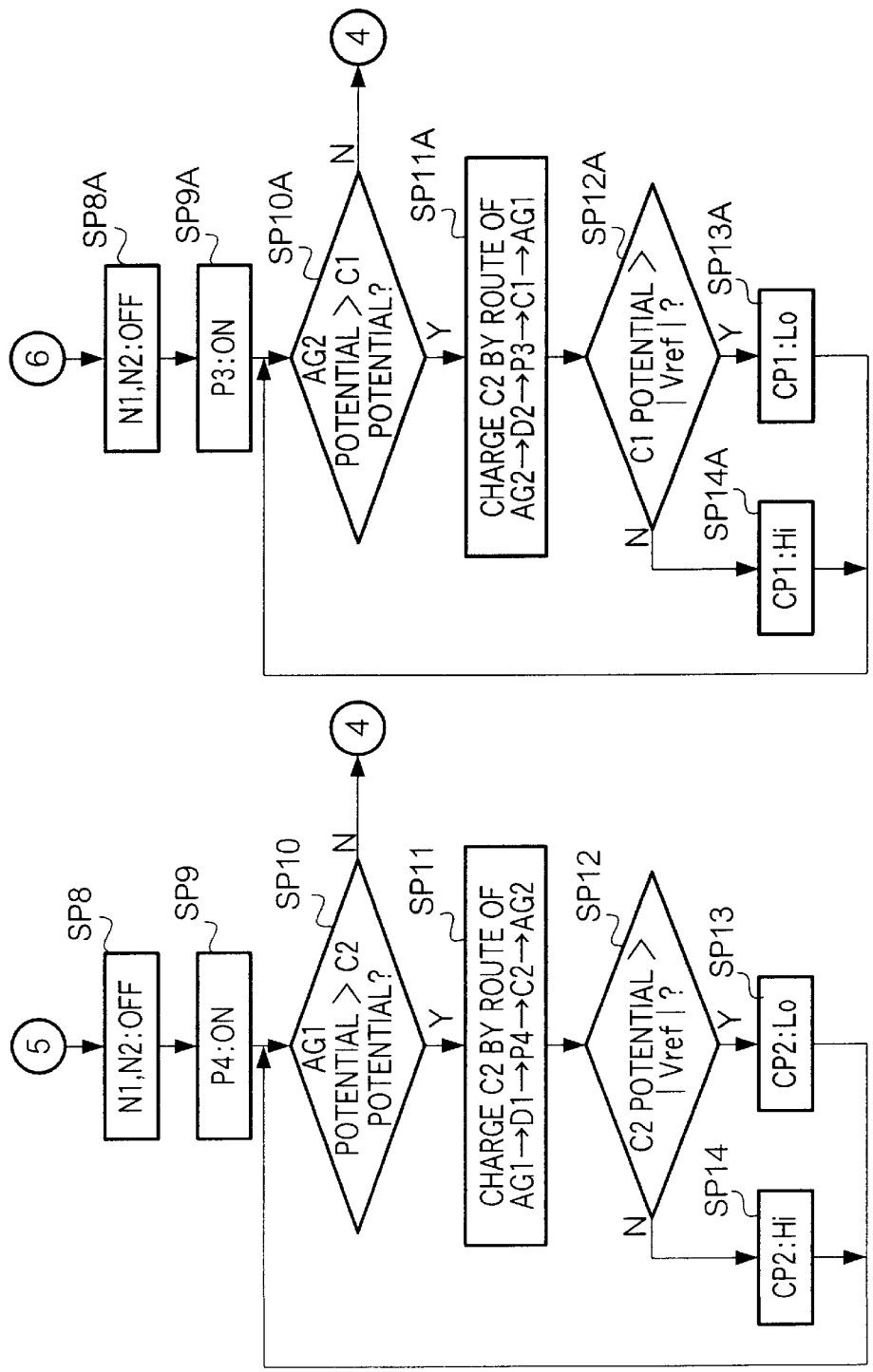
Figure 27:
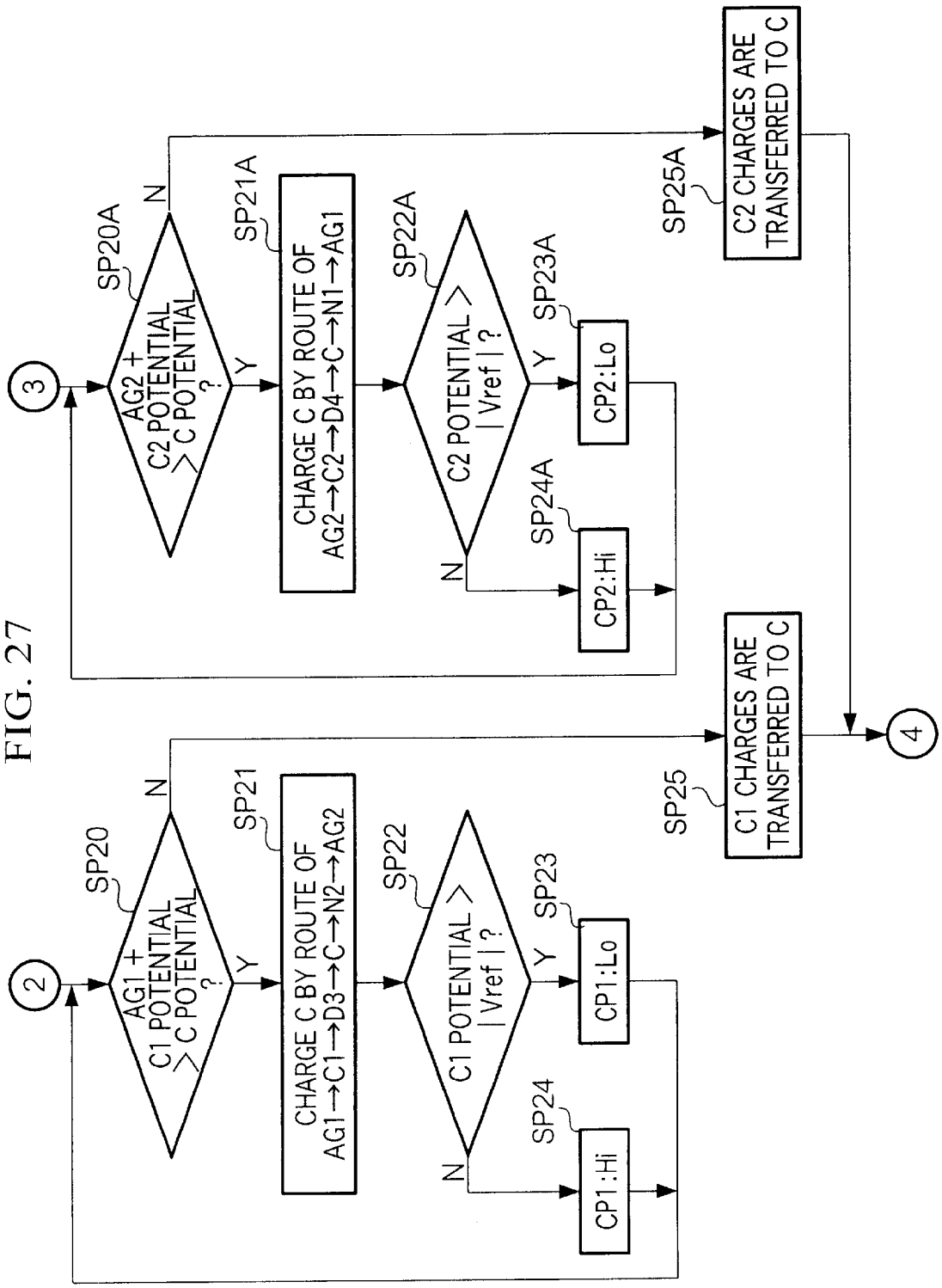
Figure 28:
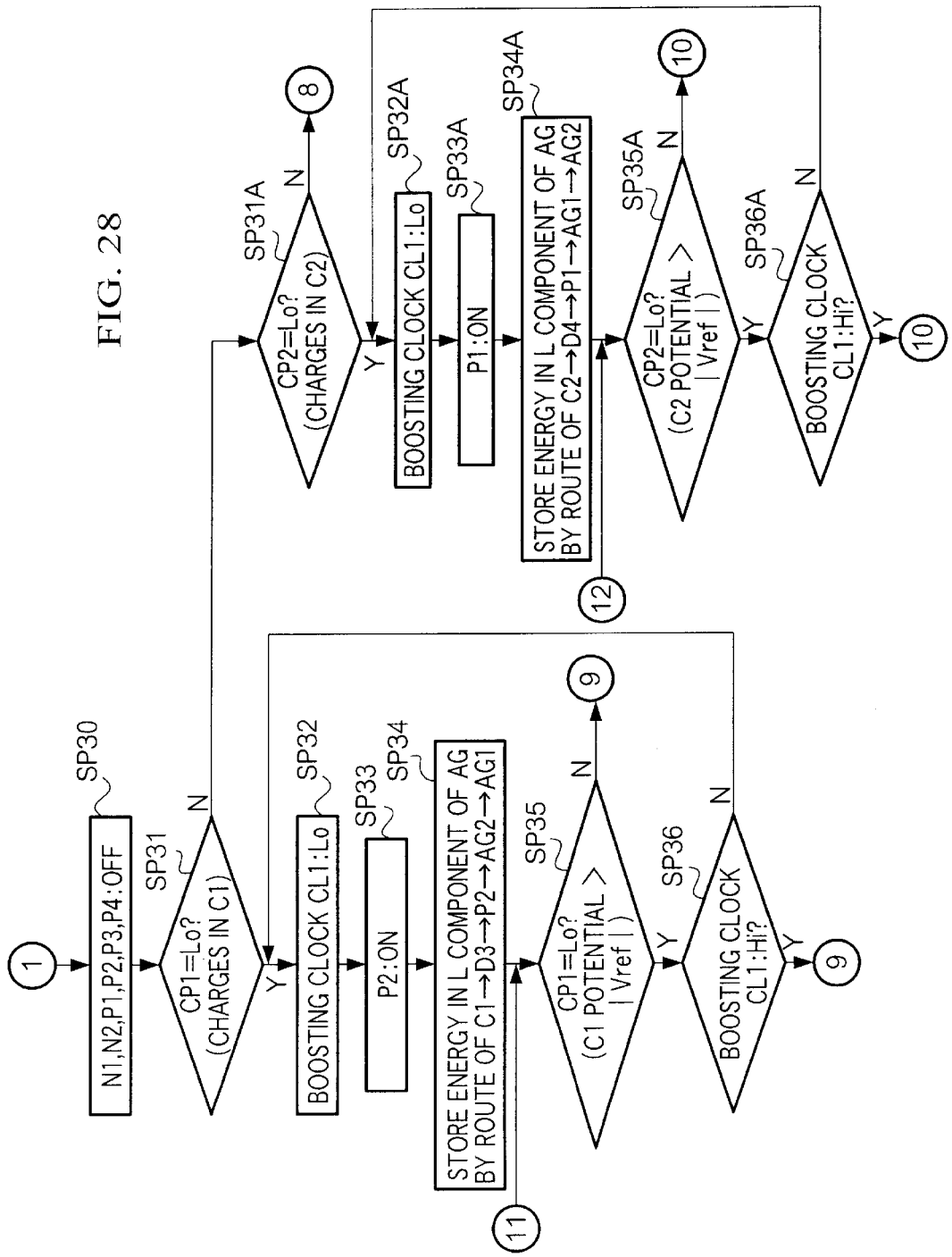
Figure 29:
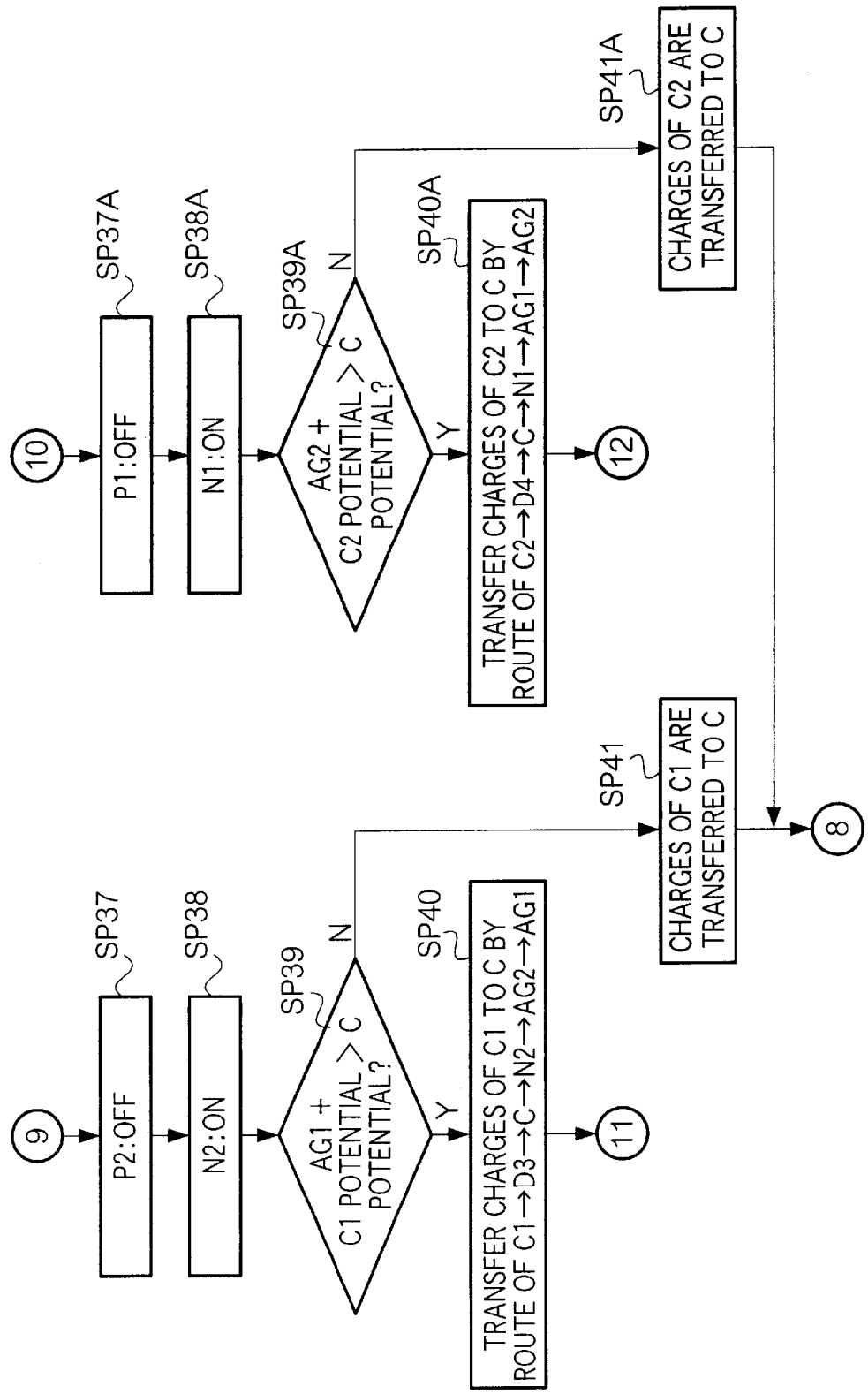

Next, an explanation will be made of the operation of the present embodiment when the AC generator is in the power generation state by referring to the drawings. FIG. 24 is a timing chart of the chopper charging circuit 200 according to the present embodiment. Here, it is assumed that this wristwatch is worn on the arm, and the induced voltage is intermittently generated in the AC generator AG. In the present example, at the time t1, the case where the signal ΦS is at the low level, that is, the case where the AC generator AG is in the power generation state and the output terminal AG1 side generates the positive polarity induced voltage is assumed. It is assumed that charges are not stored in the auxiliary capacitors C1 and C2. Further, FIGS. 25, 26, 27, 28, and 29 are flowcharts of the chopper charging circuit 200 according to the present embodiment.

Figure 30:
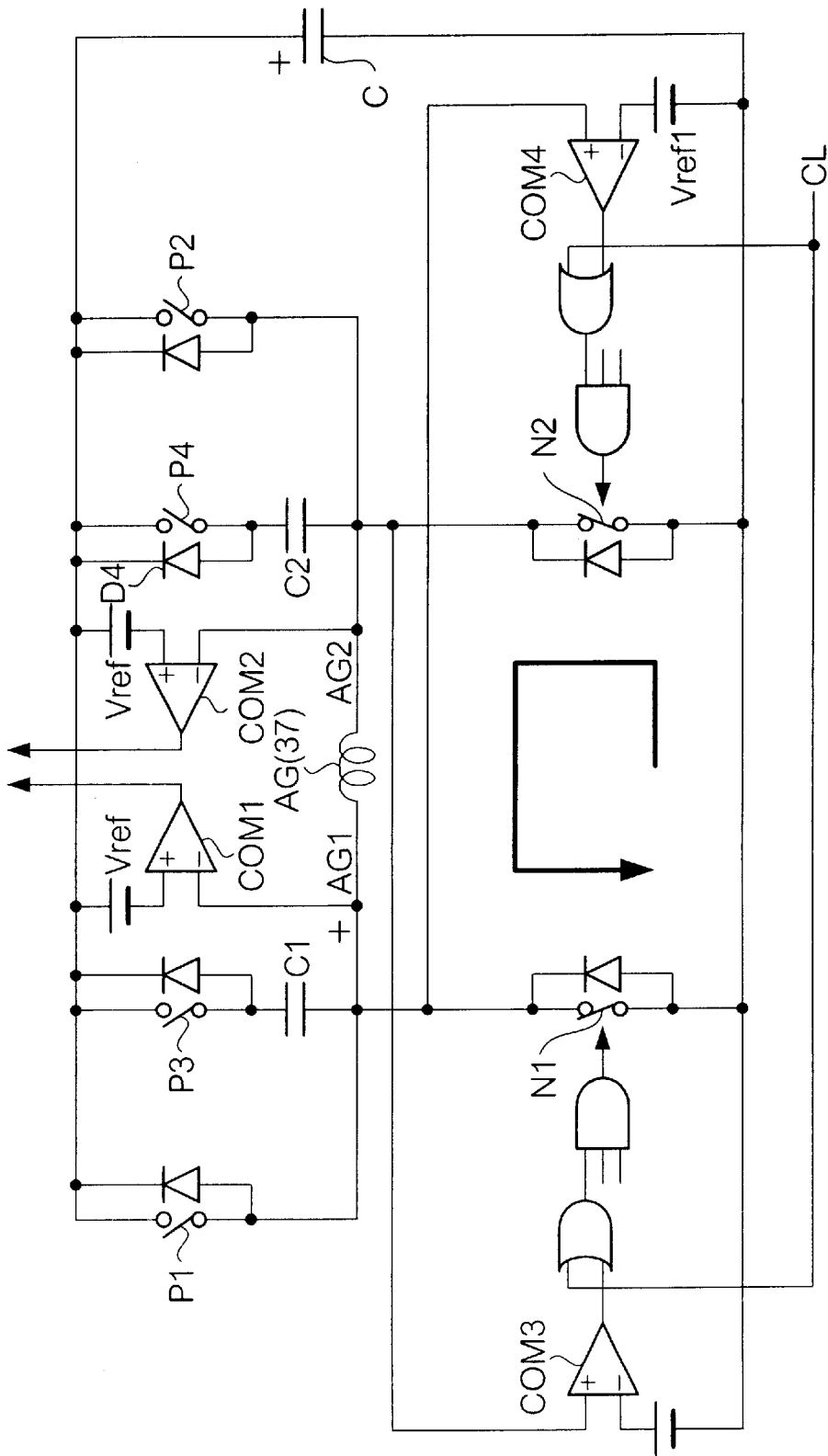
FIGS. 30 through 39 are diagrams provided for an explanation of the operation of the chopper charging circuit.

As shown in FIG. 24, when the clock signal CL becomes the high level at the time t1, the signals ΦN1 and ΦN2 become the high level as shown in FIG. 24, and the N-channel FETs N1 and N2 turn to the ON state (SP1 to SP3). Consequently, as shown in FIG. 30, the closed loop of the AC generator AG and the N-channel FETs N1 and N2 is formed. When the output terminal AGI becomes the positive potential by the induced voltage of the AC generator AG, as indicated by an arrow in FIG. 30, the current flows through the output coil L and the energy is stored in the inductance of the output coil L. Note that, for clarifying the connections of the P-channel FETs P1 to P4 and the N-channel FETs N1 and N2, in FIG. 25 and on, the P-channel FETs P1 to P4 and the N-channel FETs N1 and N2 are indicated by switches.

Figure 31:
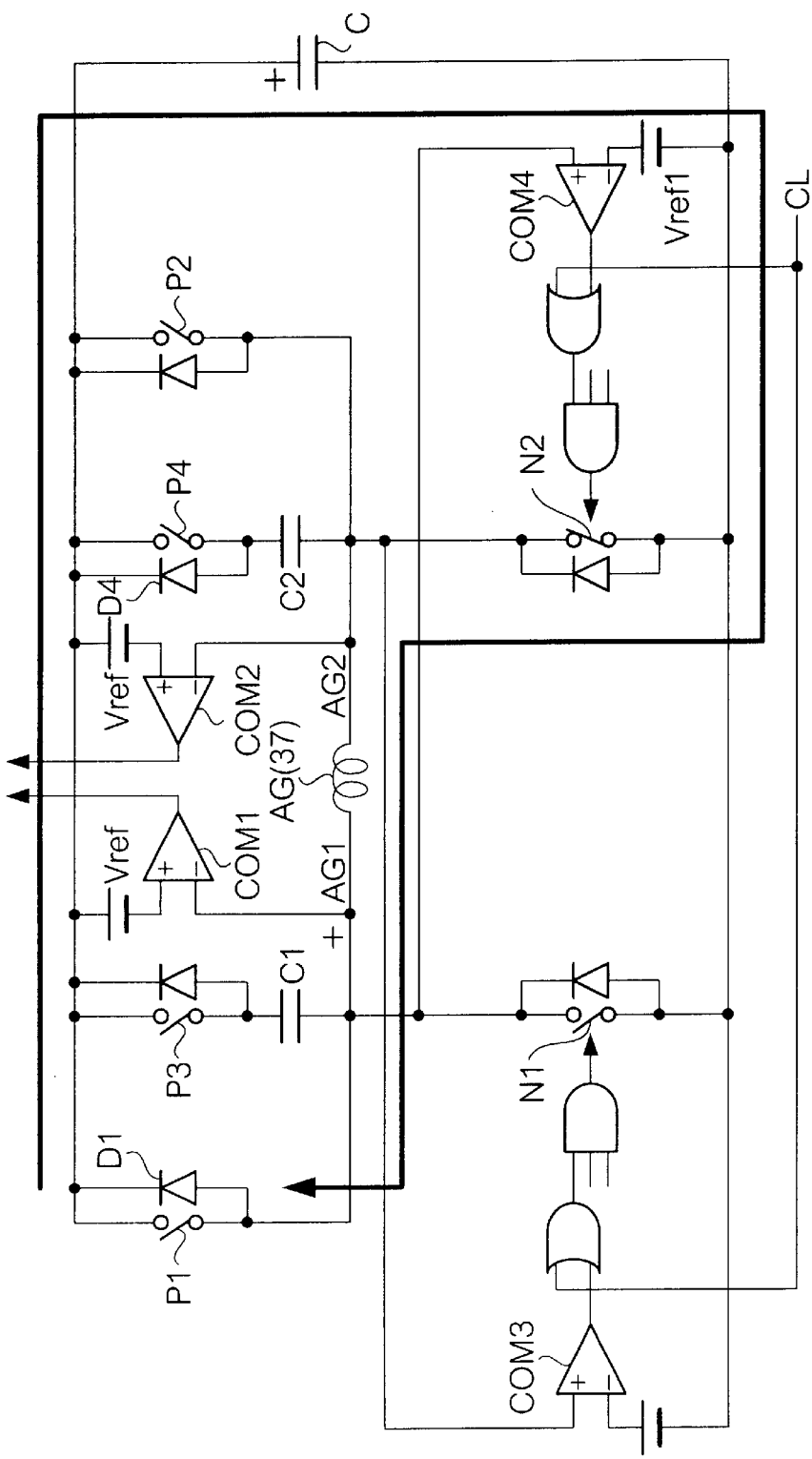

Next, as shown in FIG. 24, when the clock signal CL becomes the low level at the time t2, the signal ΦN1 becomes the low level and the N-channel FET N1 becomes the OFF state as shown in FIG. 24. In this case, by the energy stored at the inductance of the output coil 37, the voltage of the output terminal AG1 is boosted, the signal ΦN2 is maintained at the high level, and the N-channel FET N2 is maintained in the ON state as shown in FIG. 24 (SP4). Accordingly as shown in FIG. 24, the diode D1 becomes the ON state, a current route (first closed loop) to the main capacitor C is formed as indicated by the arrow in FIG. 31, the current flows through the route from the N-channel FET N2 via AC generator AG and diode D1 to main capacitor C, so that the main capacitor C is charged (SP5 to SP7).

Then, when the voltage of the output terminal AG1 is gradually reduced due to the charging of the main capacitor C and the forward voltage VF of the diode D1 becomes the voltage VrefF or less at the time t3, as shown in FIG. 24, the signal ΦP4 becomes the low level, and the P-channel FET P4 becomes the ON state. In this case, the N-channel FET N2 is compulsorily brought to the OFF state (FIG. 24, SP8, SP9). Accordingly, as indicated by the arrow in FIG. 32, the current flows through the route from the AC generator AG, via diode D1 and P-channel FET P4 to auxiliary capacitor C2 (second closed loop), so that the auxiliary capacitor C2 is charged (SP10, SP1).

Then, as shown in FIG. 24, the voltage of the auxiliary capacitor C2 rises due to the charging of the auxiliary capacitor C2. At the time t4, when the voltage of the auxiliary capacitor C2 becomes large with respect to the voltage |Vref|, as shown in FIG. 24, the signal CP2 becomes the low level (SP12, SP13). Then, when the clock signal CL becomes the high level at the time t5 (FIG. 24), the P-channel FET P4 becomes the OFF state (FIG. 24), the OFF state of the N-channel FET N2 is released, and the charging of the auxiliary capacitor C2 is ended.

Figure 32:
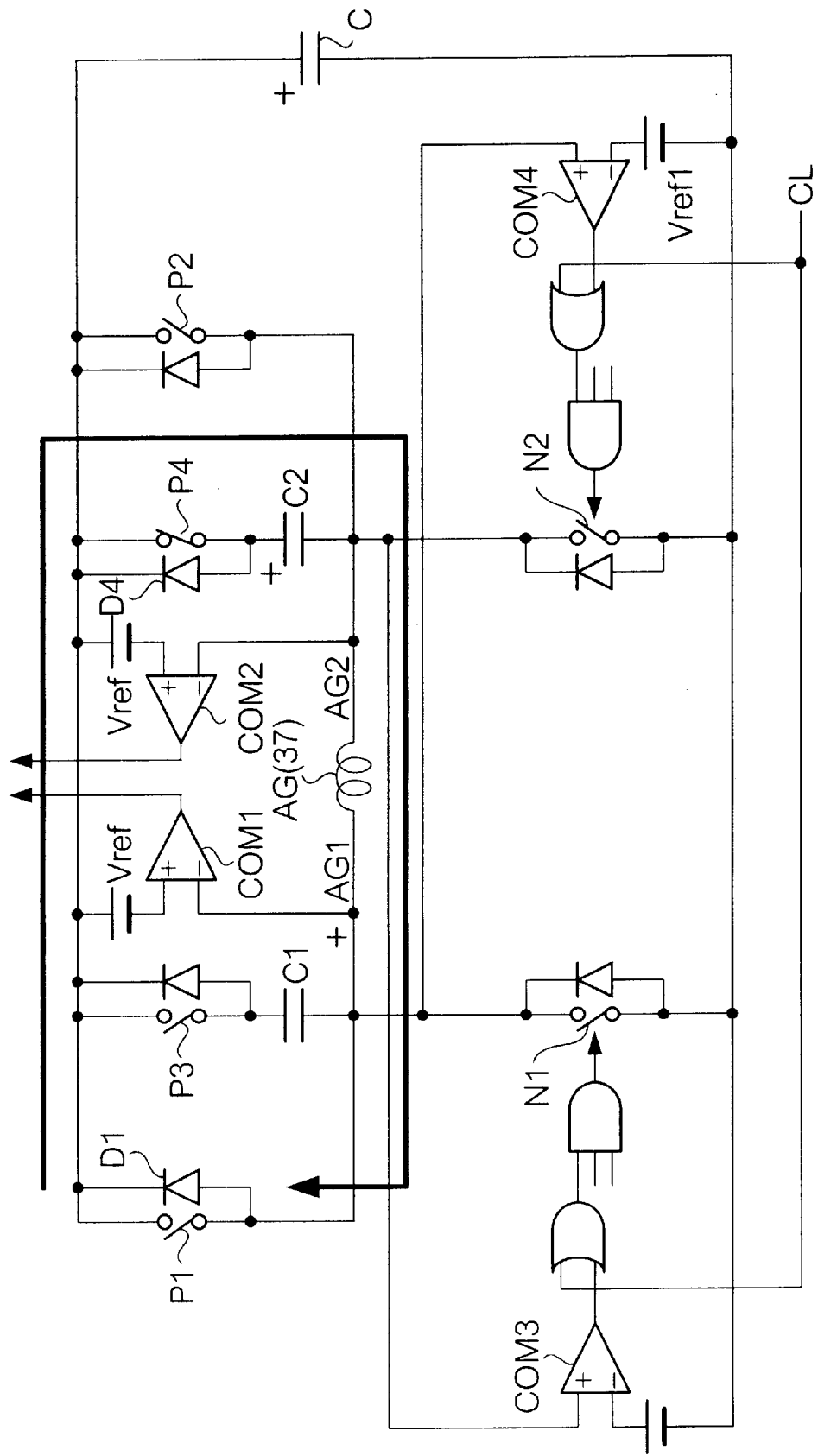

Further, when the clock signal CL becomes the high level at the time t5 (FIG. 24), the N-channel FETs N1 and N2 become the ON state as mentioned above, the closed loop of the AC generator AG and the N-channel FETs N1 and N2 is formed, the current flows through the output coil 37, and the energy is stored in the inductance of the output coil 37 (SP3). At this time, when the output terminal AG1 becomes the positive potential as mentioned above by the induced voltage of the AC generator AG, the cycle from the routine in FIG. 30 via the routine in FIG. 31 to the routine in FIG. 32 is repeated, and charging of the main capacitor C and the auxiliary capacitor C2 is repeated (time t5 to t6).

Figure 33:
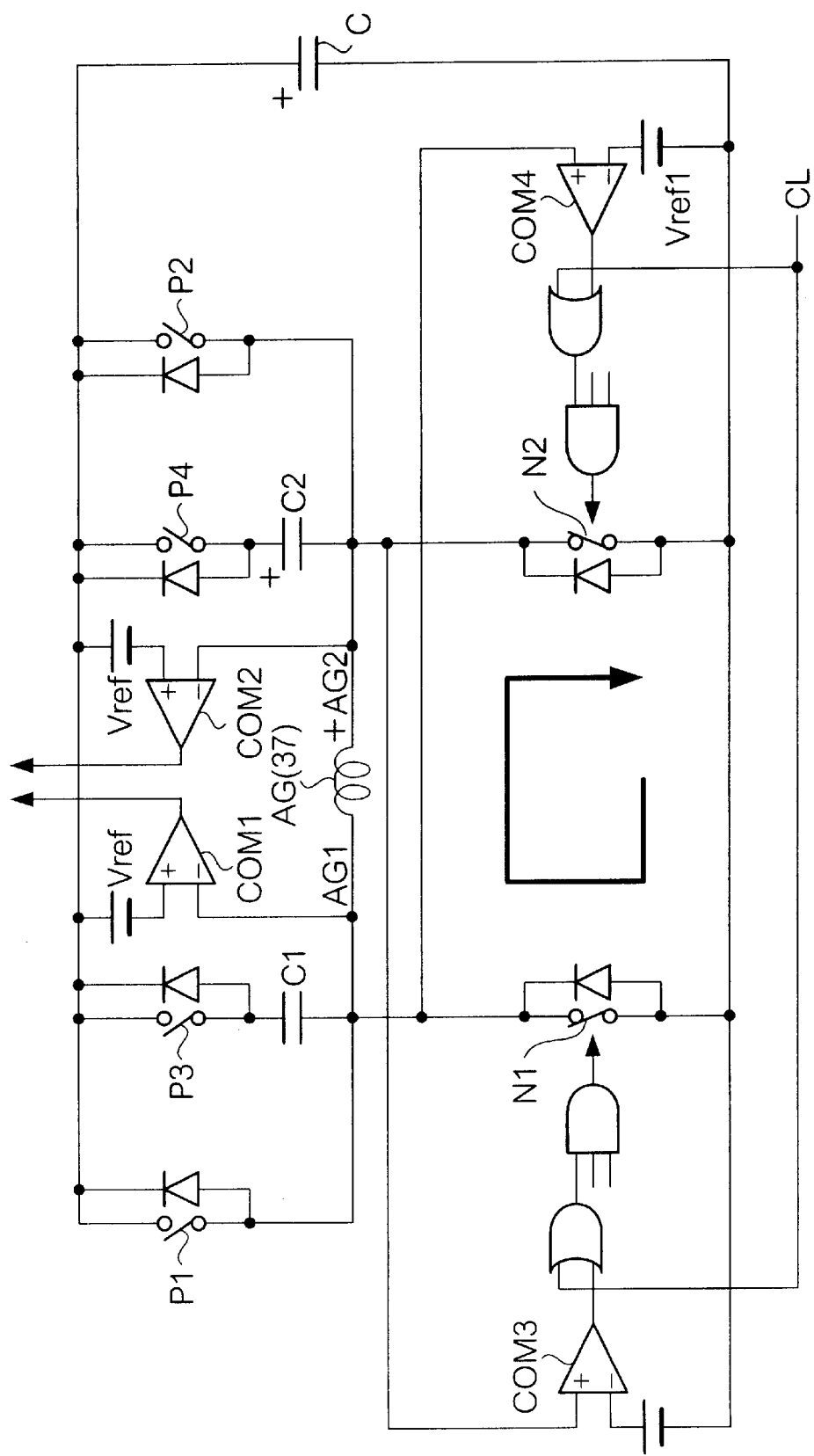

Contrary to this, when the output terminal AG2 becomes the positive potential by the induced voltage of the AC generator AG, when the closed loop of the AC generator AG and the N-channel FETs N1 and N2 is formed at the time t6, as indicated by the arrow in FIG. 33, the current flows through the output coil 37 and energy is stored in the inductance of the output coil 37 (SP2A, SP3A). In this case, as shown in FIG. 24, when the clock signal CL becomes the low level at the time t7, as shown in FIG. 24, the signal ΦN2 becomes the low level, the N-channel FET N2 becomes the OFF state, and the voltage of the output terminal AG2 is boosted by the energy stored at the inductance of the output coil 37 (SP4A).

Figure 34:
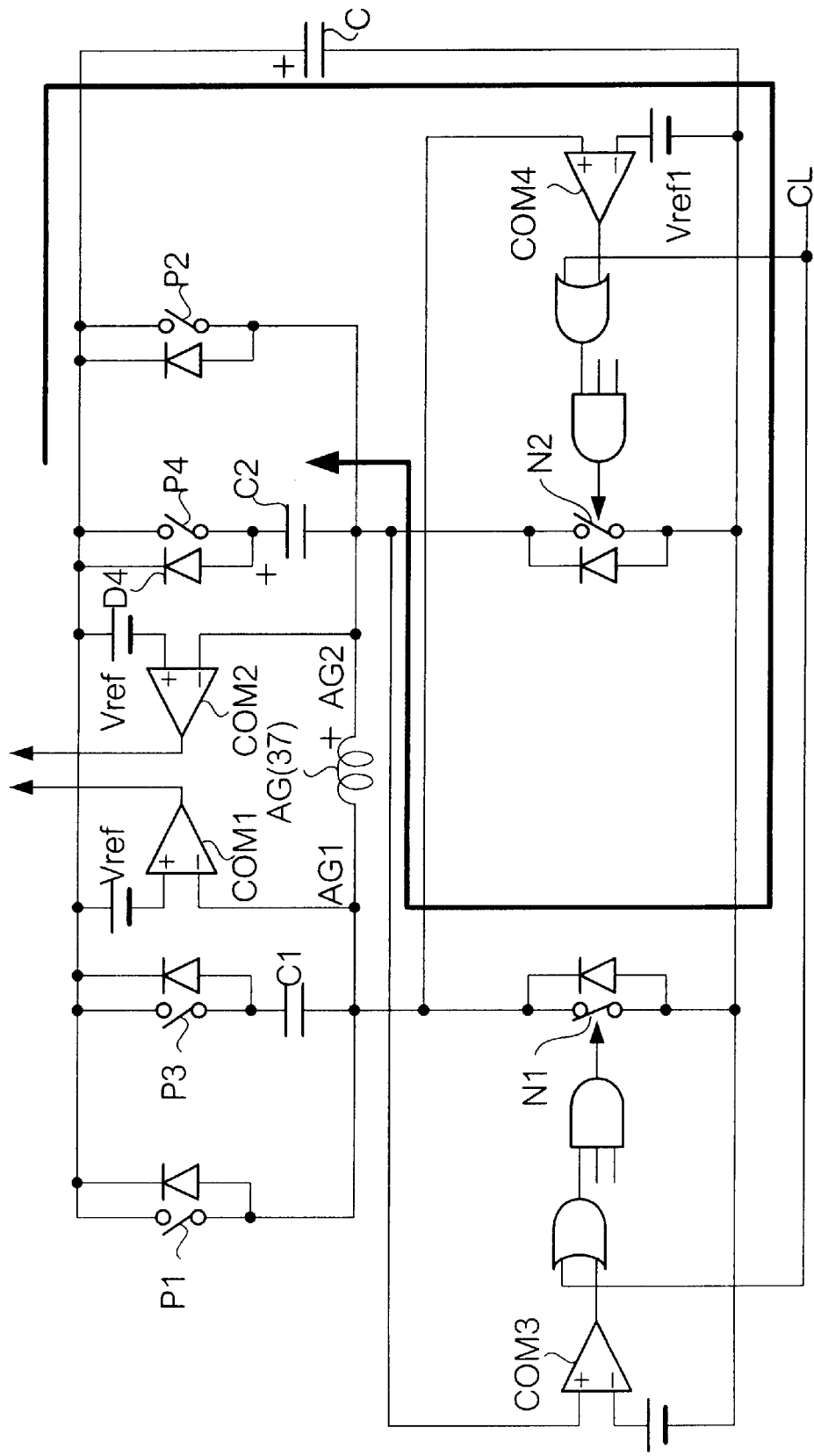

At this time, the auxiliary capacitor C2 has been already charged (SP5A: NO), therefore, as shown in FIG. 24, a diode D4 becomes the ON state, and, as indicated by the arrow in FIG. 34, the charge stored in the auxiliary capacitor C2 flows through a route comprised by the N-channel FET N1, AC generator AG, diode D4, and main capacitor C (SP20A to SP22A). Namely, in a case when a charge is stored in the auxiliary capacitor C2, when the voltage of the output terminal AG2 is converted to the chopper voltage, the charge stored in the auxiliary capacitor C2 can be charged (transferred) to the main capacitor C.

Then, as shown in FIG. 24, when the voltage of the auxiliary capacitor C2 is gradually reduced and the voltage of the auxiliary capacitor C2 becomes small with respect to the voltage |Vref| at a time t8, as shown in FIG. 24, the signal CP2 becomes the high level. Then, as shown in FIG. 24, the diode D2 becomes the ON state, and as indicated by the arrow in FIG. 35, the current flows through a route formed of the N-channel FET N1, AC generator AG, diode D2, and main capacitor C, so that the main capacitor C is charged (SP6A, SP7A).

On the other hand, the diode D4 becomes the OFF state when the transfer of the charge of the auxiliary capacitor C2 is ended. Here, the charge remains in the auxiliary capacitor C2 at the point of time t8, therefore there is a case where the diodes D2 and D4 are in the ON state. Accordingly, the charge remaining in the auxiliary capacitor C2 is also transferred to the main capacitor C. When the transfer of the charge ends, as shown in FIG. 24, the diode D4 becomes the OFF state. Accordingly, the charge stored in the auxiliary capacitor C2 and the energy stored in the inductance of the output coil 37 can be charged to the main capacitor C with a high efficiency.

Figure 36:
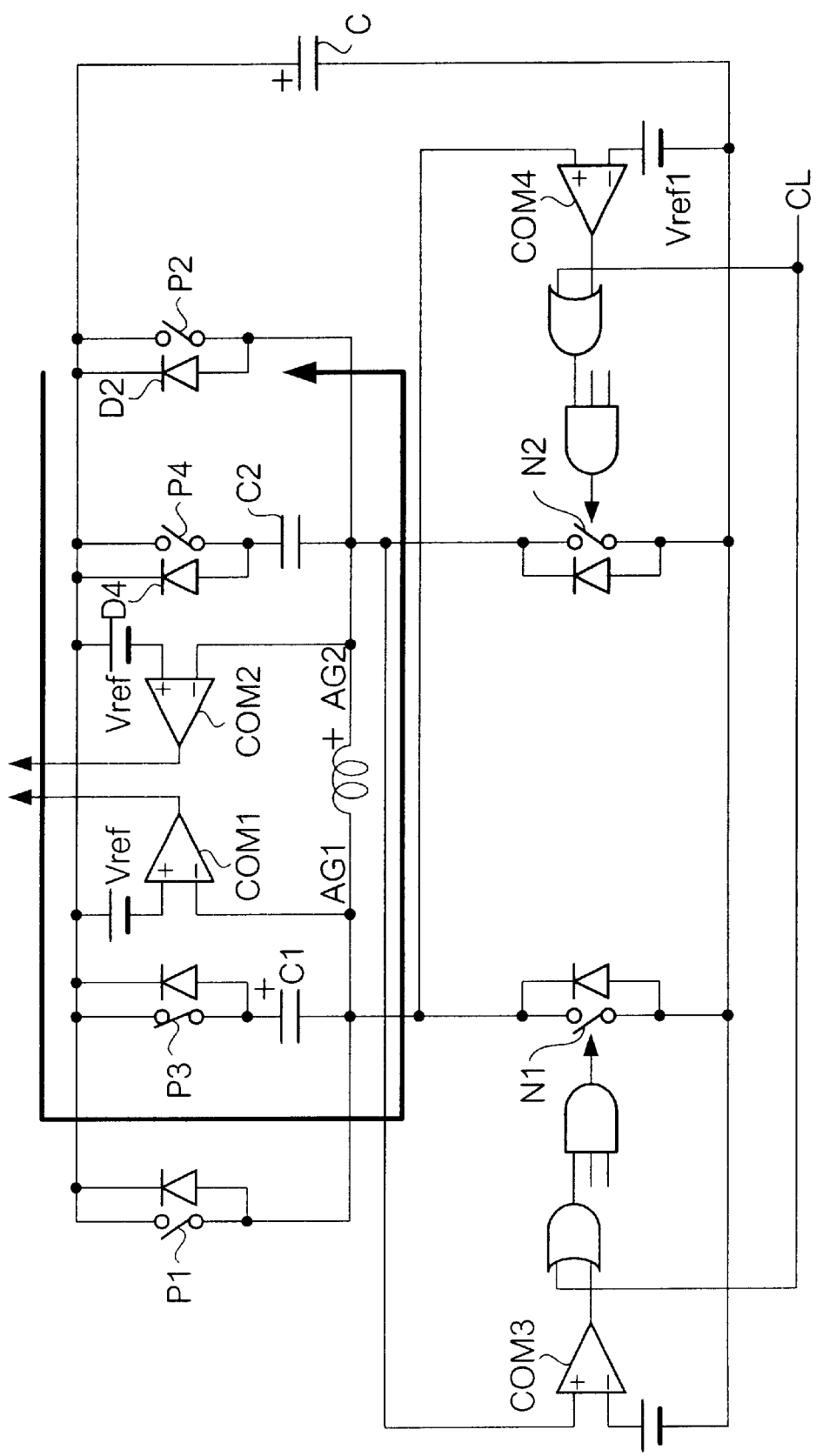

Next, when the voltage of the output terminal AG2 is gradually reduced by the charging of the main capacitor C, and the forward voltage VF of the diode D2 becomes the voltage VrefF or less at a time t9, as shown in FIG. 24, the signal ΦP3 becomes the low level and the P-channel FET P3 becomes the ON state (as denoted by SP6A, SP8A, and SP9A). In this case, the N-channel FET N1 is compulsorily brought to the OFF state. (FIG. 24). Therefore, as indicated by the arrow in FIG. 36, the current flows through a route formed of the AC generator AG, diode D2, P-channel FET P3, and auxiliary capacitor C1 (third closed loop), so that the auxiliary capacitor C1 is charged (SP60A, SP61A). For this reason, as shown in FIG. 24, the voltage of the auxiliary capacitor C1 rises, and at the time t10, when the voltage of the auxiliary capacitor C1 becomes large with respect to the voltage |Vref| (SP12A), as shown in FIG. 24, the signal CP1 becomes the low level (SP13A). Then, when the clock signal CL becomes the high level at the time t11 (FIG. 24), the P-channel FET P3 becomes the OFF state, the OFF state of the N-channel FET N1 is released, and the charging of the auxiliary capacitor C1 is ended.

Figure 35:
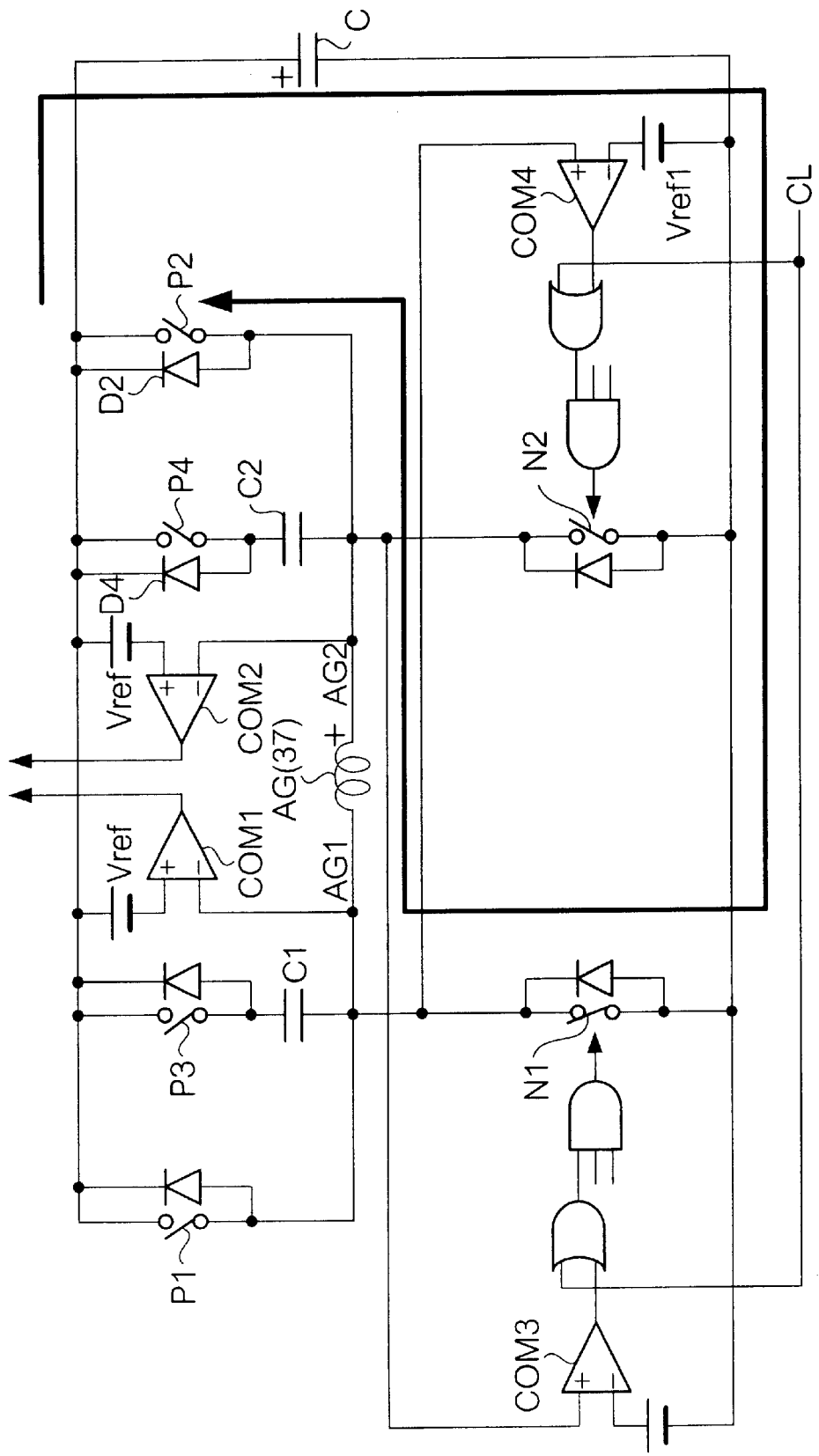

In this case, the N-channel FETs N1 and N2 become the OFF state as mentioned above, therefore the closed loop of AC generator AG and the N-channel FETs N1 and N2 is formed. When the output terminal AG2 has become the positive potential similar to the previous time, as shown in FIG. 33, the current flows through the output coil 37 and the energy is stored in the inductance of the output coil 37. Then, when the clock signal CL becomes the low level at the time t12 (FIG. 24), the signal ΦN2 becomes the low level, the N-channel FET N2 becomes the OFF state, and the voltage of the output terminal AG2 is boosted. As shown in FIG. 24, the diode D2 becomes the ON state, and the current flows through the route from the N-channel FET N1, via AC generator AG and diode D2 to main capacitor C as similar to the previous time as shown in FIG. 35, so that the main capacitor C is charged (SP2A to SP7A).

When the forward voltage VF of the diode D2 becomes the voltage VrefF or less at the time t13 due to the charging of the main capacitor C, as shown in FIG. 24, the signal ΦP3 becomes the low level, the P-channel FET P3 becomes the ON state, and the N-channel FET N1 becomes the OFF state (SP8A, SP9A). Accordingly, the energy stored at the inductance of the output coil 37 is charged in the auxiliary capacitor C1 (SP61A). When the clock signal CL becomes the high level at the time t14, the charging is ended as mentioned above.

Further, where a large induced voltage is generated at the AC generator AG and the voltage of for example the output terminal AGI becomes high, the N-channel FET N2 becomes the ON state, therefore the current route to the main capacitor C is formed via the diode D1 (SP51 to SP57) and, at the same time, the output signal CP6 of the comparator COM6 becomes the low level. The output signal CP6 is input to the AND circuit AN1 and prohibits the operation of the N-channel FET N1. Accordingly, the charging operation by the chopper is prohibited, and the current route by the non-chopper operation is secured. Note that when a charge is stored in the auxiliary capacitor C1, the current route to the main capacitor C is temporarily formed via the diode D3 in place of the diode D1 (SP20 to SP25). Accordingly, when a large induced voltage is generated in the AC generator AG, the main capacitor C can be directly charged without a chopper boosting operation.

In this way, this chopper charging circuit 200 directly charges the main capacitor C when a large induced voltage is generated in the AC generator AG in the case when the AC generator AG is in the power generation state, converts the energy stored in the inductance of the output coil 37 to a pulse-like chopper voltage when a small induced voltage is generated in the AC generator AG, first charges the main capacitor C, then switches to charging of the auxiliary capacitor C1 or C2 when the charging of the main capacitor C is ended. Accordingly, the induced voltage generated in the AC generator AG can be charged to the main capacitor C with a high efficiency, and the energy which cannot be charged in the main capacitor C can be stored in the auxiliary capacitor C1 or C2. Further, the chopper charging circuit 200 can store the charge stored in the auxiliary capacitor C1 or C2 in the main capacitor C by the next chopper boosting operation when the polarity of the induced voltage of the AC generator AG changes, thus the charging efficiency of the chopper charging circuit 200 can be raised.

Next, an explanation will be given of the operation of the chopper charging circuit 200 when the AC generator AG becomes the power non-generation state. When the wristwatch is taken off and the induced voltage is no longer generated in the AC generator AG, as shown in FIG. 24, the signal ΦS becomes the high level at the time t15 (SP1: NO). Note that, at this time, the signal CP1 is maintained at the low level (SP31, SP32). For this reason, as shown in FIG. 24, when the clock signal CL becomes the high level at the time t16, as shown in FIG. 24, the signal ΦP2 becomes the low level, and the P-channel FET P2 becomes the ON state (SP83). Accordingly, as shown in FIG. 24, the diode D3 becomes the ON state, and, as indicated by the arrow in FIG. 37, the current flows through a route from the auxiliary capacitor C1 via diode D3 and P-channel FET P2 to AC generator AG by the charge stored in the auxiliary capacitor C1, and the energy is stored in the inductance of the output coil 37 (SP34).

Then, when the voltage of the auxiliary capacitor C1 is gradually lowered and the voltage of the auxiliary capacitor C1 becomes small with respect to the voltage |Vref| at the time t17, as shown in FIG. 24, the signal CP1 becomes the high level. In this case, the voltage of the output terminal AG1 is boosted by the energy stored in the inductance of the output coil 37, and, as shown in FIG. 24, the signal ΦN2 becomes the high level, and the N-channel FET N2 becomes the ON state (SP86 to SP88). Consequently, as indicated by the arrow in FIG. 38, the current flows through a route from the N-channel FET N2, via AC generator AG, auxiliary capacitor C1, and diode D3 to main capacitor C, so that the main capacitor C is charged (SP39, SP40).

Figure 37:
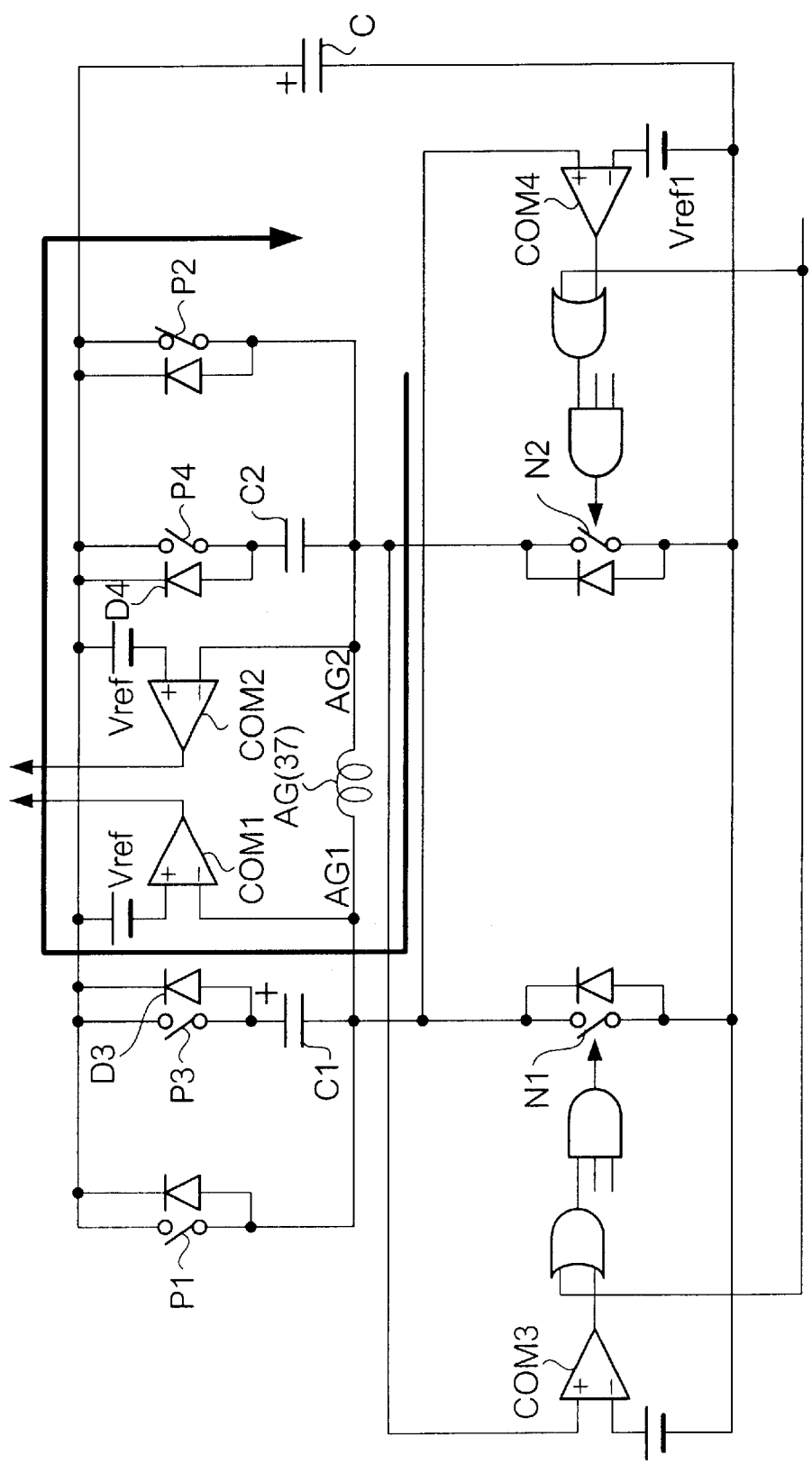
Figure 38:
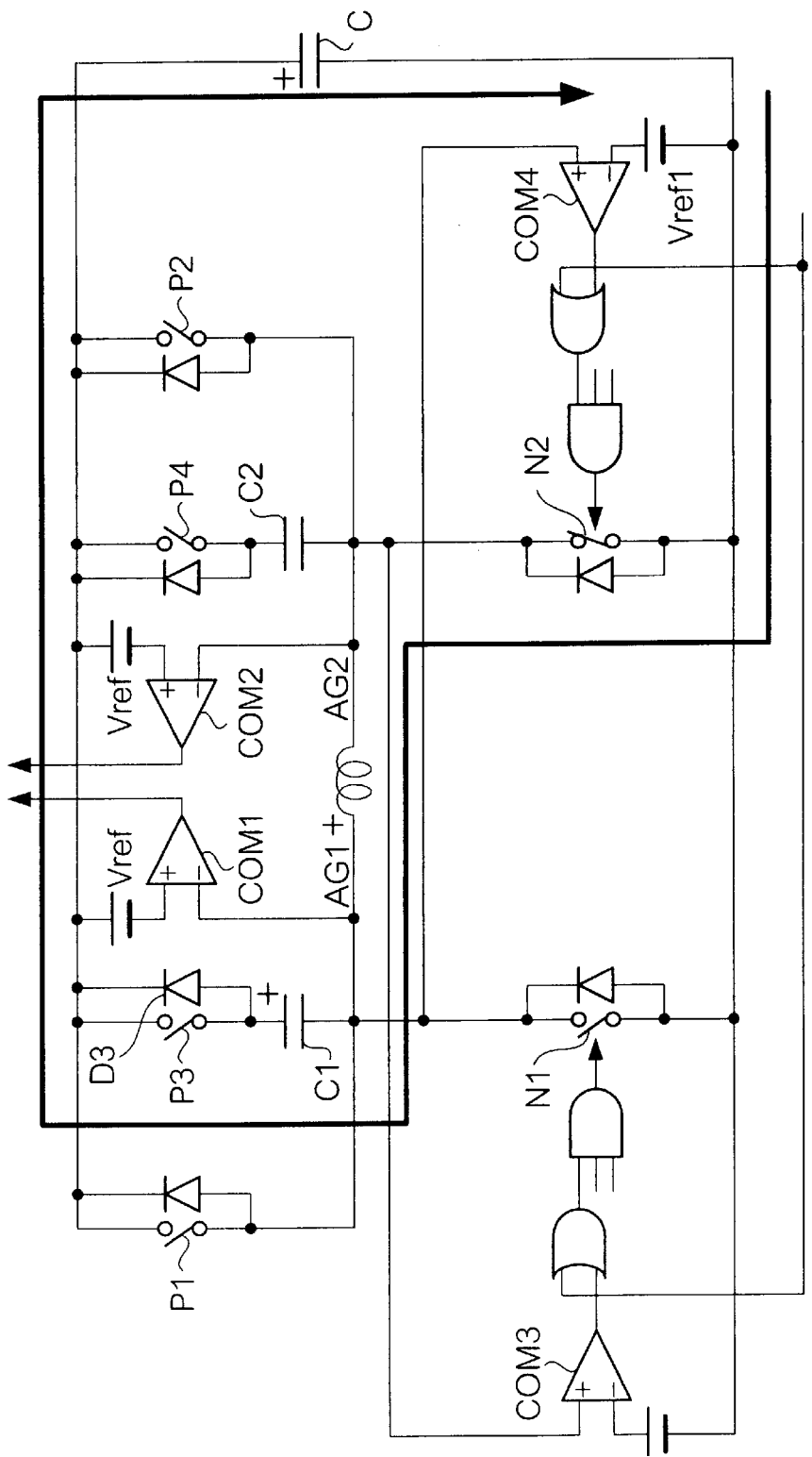

Here, when the AC generator AG is in the power non-generation state, the boosting use clock signal CL1 is supplied to the gate of the P-channel FET P2 as the signal ΦP2, therefore when the charge stored in the auxiliary capacitor C1 is large, the operations shown in FIG. 37 and FIG. 38 are repeated until the voltage of the auxiliary capacitor C1 becomes small with respect to the voltage |Vref|.

Accordingly, the charge stored in the auxiliary capacitor C1 can be converted to the chopper voltage and charged in the main capacitor C with a high efficiency (SP41). Note that, here, the case where the charge is stored in the auxiliary capacitor C1 at the point of time of the power non-generation state was explained, but the case where the charge is stored in the auxiliary capacitor C2 exhibits the same operation except the P-channel FET P1 and the N-channel FET N1 operate in place of the P-channel FET P2 and the N-channel FET N2 (SP31A to SP41A).

In this way, when the AC generator AG becomes the power non-generation state, the chopper charging circuit 200 of the present embodiment can charge the main capacitor C by chopper boosting the voltage of the output terminal AG1 or AG2 by the charge stored in the auxiliary capacitor C1 or C2. Accordingly, the chopper charging circuit 200 can charge the energy stored in the inductance of the output coil 37 with a high efficiency and can raise the charging efficiency in comparison with the conventional chopper charging circuit.

The present invention is not limited to the embodiments. For example, the various modifications mentioned below are possible.

First, the above embodiments were explained with reference to chopper charging circuit for charging the induced voltage of the AC generator AG, but the present invention is not limited to this. The present invention can also be applied to a chopper charging circuit for charging the induced voltage of a DC generator.

Figure 39:
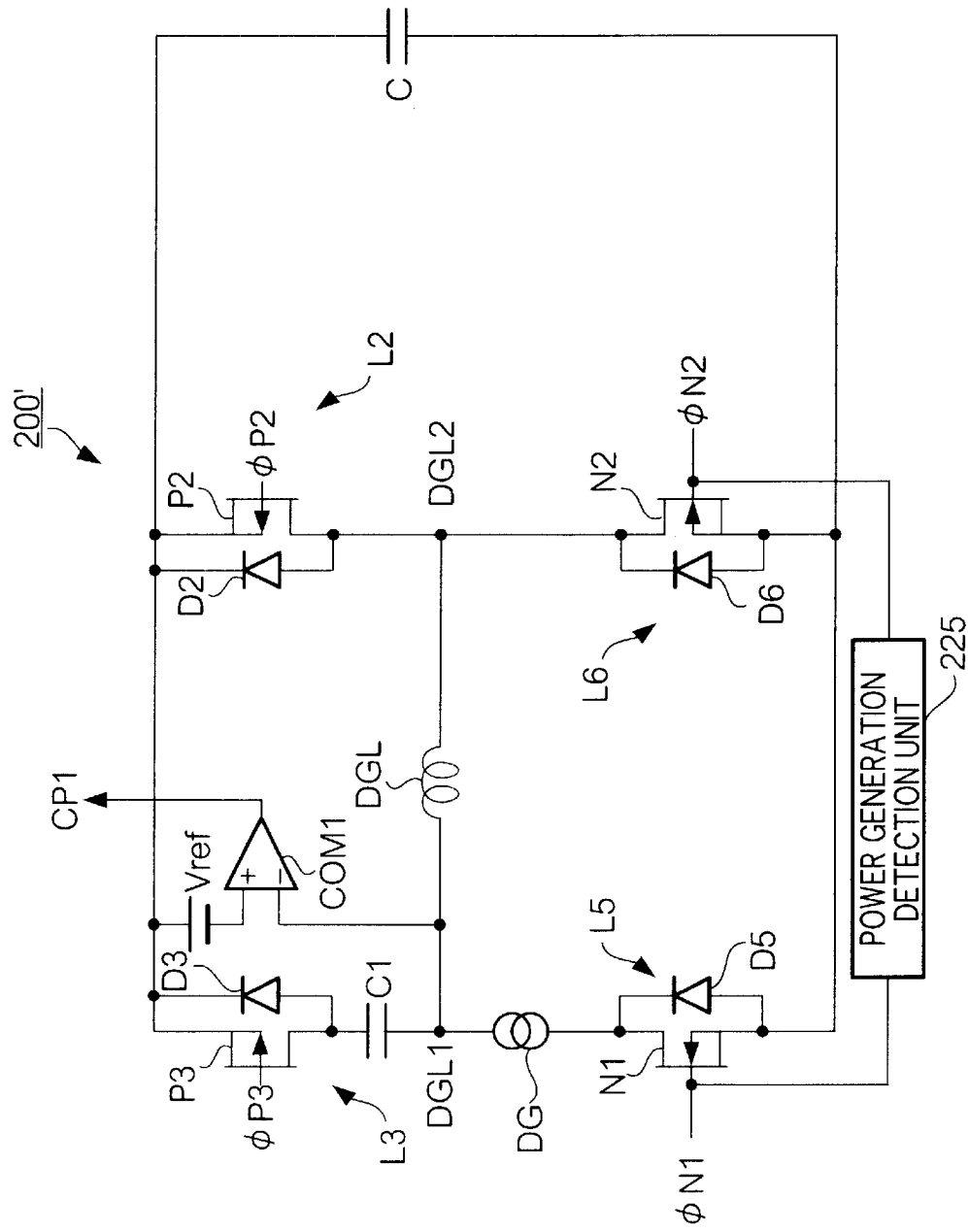

FIG. 39 is a circuit diagram of a chopper charging circuit 200' for charging the induced voltage of a DC generator. This chopper charging circuit 200' is configured by deleting the first and fourth lines L1 and L4, the circuit for generating the signals ΦP1, ΦP4 and CP6 for controlling the P-channel FETs P1 and P4 of the first and fourth lines L1 and L4 of the chopper control circuit 230, and the comparator COM2 from the chopper charging circuit 200 mentioned above.

Figure 40:
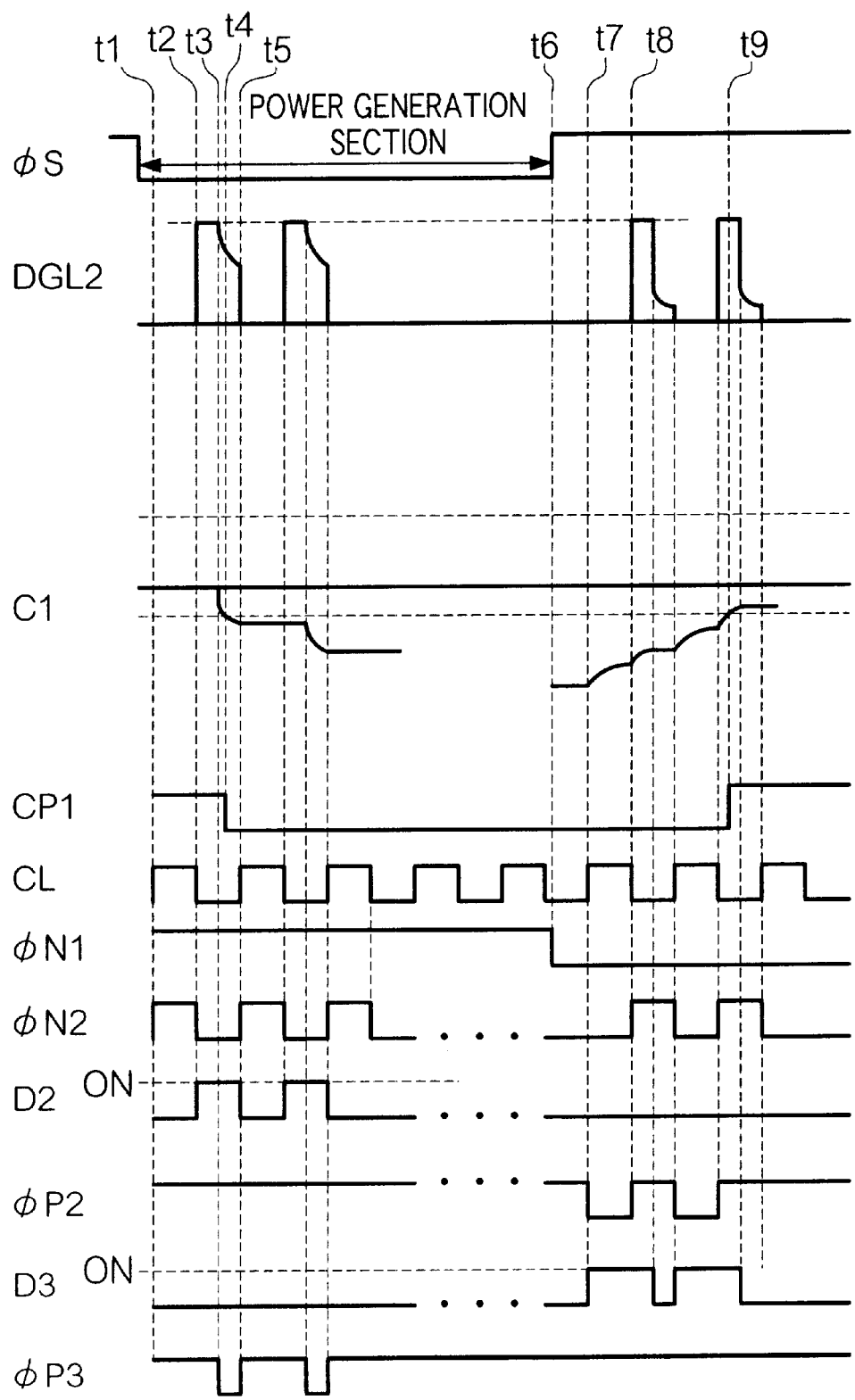
FIG. 40 is a timing chart of the operation of the chopper charging circuit according to a modification of the chopper charging circuit.
Figure 41:
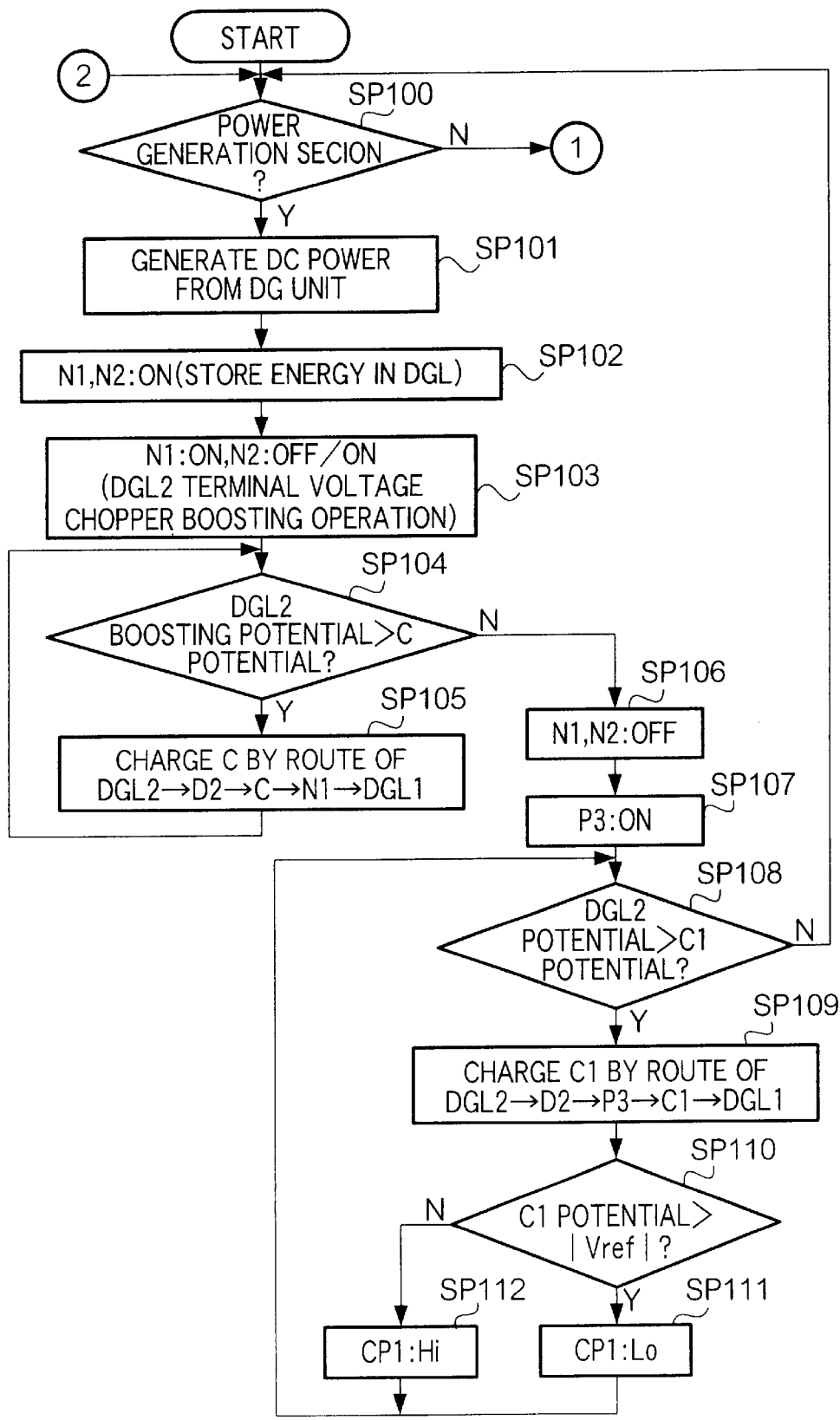
FIGS. 41 and 42 cooperate to form a flow chart of the operation of the chopper charging circuit.
Figure 42:
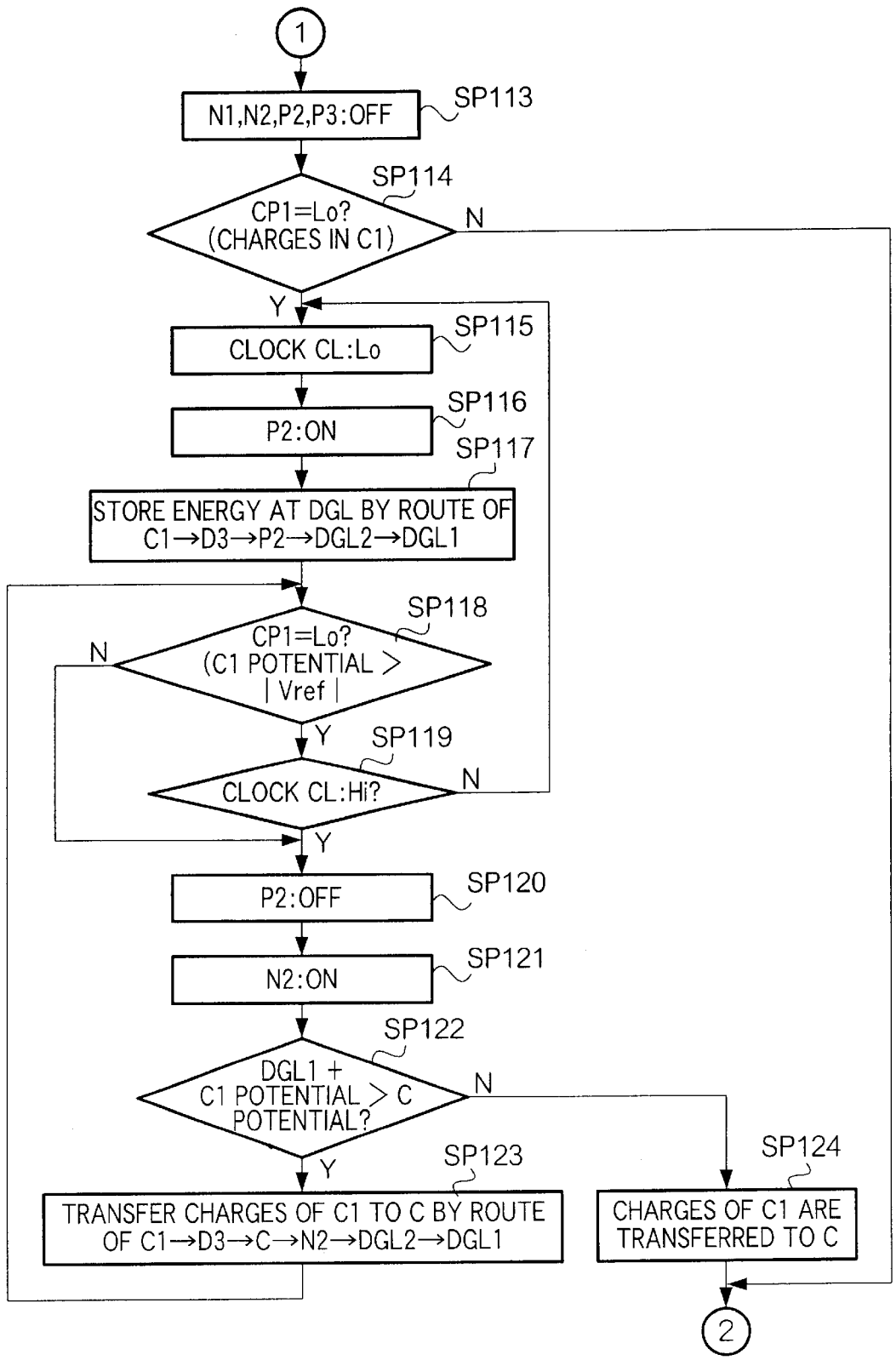

Further, FIG. 40 is a timing chart of the chopper charging circuit 200', and FIGS. 41 and 42 are flowcharts of the chopper charging circuit 200'. Here, at the time t1, the case where the signal ΦS is at the low level, that is, where the DC generator DG is in the power generation state, is assumed. Further, it is assumed that no charge is stored in the auxiliary capacitor C1 at the time t1.

Figure 43:
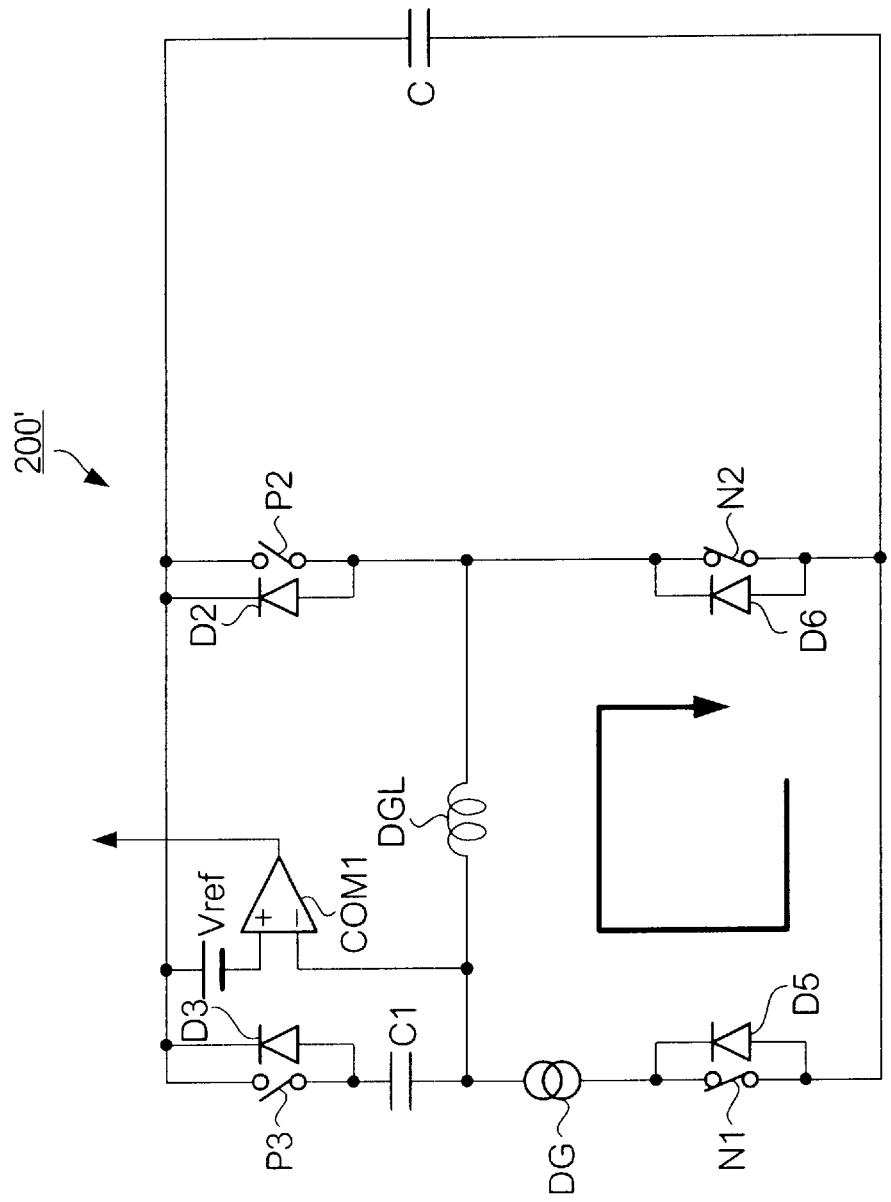
FIGS. 43 through 47 are drawings provided for the explanation of the operation of the chopper charging circuit.

As shown in FIG. 40, when the clock signal CL becomes the high level at the time t1, as shown in FIGS. 4OF and 40G, the signals ΦN1 and ΦN2 become the high level, and the N-channel FETs N1 and N2 turn to the ON state (SP100 to SP102). Consequently, as indicated by the arrow in FIG. 43, the closed loop of a chopper boosting coil DGL and the N-channel FETs N1 and N2 is formed, and energy is stored in the inductance of the chopper boosting coil DGL.

Figure 44:
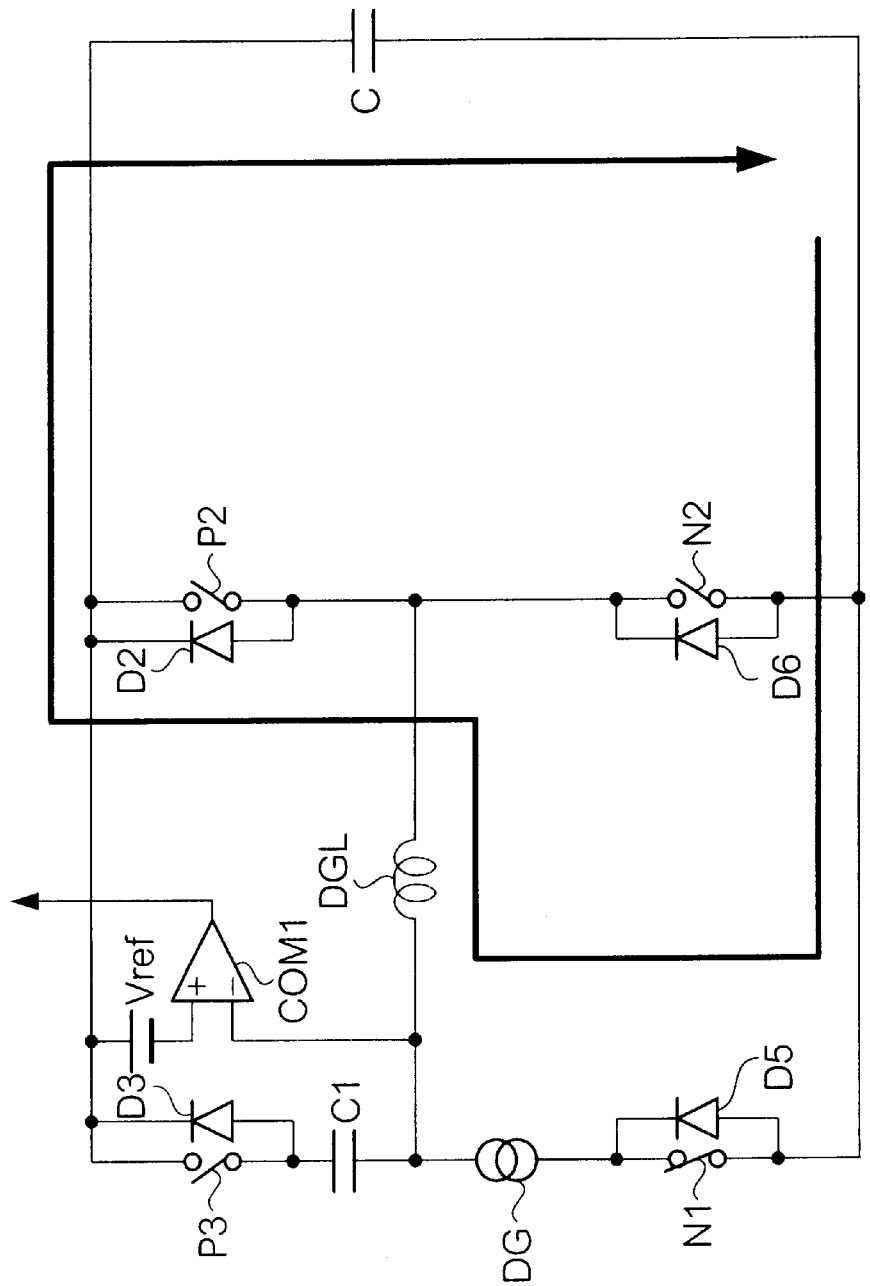

Next, as shown in FIG. 40, when the clock signal CL becomes the low level at the time t2, as shown in FIG. 40, the signal ΦN2 becomes the low level, and the N-channel FET N2 becomes the OFF state (SP103). In this case, by the energy stored in the inductance of the chopper boosting coil DGL, the voltage of the output terminal DGL2 is boosted. As shown in FIG. 40, the signal ΦN1 is maintained at the high level, and the N-channel FET N1 is maintained in the ON state. Accordingly as shown in FIG. 40, the diode D2 becomes the ON state, and as shown in FIG. 44, the current flows through a route from the N-channel FET N1 via DC generator DG, chopper boosting coil DGL, and diode D2 to main capacitor C, so that the main capacitor C is charged (SP104, SP105).

Figure 45:
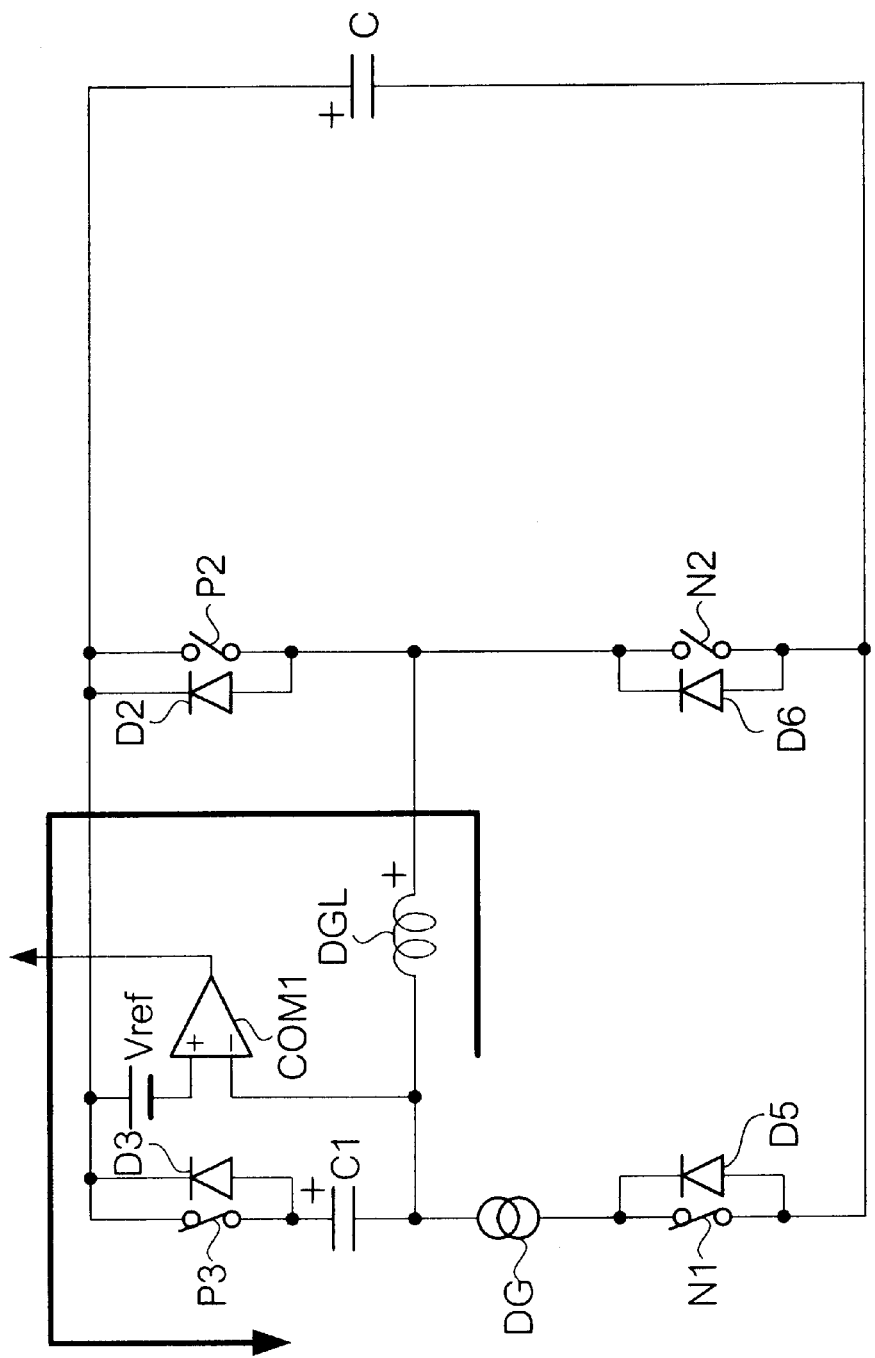

Then, when the forward voltage VF of the diode D2 is reduced due to the charging of the main capacitor C and the forward voltage VF of the diode D2 becomes small with respect to the voltage |Vref| at the time t3, as shown in FIG. 40, the signal ΦP3 becomes the low level, the P-channel FET P3 becomes the ON state, and the N-channel FET N2 becomes the OFF state (SP106, SP107). Accordingly, as shown in FIG. 45, the current flows through a route from the chopper boosting coil DGL via diode D2 and P-channel FET P3 to auxiliary capacitor C1, so that the auxiliary capacitor C1 is charged (SP108, SP109).

At this time, as shown in FIG. 40, the voltage of the auxiliary capacitor C1 rises. At the time t4, when the voltage of the auxiliary capacitor C1 becomes large with respect to the voltage |Vref|, as shown in FIG. 40, the signal CP1 becomes the low level (SP110, SP111). Then, when the clock signal CL becomes the high level at the time t5, as shown in FIG. 40, the signal ΦP3 becomes the high level and the P-channel PET P3 becomes the OFF state. In this case, the OFF state of the N-channel FET N2 is released, and the charging of the auxiliary capacitor C1 is ended. In this way, the operation of charging the main capacitor C when the charging of the main capacitor C is ended is repeated when the DC generator DG is in the power generation state (time t4 to t5).

Figure 46:
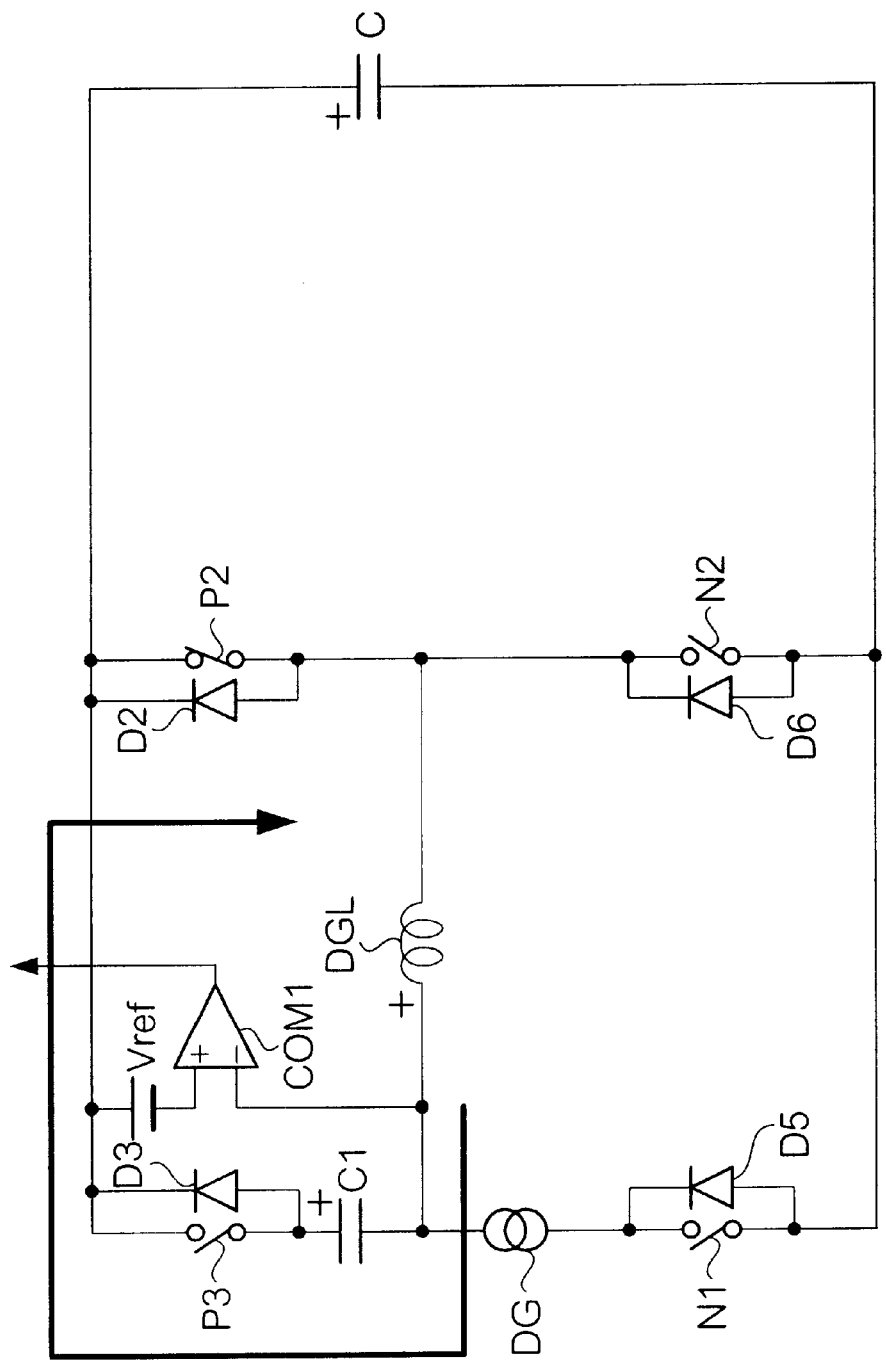

Next, when the DC generator DG becomes the power non-generation state, as shown in FIG. 40, the signal ΦS becomes the high level at the time t6. Then, when the clock signal CL becomes the high level at the time t7 (FIG. 40), the signal ΦP2 becomes the low level (FIG. 40), and the P-channel FET P2 becomes the ON state (SP113 to SP116). Accordingly, as shown in FIG. 40, the diode D3 becomes the ON state, and as shown in FIG. 46, the current flows through a route from the auxiliary capacitor C1 via diode D3 and P-channel FET P2 to chopper boosting coil DGL by the charge stored in the auxiliary capacitor C1 (SP117). Accordingly, energy is stored in the inductance of the chopper boosting coil DGL.

Figure 47:
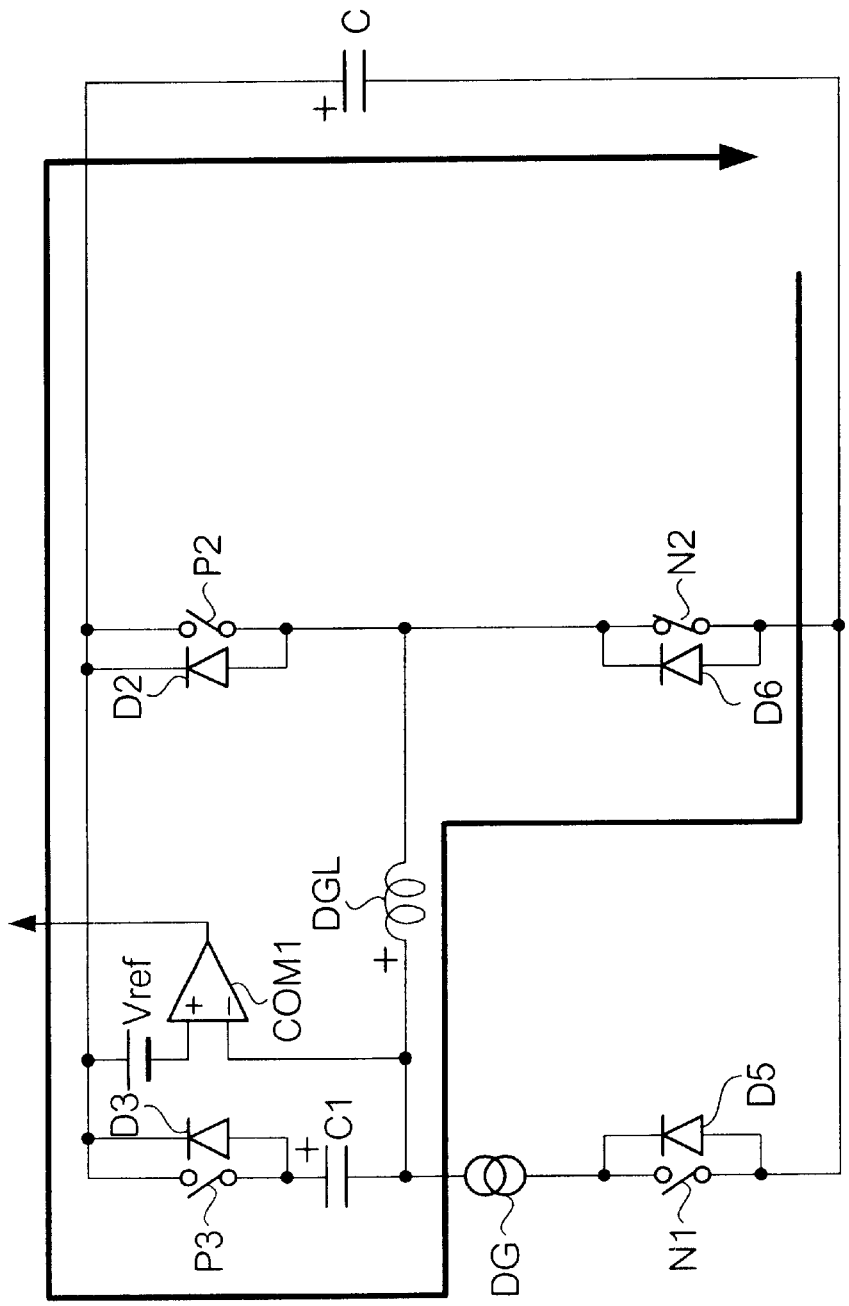

Then, when the clock signal CL becomes the low level at the time t8 (FIG. 40), the signal ΦN2 becomes the high level (FIG. 40), and the N-channel FET N2 becomes the ON state (SP118 to SP121). In this case, the voltage of the output terminal DGL1 is boosted by the energy stored in the inductance of the chopper boosting coil DGL. As shown in FIG. 47, the current flows through a route formed of the N-channel FET N2, chopper boosting coil DGL, diode D3, and main capacitor C, so that the main capacitor C is charged (SP122, SP123). In this way, until the voltage of the auxiliary capacitor C1 becomes small with respect to the voltage |Vref|, the operations shown in FIG. 46 and FIG. 47 are repeated, and the main capacitor C is charged. Then, at the time t9, when the voltage of the auxiliary capacitor C1 becomes small with respect to the voltage |Vref|, the signal CP1 becomes the high level (FIG. 40), and the charging of the main capacitor C by the auxiliary capacitor C1 is ended.

Accordingly, also in the chopper charging circuit 200' for charging the induced voltage of the DC generator, the energy which cannot be charged in the main capacitor C is stored in the auxiliary capacitor C1, and finally the energy stored in the main capacitor C can be charged in the main capacitor C, so the charging efficiency can be raised.

Second, in the above embodiments, the induced voltage of the AC generator or the DC generator is charged, but the present invention is not limited to this. The invention can be widely applied to also cases where power of an AC power supply such as a commercial AC power supply and electro-magnetic waves or a DC power supply such as a DC generator and a solar battery is charged. Note that when the induced voltage of the AC power supply is charged, the chopper boosting coil is separately provided in place of the output coil 37. Further, as the method of inputting the power, it is also possible to apply a method of inputting power by a contact-less method, for example, inputting induction power via the coil. For example, there is a method in which the chopper charging circuit is provided with a reactance element in place of the output coil 37, and the power of the power supply is input by electromagnetic wave induction by this reactance element.

Third, in the above embodiments, as an example of the switch unit, the P-channel FETs P1 and P2 and the N-channel FETs N1 and N2 were exemplified, but it is also possible to use PNP type transistors in place of the P-channel FETs P1 and P2 and use NPN type bipolar transistors in place of the N-channel FETs N1 and N2. Note that in these bipolar transistors, usually a saturated voltage between an emitter and a collector is about 0.3V, therefore where the induced voltage of the AC generator AG is small, desirably the FET is used as in the above embodiments.

Figure 48:
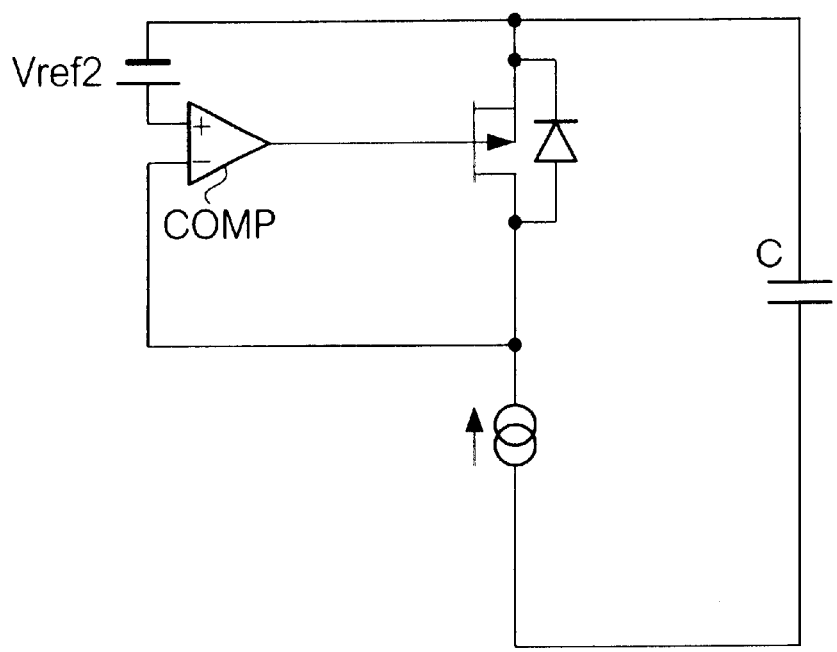
FIG. 48 is a circuit diagram of a one-directional unit according to the modification.

Fourth, in the third embodiment, it is also possible to provide a one-directional unit configured by a comparator and P-channel FET shown in FIG. 48 in place of the diodes D1, D2, D3, and D4. In this case, it is also possible to jointly use the P-channel FET of the one-directional unit with each of the P-channel FETs P1, P2, P3, and P4. Further, as for the one-directional unit provided in place of the diodes D1 and D2, it is also possible to jointly use the comparator with the comparators COM5 and COM6 in the auxiliary charging control circuit 250.

Fifth, in the above embodiments, a wristwatch is exemplified as an electronic apparatus using a chopper charging circuit, but the present invention is not limited to this. The invention can also be applied to for example a portable blood pressure manometer, a portable telephone, a pager, and a pedometer. In summary, the present invention can be applied to any apparatus so far as it is an electronic apparatus consuming power, particularly a portable electronic apparatus. In such an electronic apparatus, even if there is no battery, the electronic circuit or mechanical system involved therein can be continuously operated, therefore the electronic apparatus can be used anytime and troublesome replacement of batteries can be made unnecessary. Further, there is no problem accompanying disposal of batteries.

Note that, it is also possible to use the battery also with the chopper charging circuit. In this case, where the electronic apparatus is not carried for a long time, the electronic apparatus can be immediately operated by power from the battery. Thereafter, by the user carrying the electronic apparatus around, the electronic apparatus can be operated by the power generated.

Sixth, in the above embodiments, it is also possible to configure the comparators COM1 to COM4 and the logic circuits by using FETs and build the entire chopper charging circuit on one IC chip.

Seventh, in the above embodiments, the chopper operation was carried out by switching the N-channel FETs N1 and N2 on the low potential side line LL side synchronous to the clock signal CLK1, but it is also possible to configure the comparators COM1 to COM4 and the logic circuits etc. in a reversed vertical position so that they switch the P-channel FETs P1 and P2 on the power supply side. In this case, the relationship of the power supply and the low potential side line LL becomes reverses, therefore, resistors R1 and R2 shown in FIG. 2 are connected to the power supply, and the reference voltage Vref is given to the power supply. Further, the reference voltages Vref1 and Vref2 are given to the power supply. Namely, the reference voltages will be given to the line with the FET switching connected thereto. In short, any configuration is possible so far as the voltages of the output terminals AG1 and AG2 of the AC generator AG are compared with two threshold values, the power is supplied to the comparator in accordance with the comparison result, and the current consumption is reduced when performing the chopper operation between two lines.

Figure 51:
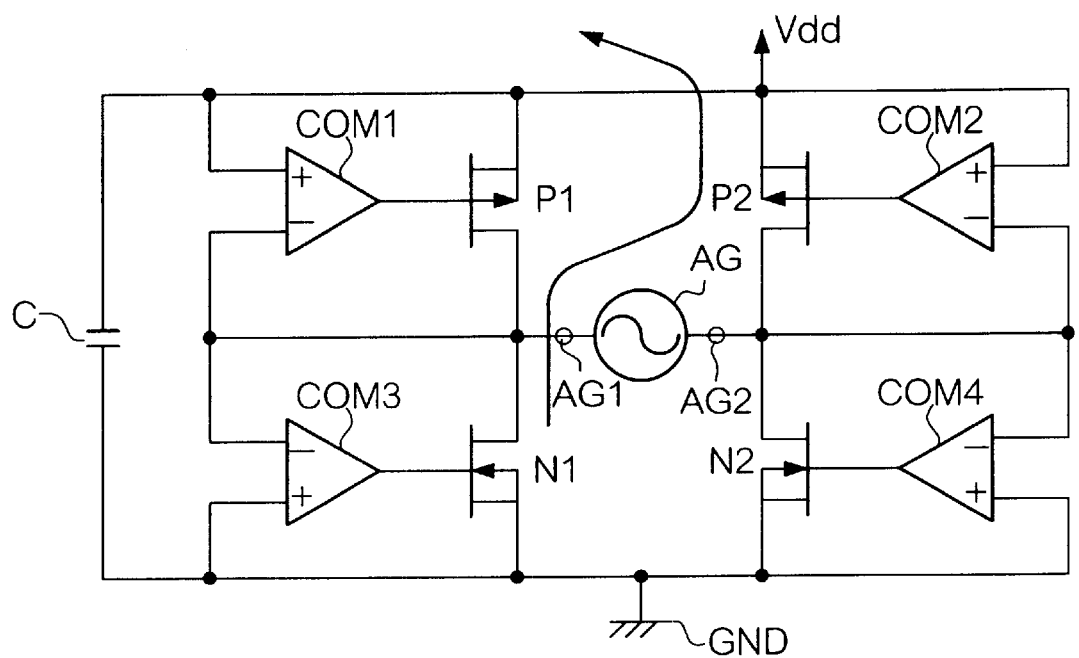
FIG. 51 is a circuit diagram of the configuration of a conventional charging circuit.
Figure 52:
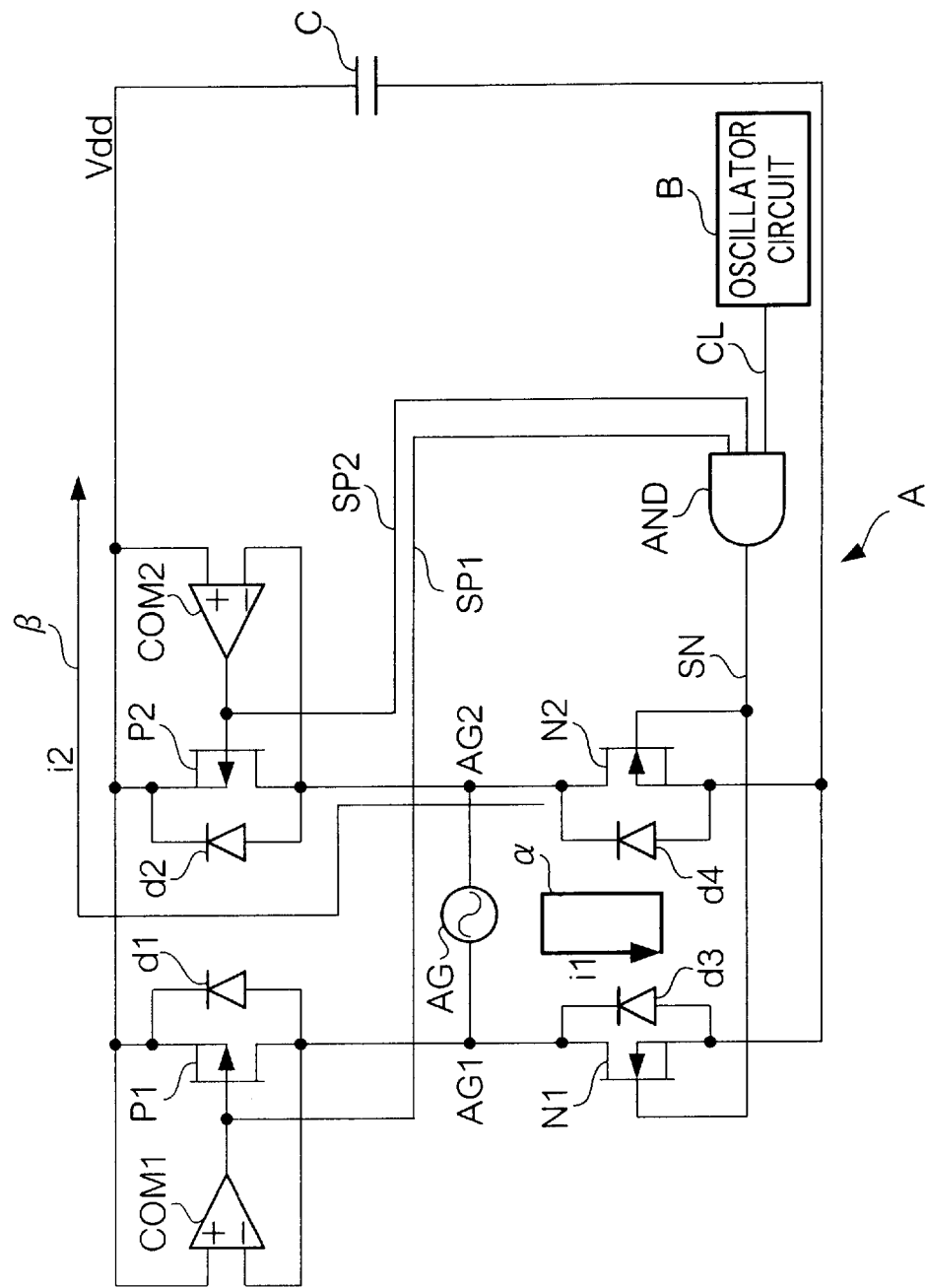
FIG. 52 is a circuit diagram of a chopper charging circuit of the prior art.
Figure 53:
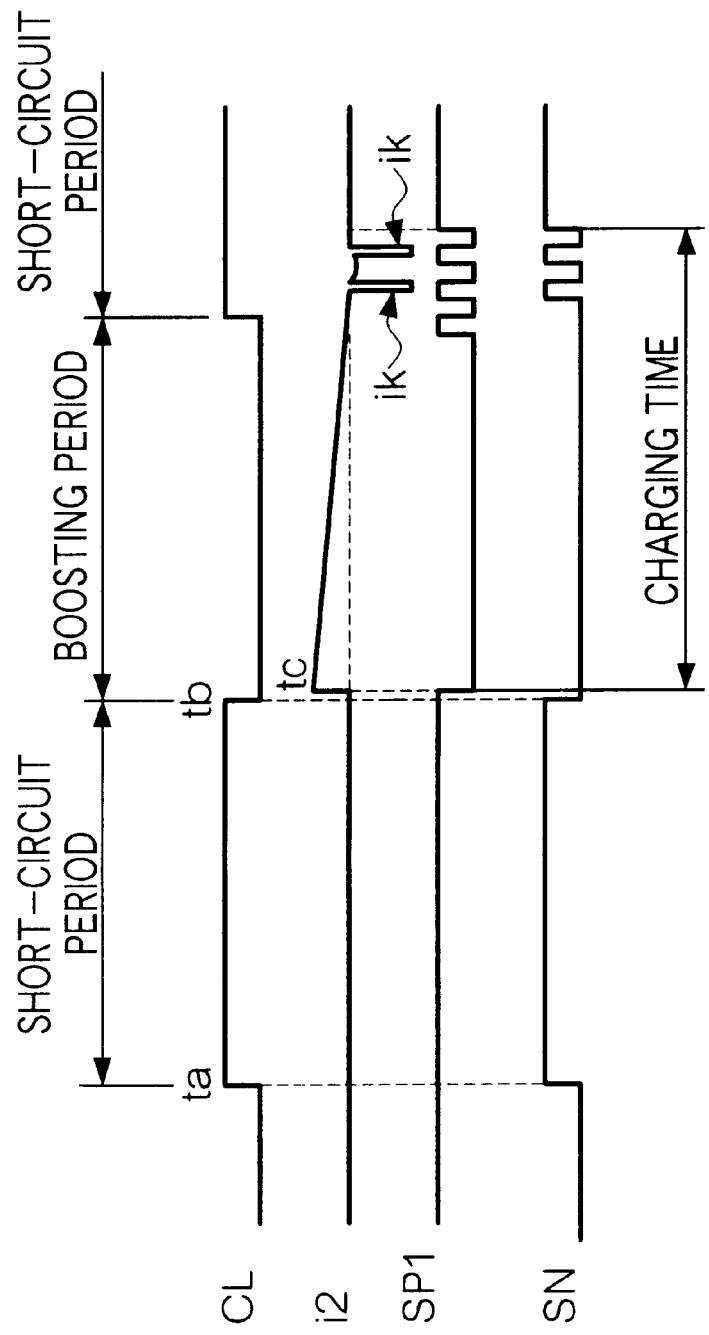
FIG. 53 is a timing chart of the operation of the chopper charging circuit.
Figure 54:
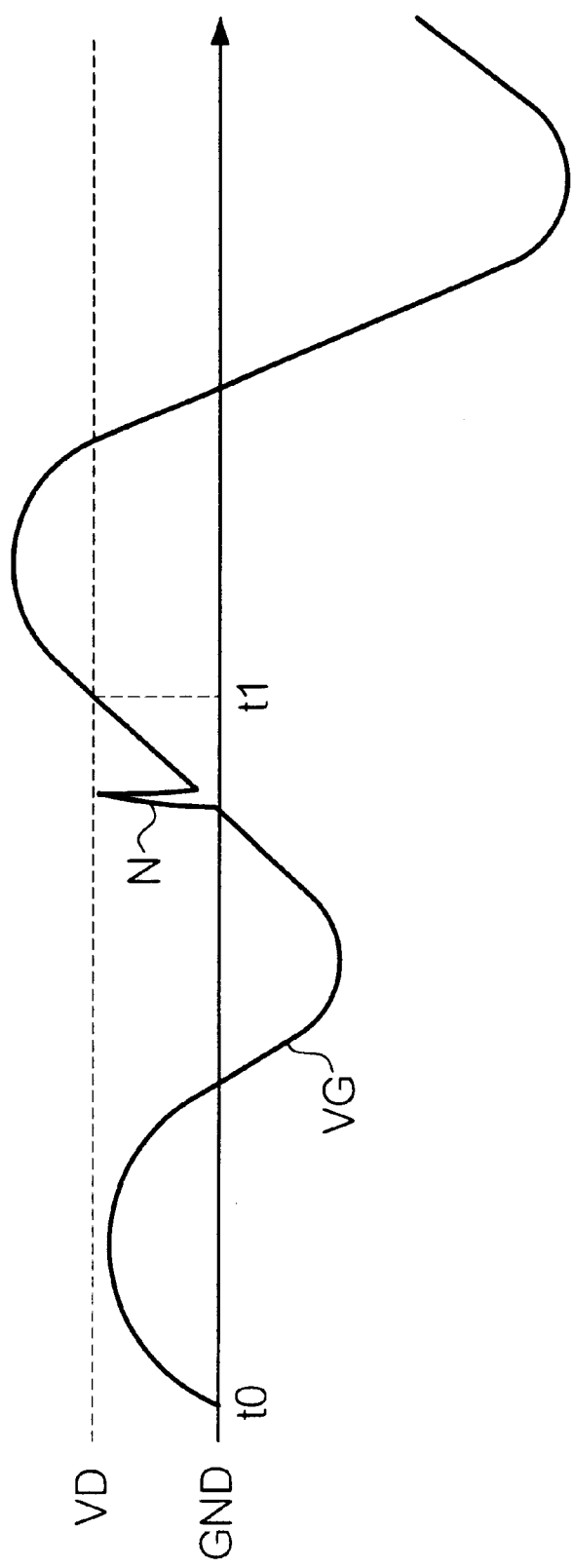
FIG. 54 is a waveform diagram of the relationship between an induced voltage VG of the charging circuit of the prior art and a threshold voltage VD.

Eighth, the above embodiments were explained with reference to a chopper circuit for performing full wave rectification as an example, but the present invention is not limited to this. The invention can also of course be applied to the bridge type charging circuit shown in FIG. 51. In this case, the supply of power to the comparators COM1 to COM4 may be controlled by adding the diodes d1 and d2, auxiliary capacitors C1 and C2, N-channel FETs N1' and N2', and the power generation detection unit 10 shown in FIG. 1.

Ninth, in the above embodiments, the power generation detection units 10 and 225 constantly monitor the voltages of the output terminals AG1 and AG2 of the AC generator AG, but the present invention is not limited to this. It is also possible to monitor the voltages of the output terminals AG1 and AG2 every predetermined cycle.

Further, it is also possible to appropriately set the charging end detection time TM and monitor the power generation state based on either the voltage of the output terminal AG1 or AG2. For example, when setting the charging end detection time TM at 30 ms and comparing the generated power between the case of monitoring the power generation state based on the voltage of one output terminal and the case of monitoring the power generation state based on the two output terminals, the two substantially coincide. Accordingly, by appropriately setting the charging end detection time TM, it becomes possible to detect the power generation state based on the voltage of one output terminal. In this case, one of the comparators COM5 and COM6 can be deleted, and the current consumption at the time of standby can be further reduced. Specifically, the current consumption at the time of standby can be reduced to approximately 5.5 nA, therefore it can be reduced to about 1/100 of that at the time of normal operation. Further, in a conventional rectifying circuit using a Schottkey diode, there is a leakage current of about 20 nA per element, therefore the current consumption can be reduced in comparison with this.

Figure 49:
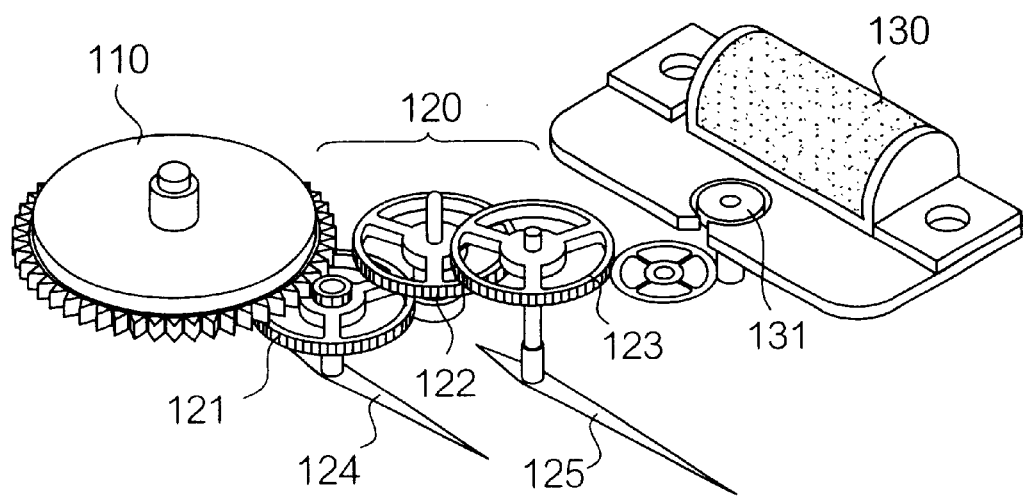
FIG. 49 is a perspective view of the mechanical structure of an electronically controlled mechanical watch according to the modification.

Tenth, the chopper charging circuit according to the above embodiments can be applied to an electronically controlled mechanical watch provided with a spring type generator too. FIG. 49 is a perspective view of the mechanical structure of the electronically controlled mechanical watch. In this wristwatch, a spring 110 is connected to a crown (not illustrated), and the mechanical energy is stored in the spring 110 by winding the crown. An accelerating wheel train 120 is provided between the spring 110 and a rotor 131 of a power generator 130. The accelerating wheel train 120 is configured by a center wheel and pinion 121 with a minute hand 124 fixed thereto, a third wheel and pinion 122, and a sweep second wheel and pinion 123 with a second hand 125 fixed thereto. The movement of the spring 110 is transferred to the rotor 131 of the power generator 130 by this accelerating wheel train 120, and power is thereby generated. Here, the power generator 130 acts also as an electromagnetic brake and rotates a pointer fixed to the accelerating wheel train 120 at a constant speed. In this meaning, the power generator 130 acts also as a speed adjuster.

Figure 50:
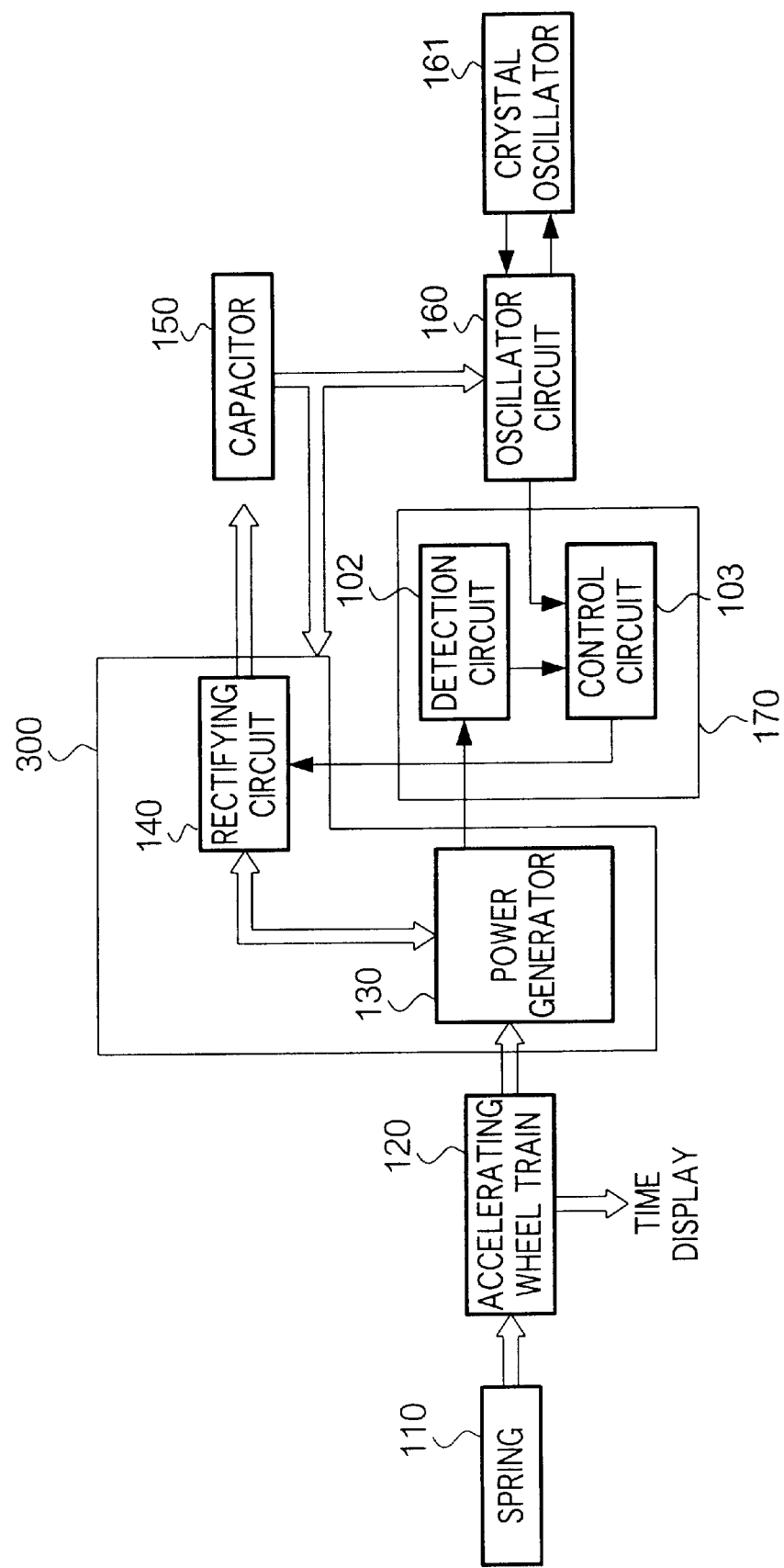
FIG. 50 is a block diagram of the electrical configuration of the electronically controlled mechanical watch.

Next, FIG. 50 is a block diagram of the electrical configuration of the electronically controlled mechanical watch. In the figure, a chopper circuit 300 is configured by the power generator 130 and a rectifying circuit 140. The induced voltage of the power generator 130 is rectified by the rectifying circuit 140 and charged in a capacitor 150. The capacitor 150 supplies power to the chopper circuit 300, a speed adjustment circuit 170, and an oscillator circuit 160. The oscillator circuit 160 generates the clock signal CLK by using a crystal oscillator 161. In this speed adjustment circuit 170, when a detection circuit 102 detects the power generation frequency of the power generator 130, a control circuit 103 controls the rectifying circuit 140 so as to adjust the electromagnetic brake so that the rotation cycle of the rotor 131 matches with the cycle of the clock signal CLK and make the rotation speed of the rotor 131 constant based on this detection result. In this case, the rectifying circuit 140 is controlled by the control signal generated based on the clock signal CLK.

Here, the rotation control of the power generator 130 is carried out by turning ON or OFF and chopping the two ends of the coil of the power generator 130 by the short-circuitable switch. For example, the N-channel FETs N1 and N2 in the embodiments correspond to this switch. By this chopper, when the switch is turned ON, a short braking force is applied to the power generator 130, then the energy is stored in the coil of the power generator 130. On the other hand, when the switch is turned OFF, the power generator 130 operates, the energy stored in the coil is released, and induced voltage is generated. The energy when the switch is turned OFF is added to the induced voltage at this time, therefore the value thereof can be raised. For this reason, when the power generator 130 is controlled by the chopper, the reduction of the generated power at the time of braking can be covered by the rise of the induced voltage when the switch is OFF, and a brake torque can be increased while keeping the generated power at a constant level or more. Thus, an electronically controlled mechanical watch having a long operating time can be constructed. In such an electronically controlled mechanical watch, it is also possible to apply a power supply method and a power supply stop method of the chopper circuit explained in detail in the embodiments. In this case, the charging efficiency is further improved, and an electronically controlled mechanical watch having a longer operating time can be provided.

Eleventh, in the above embodiments, the induced voltage of the AC generator is applied, but the present invention is not limited to this. The invention can also be widely to the case where AC voltage of for example a commercial AC power supply or electromagnetic wave is charged.

Further, as the method of inputting power, it is also possible to apply the method of inputting power in a contact-less method, for example, induction power is input via the coil. In this case, the chopper charging circuit may be provided with a reactance element in place of the output coil L. When supplying the power from an external apparatus, the electromagnetic wave may be input to this reactance element to generate the induced voltage between the terminals of the reactance element.

Twelfth, in the chopper charging circuit mentioned above, by simultaneously bringing the N-channel FETs N2 and N1 to the ON state, a closed loop was formed and energy was stored in the output coil L, but the present invention is not limited to this. It is also possible to form a closed loop by short-circuiting the two ends of the output coil, or of course it is also possible to form a closed loop via a diode, resistor, or the like.

Summarizing the effects of the invention, as explained above, according to the present invention, the charging efficiency can be raised. Further, since whether or not AC voltage not less than the predetermined amplitude is generated is detected based on the voltage boosted two fold from the AC voltage generated between the input terminals, the AC voltage can be detected at an early stage without the influence of noise.

While the invention has been described by reference to specific embodiments chosen for purposes of illustration, it should be apparent that numerous modifications could be made thereto by those skilled in the art without departing from the basic concept and scope of the invention.

What is claimed is:

1. An AC voltage detection circuit for detecting whether or not an AC voltage having an amplitude not less than a predetermined amplitude was induced in an inductance element connected between a first input terminal and a second input terminal, provided with:
   a first capacity element connected to said first input terminal,
   a second capacity element connected to said second input terminal,
   a charging unit for forming a charging route including a capacity element connected to one input terminal between said first and second input terminals and cutting off a charging route including a capacity element connected to the other input terminal when induction of the AC voltage is started at said inductance element, and
   a detection unit for comparing the voltages of said first input terminal and said second input terminal with a reference voltage and detecting that the AC voltage was induced in said inductance element in accordance with the result of the comparison.

2. An AC voltage detection circuit for detecting whether or not an AC voltage having an amplitude not less than a predetermined amplitude was induced in an inductance element connected between a first input terminal and a second input terminal, provided with:
   a first diode connected between said first input terminal and a line,
   a first capacity element and a first switching element connected between said first input terminal and said line,
   a second diode connected between said second input terminal and said line,
   a second capacity element and a second switching element connected between said second input terminal and said line,
   a control unit for controlling to turn ON one of said first and second switching elements and turn OFF the other in a period when a continuous AC voltage is induced at said inductance element and, at the same time, controlling to turn ON the switching element connected between the input terminal having a lower terminal voltage immediately before the end of the related period between said first and second input terminals and said line after the end of the related period, and
   a detection unit for comparing the voltages of said first input terminal and said second input terminal with the reference voltage, and detecting that the AC voltage of the amplitude not less than the predetermined amplitude was induced at said inductance element in accordance with the result of the comparison.

3. An AC voltage detection circuit as set forth in claim 2, wherein provision is further made of a discharging unit for discharging a charged element between said first or second capacity elements at a point of time when the induction of the AC voltage is detected by said detection unit.

4. An AC voltage detection circuit as set forth in claim 3, wherein said discharging unit comprising a third switching element connected between said first input terminal and said line and a fourth switching element connected between said second input terminal and said line and turns ON said third or fourth switching element corresponding to the element which has been turned ON between said first and second switching elements at the point of time when induction of an AC voltage not less than the predetermined amplitude is detected by said detection unit.

5. A charging circuit for rectifying an AC voltage induced at an inductance element connected between a first input terminal and a second input terminal and charging a capacity element connected between a first line and a second line, provided with:
   a first switching element connected between said first line and said first input terminal,
   a second switching element connected between said first line and said second input terminal,
   a third switching element and a first diode connected in parallel between said second line and said first input terminal,
   a fourth switching element and a second diode connected in parallel between said second line and said second input terminal,
   a fifth switching element and a first auxiliary capacity element connected in series between said second line and said first input terminal, a sixth switching element and a second auxiliary capacity element connected in series between said second line and said second input terminal, a first control unit for controlling the ON or OFF state of said first through fourth switching elements based on potentials of said first and second lines and the potentials of said first and second input terminals, a power supply unit for comparing the voltages between said first and second input terminals and said second line with the reference voltage and supplying power to said first control unit when detecting that an AC voltage not less than a predetermined amplitude was induced at said inductance element in accordance with the result of the comparison, and a second control unit for turning ON said fifth or sixth switching element corresponding to the input terminal having the lower terminal voltage immediately before the end of the period where the continuous AC voltage is induced at said inductance element after the end of the related period.

6. A charging circuit as set forth in claim 5, wherein provision is further made of a discharging unit for discharging a charged element between said first and second capacity elements at the point of time when induction of an AC voltage not less than the predetermined amplitude is detected by said power supply unit.

7. A charging circuit as set forth in claim 6, wherein said discharging unit turns ON said third or fourth switching element corresponding to the element which has been turned ON between said fifth and sixth switching elements at the point of time when it is detected that an AC voltage of not less than the predetermined amplitude was induced by said power supply unit.

8. A charging circuit for chopper boosting AC voltage induced at an inductance element connected between a first input terminal and a second input terminal synchronous to a clock signal and charging a capacity element connected between a first line and a second line, provided with:

a first switching element connected between said first line and said first input terminal, a first control unit for comparing the potential of said first line and the potential of said first input terminal and controlling the ON or OFF state of said first switching element based on the result of the comparison, a second switching element connected between said first line and said second input terminal, a second control unit for comparing the potential of said first line and the potential of said second input terminal and controlling the ON or OFF state of said second switching element based on the result of the comparison, a third switching element and a first diode connected in parallel between said second line and said first input terminal, a third control unit for comparing the potential of said second line and the potential of said first input terminal and turning ON or OFF said third switching element synchronous to said clock signal based on the result of the comparison, a fourth switching circuit and a second diode connected in parallel between said second line and said second input terminal, a fourth control unit for comparing the potential of said second line and the potential of said second input terminal and turning ON or OFF said fourth switching element synchronous to said clock signal based on the result of the comparison, a fifth switching circuit and a first auxiliary capacity element connected in series between said second line and said first input terminal, a sixth switching circuit and a second auxiliary capacity element connected in series between said second line and said second input terminal, a detection unit for comparing the voltages between said first and second input terminals and said second line with the reference voltage and detecting that an AC voltage not less than the predetermined amplitude was induced at said inductance element in accordance with the result of the comparison, a power supply unit for supplying power to said first through fourth control units after it is detected by said detection unit that an AC voltage not less than the predetermined amplitude was induced, and an auxiliary capacity element selection unit for turning ON said fifth or sixth switching element corresponding to an input terminal having a lower terminal voltage immediately before the end of the period where the continuous AC voltage is induced at said inductance element after the end of the related period.

9. A chopper charging circuit as set forth in claim 8, wherein provision is further made of a discharging unit for discharging a charged element between said first or second auxiliary capacity element at the point of time when it is detected by said detection unit that an AC voltage not less than the predetermined amplitude is induced.

10. A chopper charging circuit as set forth in claim 9, wherein said discharging unit turns ON or OFF the element which has become ON between said fifth and sixth switching element synchronous to the ON or OFF state of said third or fourth switching element corresponding to the related element at the point of time when it is detected by said detection unit that an AC voltage not less than the predetermined amplitude is induced.

11. A chopper charging circuit as set forth in claim 8, wherein provision is further made of a transfer unit for transferring to said capacity element a charge stored in said first or second auxiliary capacity element at the point of time when it is detected by said detection unit that an AC voltage not less than the predetermined amplitude is induced.

12. A chopper charging circuit as set forth in claim 11, wherein said transfer unit is provided with a seventh switching element connected between said first line and said first input terminal and an eighth switching element connected between said first line and said second input terminal and simultaneously turns ON or OFF said seventh and eighth switching elements, turns OFF the one of said fifth and sixth switching elements corresponding to the first and second capacity elements not storing a charges, and complementarily turns ON or OFF the other switching element together with said seventh and eighth switching elements in a constant period after it is detected by said detection unit that an AC voltage not less than the predetermined amplitude is induced.

13. A chopper charging circuit as set forth in claim 8, wherein said power supply unit supplies power to said third and said fourth control units and then starts supplying power to said first and said second control units.

14. A chopper charging circuit as set forth in claim 13, wherein said power supply unit starts supplying power to said first and said second control units when detecting that the ON or OFF control of said third or fourth switching element is started by said third or said fourth control unit after supplying power to said third and said fourth control units.

15. A chopper charging circuit as set forth in claim 8, wherein said first line is a power supply line, and said second line is the ground.

16. A chopper charging circuit as set forth in claim 8, wherein said first line is the ground, and said second line is a power supply line.

17. A chopper charging circuit as set forth in claim 8, wherein the current consumption of said detection unit is set lower than the current consumption of said third and fourth control units, and the current consumption of said third and fourth control units is set lower than the current consumption of said first and second control units.

18. An electronic apparatus having a built-in chopper charging circuit as set forth in claim 8 and operating by power supplied from said chopper charging circuit.

19. A timepiece provided with a chopper charging circuit as set forth in claim 8 and a clock circuit for counting and displaying time by power supplied from said chopper charging circuit.

20. An AC voltage detection method for detecting whether or not an AC voltage not less than a predetermined amplitude was induced at an inductance element inserted between a first input terminal with a first capacity element connected thereto and a second input terminal with a second capacity element connected thereto, comprising the steps of:
   forming a charging route including a capacity element connected to one input terminal between said first and second input terminals,
   cutting a charging route including the capacity element connected to the other input terminal,
   comparing the voltages of said first input terminal and said second input terminal with the reference voltage, and
   detecting that the AC voltage was induced at said inductance element in accordance with the result of the comparison when induction of AC voltage is commenced at said inductance element.

21. An AC voltage detection method using a detection circuit provided with a first diode connected between a first input terminal and a line, a first capacity element and a first switching element connected between the first input terminal and said line, a second diode connected between a second input terminal and said line, and a second capacity element and a second switching element connected between the second input terminal and said line so as to detect whether or not an AC voltage not less than a predetermined amplitude was induced at an inductance element connected between said first input terminal and said second input terminal, comprising the steps of:
   turning ON one of said first and second switching elements and turning OFF the other in a period where a continuous AC voltage is induced at said inductance element,
   turning ON the switching element connected between the input terminal having a lower terminal voltage immediately before the end of the related period between said first and second input terminals and said line after the end of the related period,
   comparing the voltages of said first input terminal and said second input terminal with the reference voltage, and
   detecting that an AC voltage not less than the predetermined amplitude was induced at said inductance element in accordance with the result of the comparison.

22. A charging method using a charging circuit provided with a first switching element connected between a first line and a first input terminal, a second switching element connected between the first line and a second input terminal, a third switching element and a first diode connected in parallel between said second line and said first input terminal, a fourth switching element and a second diode connected in parallel between said second line and said second input terminal, a fifth switching element and a first auxiliary capacity element connected in series between said second line and said first input terminal, and a sixth switching element and a second auxiliary capacity element connected in series between said second line and said second input terminal so as to rectify the AC voltage induced at the inductance element connected between said first input terminal and said second input terminal and charge a capacity element connected between said first line and said second line, comprising the steps of:
   comparing the voltages between said first and second input terminals and said second line with a reference voltage,
   detecting that an AC voltage not less than a predetermined amplitude was induced at said inductance element in accordance with the result of the comparison,
   controlling the ON or OFF states of said first through fourth switching elements based on the potentials of said first and second lines and the potentials of said first and second input terminals, and
   turning ON said fifth or sixth switching element corresponding to the input terminal having the lower terminal voltage immediately before the end of the period when a continuous AC voltage is induced at said inductance element after the end of the related period.

23. A chopper charging method using a chopper charging circuit provided with a first switching element connected between a first line and a first input terminal, a first control unit for comparing the potential of said first line and the potential of said first input terminal and controlling the ON or OFF state of said first switching element based on the result of the comparison, a second switching element connected between said first line and said second input terminal, a second control unit for comparing the potential of said first line and the potential of said second input terminal and controlling the ON or OFF state of said second switching element based on the result of the comparison, a third switching element and a first diode connected in parallel between said second line and said first input terminal, a third control unit for comparing the potential of said second line and the potential of said first input terminal and turning ON or OFF said third switching element synchronous to said clock signal based on the result of the comparison, a fourth switching circuit and a second diode connected in parallel between said second line and said second input terminal, a fourth control unit for comparing the potential of said second line and the potential of said second input terminal and turning ON or OFF said fourth switching element synchronous to said clock signal based on the result of the comparison, a fifth switching circuit and a first auxiliary capacity element connected in series between said second line and said first input terminal, and a sixth switching circuit and a second auxiliary capacity element connected in series between said second line and said second input terminal, so as to chopper boost synchronous to said clock signal the AC voltage induced at the inductance element connected between said first input terminal and said second input terminal and charge a capacity element connected between said first line and said second line, comprising the steps of:

comparing the voltages between said first and second input terminals and said second line with the reference voltage, detecting that an AC voltage not less than a predetermined amplitude was induced at said inductance element in accordance with the result of the comparison, supplying power to said first through fourth control units after it is detected by said detection unit that an AC voltage not less than the predetermined amplitude was induced, and turning ON said fifth or sixth switching element corresponding to the input terminal having the lower terminal voltage immediately before the end of the period where the continuous AC voltage is induced at said inductance element after the end of the related period.

24. A chopper circuit for converting energy supplied from a power supply to a chopper voltage to generate a chopper voltage between a first line and a second line, provided with:

an inductance element, a storage unit for storing the power, a first chopper unit for forming a first closed loop including said inductance element and said power supply to supply the power of said power supply to said inductance element and converting the energy of said inductance element to the chopper voltage by opening said first closed loop after an elapse of a predetermined period, a charging unit for charging said storage unit by forming a second closed loop including said inductance element and said storage unit where the chopper volt converted by said first chopper unit becomes a voltage reference voltage determined in advance or less, and a second chopper unit for forming a third closed loop including said inductance element and said storage unit and converting the voltage of said inductance element to the chopper voltage by opening said third closed loop after the elapse of the predetermined period.

25. A chopper circuit as set forth in claim 24, wherein said charging unit opens said second closed loop when said first closed loop is formed by said first chopper unit after detecting that the chopper voltage converted by said first chopper unit becomes said chopper reference voltage or less.

26. A chopper circuit as set forth in claim 24, wherein:

provision is further made of a power detection unit for detecting whether or not power is supplied from said power supply, said first chopper unit converts the energy of said inductance element to the chopper voltage at the time of supply of the power based on the detection result of said power detection unit, and said second chopper unit has a stored voltage detection unit for detecting whether or not the voltage of said storage unit becomes a storage reference voltage determined in advance or more, converts the energy of said inductance element to the chopper voltage when the voltage of said storage unit is said storage reference voltage or more and power is not supplied based on the detection result of said stored voltage detection unit and said power detection unit, and opens said third closed loop when the voltage of said storage unit becomes said storage reference voltage or less.

27. A chopper circuit as set forth in claim 24, wherein said power supply is either of a DC generator, a DC power supply, an AC generator, and an AC power supply.

28. A chopper circuit for converting a energy supplied from an AC power supply to a chopper voltage to generate a chopper voltage between the first line and the second line, provided with:

an inductance element, first and second storage units for storing the power, a first chopper unit for forming a first closed loop including said inductance element and said AC power supply to supply power of said AC power supply to said inductance element and opening said first closed loop after the elapse of a predetermined period to thereby to convert the energy of said inductance element to the chopper voltage, a first charging unit for forming a second closed loop including said inductance element and said first storage unit to charge said first storage unit by said chopper voltage when the chopper voltage converted by said first chopper unit and generated on one terminal side of said inductance element becomes a chopper reference voltage determined in advance or less, a second charging unit for forming a third closed loop including said inductance element and said second storage unit to charge said second storage unit by said chopper voltage when the chopper voltage converted by said first chopper unit and generated on the other terminal side of said inductance element becomes said chopper reference voltage or less, a second chopper unit for forming a fourth closed loop including said inductance element and said first storage unit and opening said fourth closed loop after the elapse of the predetermined period to thereby convert the voltage of said inductance element to the chopper voltage, and a third chopper unit for forming a fifth closed loop including said inductance element and said second storage unit and opening said fifth closed loop after the elapse of the predetermined period to thereby convert the energy of said inductance element to the chopper voltage.

29. A chopper circuit as set forth in claim 28, wherein:

said first charging unit opens said second closed loop when said first closed loop is formed by said first chopper unit after detecting that the chopper voltage converted by said first chopper unit and generated on one terminal side of said inductance element becomes said chopper reference voltage or less, and said second charging unit opens said third closed loop when said first closed loop is formed by said first chopper unit after detecting that the chopper voltage converted by said first chopper unit and generated on the other terminal side of said inductance element becomes said chopper reference voltage or less.

30. A chopper circuit as set forth in claim 28, wherein:

provision is further made of a power detection unit for detecting whether or not power is supplied from said AC power supply, said first chopper unit converts the energy of said inductance element to the chopper voltage at the time of supply of the power based on the detection result of said power detection unit, said second chopper unit has a first stored voltage detection unit for detecting whether or not the voltage of said first storage unit becomes a predetermined storage reference voltage, converts energy of said inductance element to the chopper voltage when the voltage of said first storage unit is said storage reference voltage or more and power is not supplied based on the detection result of said first stored voltage detection unit and said power detection unit, and opens said fourth closed loop when the voltage of said first storage unit becomes said storage reference voltage or less, and said third chopper unit has a second stored voltage detection unit for detecting whether or not the voltage of said second storage unit becomes the predetermined storage reference voltage, converts the energy of said inductance element to the chopper voltage when the voltage of said second storage unit is said storage reference voltage or more and power is not supplied based on the detection result of said second stored voltage detection unit and said power detection unit, and opens said fifth closed loop when the voltage of said second storage unit becomes said storage reference voltage or less.

31. A chopper circuit as set forth in claim 28, wherein said AC power supply is an AC generator or an AC power supply.

32. A chopper method providing an inductance element and a storage unit for storing power and converting energy supplied from a power supply to a chopper voltage to generate a chopper voltage between a first line and a second line, comprising:

a first chopper step of forming a first closed loop including said inductance element and said power supply to supply power of said power supply to said inductance element and opening said first closed loop after the elapse of a predetermined period to thereby convert the voltage of said inductance element to the chopper voltage, a charging step of forming a second closed loop including said inductance element and said storage unit to charge said storage unit by said chopper voltage when the chopper voltage converted by said first chopper step becomes a predetermined chopper reference voltage or less, and a second chopper step of forming a third closed loop including said inductance element and said storage unit and opening said third closed loop after the elapse of a predetermined period to thereby convert the energy of said inductance element to the chopper voltage.

33. A chopper method as set forth in claim 32, wherein said charging step is for opening said second closed loop when said first closed loop is formed by said first chopper step after detecting that the chopper voltage converted by said first chopper step becomes said chopper reference voltage or less.

34. A chopper method as set forth in claim 32, further comprising a power detecting step of detecting whether or not power is supplied by said power supply, wherein said first chopper step converts the energy of said inductance element to the chopper voltage at the time of supply of the power based on the detection result in said power detecting step, and said second chopper step has a stored voltage detecting step of detecting whether or not the voltage of said storage unit becomes the predetermined storage reference voltage or more, converts the energy of said inductance element to the chopper voltage when the voltage of said storage unit is said storage reference voltage or more and power is not supplied based on the detection result of said stored voltage detecting step and said power detecting step, and opens said third closed loop when the voltage of said storage unit becomes said storage reference voltage or less.

35. A chopper method providing an inductance element and first and second storage units for storing power and converting a energy supplied from an AC power supply to a chopper voltage to generate a chopper voltage between a first line and a second line, comprising:

a first chopper step of forming a first closed loop including said inductance element and said AC power supply to supply power of said AC power supply to said inductance element and opening said first closed loop after the elapse of the predetermined period to thereby convert the energy of said inductance element to the chopper voltage, a first charging step of forming a second closed loop including said inductance element and said first storage unit to charge said first storage unit by said chopper voltage when the chopper voltage converted by said first chopper step and generated on one terminal side of said inductance element becomes a predetermined chopper reference voltage or less, a second charging step of forming a third closed loop including said inductance element and said second storage unit to charge said second storage unit by said chopper voltage when the chopper voltage converted by said first chopper step and generated on the other terminal side of said inductance element becomes said chopper reference voltage or less, a second chopper step of forming a fourth closed loop including said inductance element and said first storage unit and opening said fourth closed loop after the elapse of the predetermined period to thereby convert the energy of said inductance element to the chopper voltage, and a third chopper step of forming a fifth closed loop including said inductance element and said second storage unit and opening said fifth closed loop after the elapse of the predetermined period to thereby convert the energy of said inductance element to the chopper voltage.

36. A chopper method as set forth in claim 35, wherein said first charging step is for opening said second closed loop when said first closed loop is formed by said first chopper step after detecting that the chopper voltage converted by said first chopper step and generated on one terminal side of said inductance element becomes said chopper reference voltage or less, and said second charging step is for opening said third closed loop when said first closed loop is formed by said first chopper step after detecting that the chopper voltage converted by said first chopper step and generated on the other terminal side of said inductance element becomes said chopper reference voltage or less.

37. A chopper method as set forth in claim 35, further comprising a power detecting step of detecting whether or not power is supplied by said power supply, wherein said first chopper step converts the energy of said inductance element to the chopper voltage at the time of supply of power based on the detection result in said power detecting step, said second chopper step has a first stored voltage detecting step of detecting whether or not the voltage of said first storage unit becomes a predetermined storage reference voltage or more, converts the energy of said inductance element to the chopper voltage when the voltage of said storage unit is said storage reference voltage or more and power is not supplied based on the detection result of said first stored voltage detecting step and said power detecting step, and opens said fourth closed loop when the voltage of said first storage unit becomes said storage reference voltage or less, and said third chopper step has a second stored voltage detecting step of detecting whether or not the voltage of said second storage unit becomes a predetermined storage reference voltage or more, converts the energy of said inductance element to the chopper voltage when the voltage of said second storage unit is said storage reference voltage or more and power is not supplied based on the detection result of said second stored voltage detecting step and said power detecting step, and opens said fifth closed loop when the voltage of said second storage unit becomes said storage reference voltage or less.

38. A chopper charging circuit provided with:

a chopper circuit for converting energy supplied from a power supply to a chopper voltage to generate a chopper voltage between a first line and a second line and a third storage unit for storing the chopper voltage of said chopper circuit, wherein
said chopper circuit is provided with:
an inductance element,
a storage unit for storing power,
a first chopper unit for forming a first closed loop including said inductance element and said power supply to supply power of said power supply to said inductance element and opening said first closed loop after the elapse of a predetermined period to thereby convert the energy of said inductance element to the chopper voltage, a charging unit for charging said storage unit by forming a second closed loop including said inductance element and said storage unit when the chopper voltage converted by said first chopper unit becomes a predetermined chopper reference voltage or less, and a second chopper unit for forming a third closed loop including said inductance element and said storage unit and opening said third closed loop after the elapse of the predetermined period to thereby convert the energy of said inductance element to the chopper voltage.

39. An electronic apparatus having a built-in chopper charging circuit of claim 38 and operating by power supplied from said chopper charging circuit.

40. A timepiece provided with a chopper charging circuit of claim 38 and a time circuit for counting and displaying time by power supplied from said chopper charging circuit.

* * * * *

UNITED STATES PATENT AND TRADEMARK OFFICE
CERTIFICATE OF CORRECTION

PATENT NO. : 6,421,263 B1
DATED : July 16, 2002
INVENTOR(S) : Osamu Shinkawa

It is certified that error appears in the above-identified patent and that said Letters Patent is hereby corrected as shown below:

<u>Title page,</u>
Please add Item [30] as follows

--     [30] Foreign Application Priority Data

October 25, 1999 (JP), 11-302972

October 27, 1999 (JP), 11-305855

September 8, 2000, (JP), 2000-273264

September 11, 2000, (JP), 2000-275490 --

<u>Column 49,</u>
Line 29, change "volt" to -- voltage --
Line 30, change "voltage" to -- chopper --.

Signed and Sealed this

Twenty-fourth Day of December, 2002

JAMES E. ROGAN
*Director of the United States Patent and Trademark Office*